US007031302B1

(12) United States Patent
Malalur

(10) Patent No.: US 7,031,302 B1
(45) Date of Patent: Apr. 18, 2006

(54) HIGH-SPEED STATS GATHERING IN A NETWORK SWITCH

(75) Inventor: Govind Malalur, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 654 days.

(21) Appl. No.: 09/606,210

(22) Filed: Jun. 29, 2000

Related U.S. Application Data

(63) Continuation-in-part of application No. 09/343,409, filed on Jun. 30, 1999, now Pat. No. 6,335,932.

(60) Provisional application No. 60/135,216, filed on May 21, 1999, provisional application No. 60/141,496, filed on Jun. 28, 1999, provisional application No. 60/155,795, filed on Sep. 27, 1999, provisional application No. 60/183,143, filed on Feb. 17, 2000.

(51) Int. Cl.
*H04L 12/50* (2006.01)
*H04Q 11/00* (2006.01)

(52) U.S. Cl. ...................................... 370/357; 370/401

(58) Field of Classification Search ................ 370/351, 370/352, 389–392, 386, 395.1, 401, 412, 370/419, 420–422, 229, 230, 235, 252, 428, 370/357; 710/22, 23, 305, 308; 712/33, 712/43
See application file for complete search history.

(56) References Cited

U.S. PATENT DOCUMENTS 5,278,789 A 1/1994 Inoue et al. ........... 365/189.01
5,390,173 A 2/1995 Spinney et al. ............. 370/393
5,414,704 A 5/1995 Spinney ....................... 370/389
5,423,015 A 6/1995 Chung ........................ 711/108
5,459,717 A 10/1995 Mullan et al. .............. 370/351
5,473,607 A 12/1995 Hausman et al. ........... 370/392
5,499,295 A 3/1996 Cooper ....................... 380/270
5,524,254 A 6/1996 Morgan et al. ............. 709/245
5,555,398 A 9/1996 Raman ....................... 711/143
5,568,477 A 10/1996 Galand et al. .............. 370/229
5,579,301 A 11/1996 Ganson et al. .............. 370/229
5,644,784 A 7/1997 Peek .......................... 710/24

(Continued)

FOREIGN PATENT DOCUMENTS

EP 0312917 A2 4/1989

(Continued)

OTHER PUBLICATIONS

"A High-Speed CMOS Circuit for 1.2-Gb/s 16 =16 ATM Switching," Alain Chemarin et al. 8107 IEEE Journal of Solid-State Circuits 27(Jul. 1992) No. 7, New York, US, pp. 1116-1120.

(Continued)

*Primary Examiner*—Brian Nguyen
(74) *Attorney, Agent, or Firm*—Squire, Sanders & Dempsey LLP

(57) ABSTRACT

A network switch includes a data port for communicating with a data network, and a statistics counter coupled to the data port for monitoring operational parameters associated with the data port. The statistics counter includes statistics registers therein. A statistics gathering circuit is connected to the statistics counter for reading the statistics registers, and for transmitting the data from the statistics registers to a remote system memory. A method of monitoring port activity in the network switch includes storing port activity data in a statistics register on a network switch, then reading the port activity data with the statistics gathering circuit. The port activity data is transmitted directly to the remote system memory, thereby reconstructing the statistics register in the remote system memory. The remote system memory can then be accessed via a remote CPU to read the reconstructed statistics register.

30 Claims, 39 Drawing Sheets

U.S. PATENT DOCUMENTS

| | | | | |
|---|---|---|---|---|
| 5,652,579 | A | 7/1997 | Yamada et al. | 341/23 |
| 5,696,899 | A | 12/1997 | Kalwitz | 709/228 |
| 5,742,613 | A | 4/1998 | MacDonald | 714/711 |
| 5,748,631 | A | 5/1998 | Bergantino et al. | 370/398 |
| 5,781,549 | A | 7/1998 | Dai | 370/398 |
| 5,787,084 | A | 7/1998 | Hoang et al. | 370/390 |
| 5,790,539 | A | 8/1998 | Chao et al. | 370/390 |
| 5,802,052 | A | 9/1998 | Venkataraman | 370/395 |
| 5,802,287 | A | 9/1998 | Rostoker et al. | 370/395.5 |
| 5,825,772 | A | 10/1998 | Dobbins et al. | 370/396 |
| 5,828,653 | A | 10/1998 | Goss | 370/230 |
| 5,831,980 | A | 11/1998 | Varma et al. | 370/395.72 |
| 5,842,038 | A | 11/1998 | Williams et al. | 710/5 |
| 5,845,081 | A | 12/1998 | Rangarajan et al. | 709/224 |
| 5,887,187 | A | 3/1999 | Rostoker et al. | 712/29 |
| 5,892,922 | A | 4/1999 | Lorenz | 709/238 |
| 5,898,687 | A | 4/1999 | Harriman et al. | 370/390 |
| 5,909,564 | A * | 6/1999 | Alexander et al. | 710/316 |
| 5,909,686 | A | 6/1999 | Muller et al. | 707/104.1 |
| 5,918,074 | A | 6/1999 | Wright et al. | 710/52 |
| 5,940,596 | A | 8/1999 | Rajan et al. | 709/242 |
| 5,941,979 | A * | 8/1999 | Lentz et al. | 712/33 |
| 5,987,507 | A | 11/1999 | Creedon et al. | 709/215 |
| 6,011,795 | A | 1/2000 | Varghese et al. | 370/392 |
| 6,041,053 | A | 3/2000 | Douceur et al. | 370/398 |
| 6,061,351 | A | 5/2000 | Erimli et al. | 370/390 |
| 6,119,196 | A | 9/2000 | Muller et al. | 710/243 |
| 6,175,902 | B1 | 1/2001 | Runaldue et al. | 711/159 |
| 6,185,185 | B1 | 2/2001 | Bass et al. | 370/230 |
| 6,335,932 | B1 * | 1/2002 | Kadambi et al. | 370/391 |
| 6,393,548 | B1 * | 5/2002 | Kerstein et al. | 712/43 |
| 6,483,844 | B1 * | 11/2002 | Erimli | 370/428 |

FOREIGN PATENT DOCUMENTS

| | | | |
|---|---|---|---|
| EP | 0465090 | A1 | 1/1992 |
| EP | 0752796 | A2 | 1/1997 |
| EP | 0849917 | A2 | 6/1998 |
| EP | 0853441 | A2 | 7/1998 |
| EP | 0854606 | A2 | 7/1998 |
| EP | 0859492 | A2 | 8/1998 |
| EP | 0862349 | A2 | 9/1998 |
| EP | 0907300 | A2 | 4/1999 |
| FR | 2 725 573 | A1 | 4/1996 |
| JP | 4-189023 | | 7/1992 |
| WO | WO 98/09473 | | 3/1998 |
| WO | WO 99/00938 | | 1/1999 |
| WO | WO 99/00939 | | 1/1999 |
| WO | WO 99/00944 | | 1/1999 |
| WO | WO 99/00945 | | 1/1999 |
| WO | WO 99/00948 | | 1/1999 |
| WO | WO 99/00949 | | 1/1999 |
| WO | WO 99/00950 | | 1/1999 |
| WO | WO9900936 | A1 | 6/2001 |

OTHER PUBLICATIONS

"Local Area Network Switch Frame Lookup Technique for Increased Speed and Flexibility, " 700 IBM Technical Disclosure Bulletin 38(Jul. 1995) No. 7, Armonk, NY, US, pp. 221-222.

"Queue Management for Shared Buffer and Shared Multibuffer ATM Switches," Yu-Sheng Lin et al., Department of Electronics Engineering & Institute of Electronics, National Chiao Tung University, Hsinchu, Taiwan, R.O.C., Mar. 24, 1996, pp. 688-695.

"A 622-Mb/s 8 =8 ATM Switch Chip Set with Shared Multibuffer Architecture," Harufusa Kondoh et al., 8107 IEEE Journal of Solid-State Circuits 28(Jul. 1993), No. 7, New York, US, pp. 808-814.

"Catalyst 8500 CSR Architecture," White Paper XP-002151999, Cisco Systems Inc. 1998, pp. 1-19.

"Computer Networks," A.S. Tanenbaum, Prentice-Hall Int., USA, XP-002147300(1998), Sec. 5.2- Sec. 5.3, pp. 309-320.

* cited by examiner

Fig.5

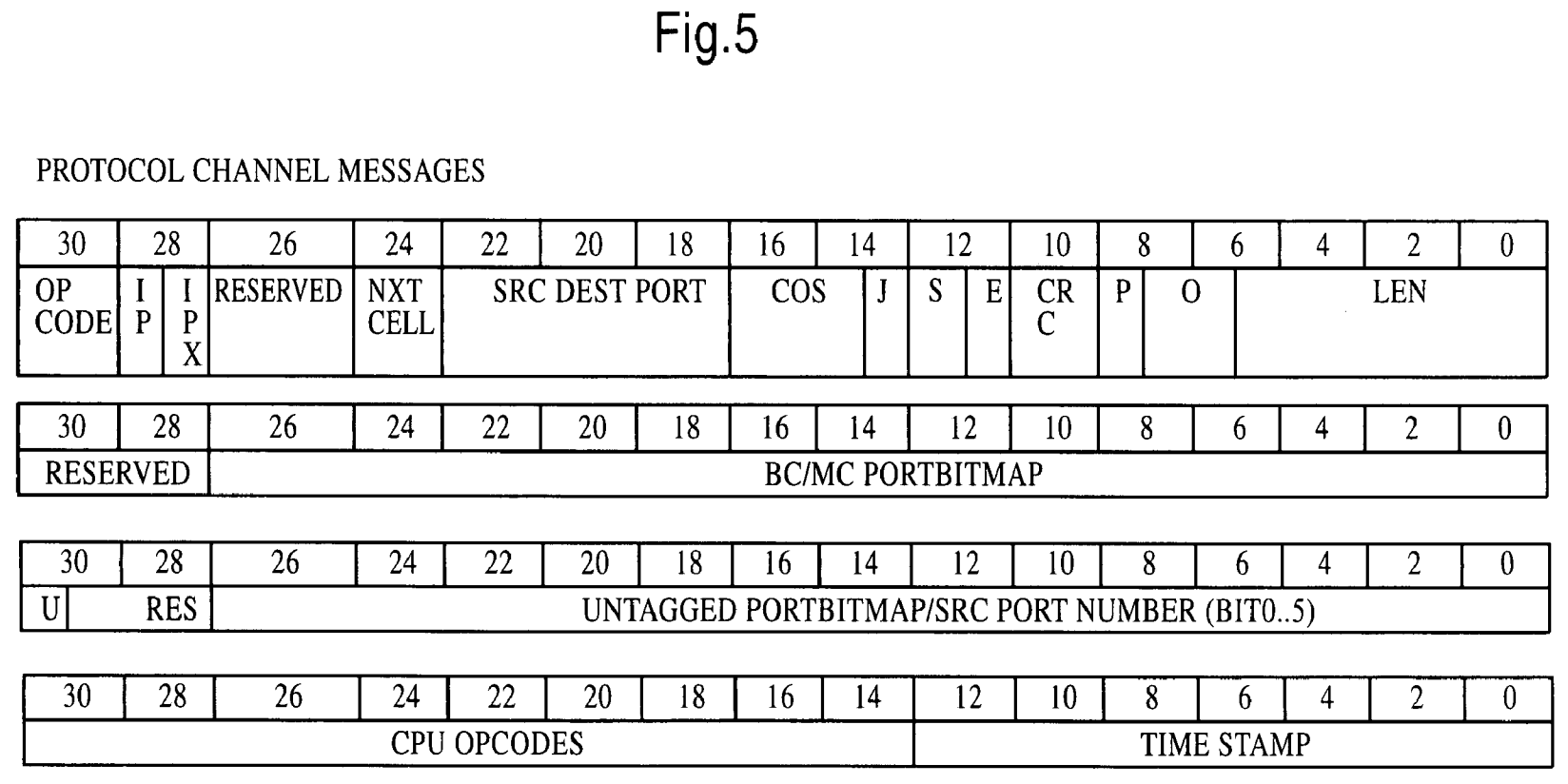

PROTOCOL CHANNEL MESSAGES

| 30 | 28 | | 26 | 24 | 22 | 20 | 18 | 16 | 14 | 12 | | 10 | 8 | 6 | 4 | 2 | 0 |
|---|---|---|---|---|---|---|---|---|---|---|---|---|---|---|---|---|---|
| OP CODE | I P | I P X | RESERVED | NXT CELL | SRC DEST PORT | | | COS | J | S | E | CR C | P | O | LEN | | |

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| RESERVED | | BC/MC PORTBITMAP | | | | | | | | | | | | | |

| | 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|---|
| U | RES | | UNTAGGED PORTBITMAP/SRC PORT NUMBER (BIT0..5) | | | | | | | | | | | | | |

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| CPU OPCODES | | | | | | | | TIME STAMP | | | | | | | |

Fig.6

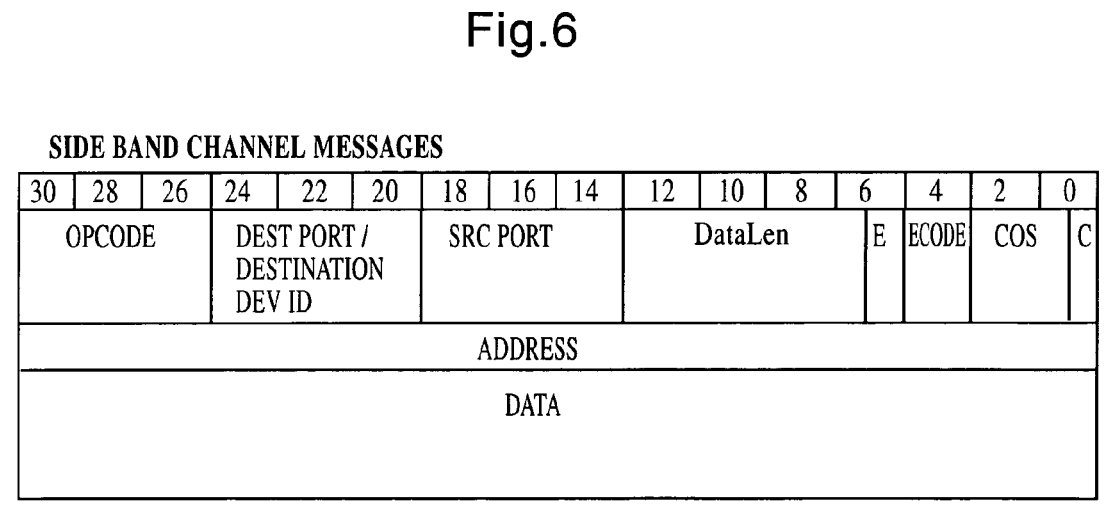

SIDE BAND CHANNEL MESSAGES

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| OPCODE | | | DEST PORT / DESTINATION DEV ID | | | SRC PORT | | | DataLen | | | E | ECODE | COS | C |
| ADDRESS | | | | | | | | | | | | | | | |
| DATA | | | | | | | | | | | | | | | |

Fig.11

<table>
<tr><td>LINE 0 ⟶</td><td>FC | LC | BC/MC | Cpy_cnt (5b) | Cell_length (7b) | CRC (2b) | NC_header (16b) | Src Count (6) | IPX | IP |<br>| Time_Stamp (14b) | O bits (2b) | P | NextCellLen(2b) | CpuOpcode(4b) | Cell_data (0-9B)</td></tr>
<tr><td>LINE 1 ⟶</td><td>Cell_data (10-27) Bytes</td></tr>
<tr><td>LINE 2 ⟶</td><td>Cell_data (28-45) Bytes</td></tr>
<tr><td>LINE 3 ⟶</td><td>Cell_data (46-63) Bytes</td></tr>
</table>

Fig.27A

| PORT NUMBER | MAC ADDRESS | VLAN ID | T | TGID | RTAG |
|---|---|---|---|---|---|
| 1 | A | 1 | 0 | X | X |
| 26 | B | 1 | 1 | 2 | 2 |

Fig.27B

| PORT NUMBER | MAC ADDRESS | VLAN ID | T | TGID | RTAG |
|---|---|---|---|---|---|
| 26 | A | 1 | 0 | X | X |
| 26 | B | 1 | 1 | 2 | 2 |

Fig.27C

| PORT NUMBER | MAC ADDRESS | VLAN ID | T | TGID | RTAG |
|---|---|---|---|---|---|
| 26 | A | 1 | 0 | X | X |
| 1 | B | 1 | 1 | 2 | 2 |

Fig.27D

| PORT NUMBER | MAC ADDRESS | VLAN ID | T | TGID | RTAG |
|---|---|---|---|---|---|
| 26 | A | 1 | 0 | X | X |
| 26 | B | 1 | 1 | 2 | 2 |

Fig.32A

| PORT NUMBER | MAC ADDRESS | VLAN ID | T | TGID | RTAG |
|---|---|---|---|---|---|
| 1 | A | 1 | 0 | X | X |
| 25 | B | 1 | 1 | 2 | 2 |

Fig.32B

| PORT NUMBER | MAC ADDRESS | VLAN ID | T | TGID | RTAG |
|---|---|---|---|---|---|
| 26 | A | 1 | 0 | X | X |
| 25 | B | 1 | 1 | 2 | 2 |

Fig.32C

| PORT NUMBER | MAC ADDRESS | VLAN ID | T | TGID | RTAG |
|---|---|---|---|---|---|
| 26 | A | 1 | 0 | X | X |
| 1 | B | 1 | 1 | 2 | 2 |

Fig.32D

| PORT NUMBER | MAC ADDRESS | VLAN ID | T | TGID | RTAG |
|---|---|---|---|---|---|
| 26 | A | 1 | 0 | X | X |
| | | | | | |

Fig.34A

| PORT NUMBER | MAC ADDRESS | VLAN ID | T | TGID | RTAG |
|---|---|---|---|---|---|
| 1 | A | 1 | 1 | 1 | 1 |
| 25 | B | 1 | 1 | 2 | 2 |

Fig.34B

| PORT NUMBER | MAC ADDRESS | VLAN ID | T | TGID | RTAG |
|---|---|---|---|---|---|
| 26 | A | 1 | 1 | 1 | 1 |
| 25 | B | 1 | 1 | 2 | 2 |

Fig.34C

| PORT NUMBER | MAC ADDRESS | VLAN ID | T | TGID | RTAG |
|---|---|---|---|---|---|
| 26 | A | 1 | 1 | 1 | 1 |
| 1 | B | 1 | 1 | 2 | 2 |

Fig.34D

| PORT NUMBER | MAC ADDRESS | VLAN ID | T | TGID | RTAG |
|---|---|---|---|---|---|
| 26 | A | 1 | 1 | 1 | 1 |
| | | | | | |

Fig.36

TRUNK GROUP TABLE FOR SW1:

| TGID | TP0 | TP1 | TP2 | TP3 | TP4 | TP5 | TP6 | TP7 | TG SIZE |
|---|---|---|---|---|---|---|---|---|---|
| 2 | 25 | 25 | 25 | 25 | X | X | X | X | 4 |

TRUNK GROUP TABLE FOR SW2:

| TGID | TP0 | TP1 | TP2 | TP3 | TP4 | TP5 | TP6 | TP7 | TG SIZE |
|---|---|---|---|---|---|---|---|---|---|
| 2 | 25 | 25 | 25 | 25 | X | X | X | X | 4 |

TRUNK GROUP TABLE FOR SW3:

| TGID | TP0 | TP1 | TP2 | TP3 | TP4 | TP5 | TP6 | TP7 | TG SIZE |
|---|---|---|---|---|---|---|---|---|---|
| 2 | 1 | 2 | 3 | 4 | X | X | X | X | 4 |

TRUNK GROUP TABLE FOR SW4:

| TGID | TP0 | TP1 | TP2 | TP3 | TP4 | TP5 | TP6 | TP7 | TG SIZE |
|---|---|---|---|---|---|---|---|---|---|
| 2 | 26 | 26 | 26 | 26 | X | X | X | X | 4 |

Fig.37

TRUNK GROUP TABLE FOR SW1:

| TGID | TP0 | TP1 | TP2 | TP3 | TP4 | TP5 | TP6 | TP7 | TG SIZE |
|---|---|---|---|---|---|---|---|---|---|
| 1 | 1 | 2 | X | X | X | X | X | X | 2 |
| 2 | 25 | 25 | 25 | 3 | X | X | X | X | 4 |

TRUNK GROUP TABLE FOR SW2:

| TGID | TP0 | TP1 | TP2 | TP3 | TP4 | TP5 | TP6 | TP7 | TG SIZE |
|---|---|---|---|---|---|---|---|---|---|
| 1 | 26 | 26 | X | X | X | X | X | X | 2 |
| 2 | 25 | 1 | 2 | 26 | X | X | X | X | 4 |

TRUNK GROUP TABLE FOR SW3:

| TGID | TP0 | TP1 | TP2 | TP3 | TP4 | TP5 | TP6 | TP7 | TG SIZE |
|---|---|---|---|---|---|---|---|---|---|
| 1 | 26 | 26 | X | X | X | X | X | X | 2 |
| 2 | 1 | 26 | 26 | 26 | X | X | X | X | 4 |

TRUNK GROUP TABLE FOR SW4:

| TGID | TP0 | TP1 | TP2 | TP3 | TP4 | TP5 | TP6 | TP7 | TG SIZE |
|---|---|---|---|---|---|---|---|---|---|
| 1 | 26 | 26 | X | X | X | X | X | X | 2 |
| 2 | 26 | 26 | 26 | 26 | X | X | X | X | 4 |

HIGH-SPEED STATS GATHERING IN A NETWORK SWITCH

REFERENCE TO RELATED APPLICATIONS

This application claims priority of U.S. Provisional patent application Ser. Nos. 60/135,216, filed on May 21, 1999, Ser. No. 60/141,496, filed on Jun. 28, 1999, Ser. No. 60/155,795, filed on Sep. 27, 1999, and Ser. No. 60/183,143, filed on Feb. 17, 2000. The contents of these provisional applications are hereby incorporated by reference. Furthermore, this application is filed as a continuation-in-part of U.S. patent application Ser. No. 09/343,409, filed on Jun. 30, 1999, which issued as U.S. Pat. No. 6,335,932, on Jan. 1, 2002.

BACKGROUND OF THE INVENTION

1. Field of the Invention

The invention relates to a method and apparatus for high performance switching in local area communications networks such as token ring, ATM, ethernet, fast ethernet, and gigabit ethernet environments, generally known as LANs. In particular, the invention relates to a new switching architecture in an integrated, modular, single chip solution, which can be implemented on a semiconductor substrate such as a silicon chip.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known ethernet technology, which is based upon numerous IEEE ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, “switches”, which operate with various types of communication media. Thickwire, thinwire, twisted pair, and optical fiber are examples of media which has been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Basic ethernet wirespeed is up to 10 megabits per second, and Fast Ethernet is up to 100 megabits per second. The newest ethernet is referred to as gigabit ethernet, and is capable of transmitting data over a network at a rate of up to 1,000 megabits per second. As speed has increased, design constraints and design requirements have become more and more complex with respect to following appropriate design and protocol rules and providing a low cost, commercially viable solution. For example, high speed switching requires high speed memory to provide appropriate buffering of packet data; conventional Dynamic Random Access Memory (DRAM) is relatively slow, and requires hardware-driven refresh. The speed of DRAMs, therefore, as buffer memory in network switching, results in valuable time being lost, and it becomes almost impossible to operate the switch or the network at linespeed. Furthermore, external CPU involvement should be avoided, since CPU involvement also makes it almost impossible to operate the switch at linespeed. Additionally, as network switches have become more and more complicated with respect to requiring rules tables and memory control, a complex multi-chip solution is necessary which requires logic circuitry, sometimes referred to as glue logic circuitry, to enable the various chips to communicate with each other. Additionally, cost/benefit tradeoffs are necessary with respect to expensive but fast SRAMs versus inexpensive but slow DRAMs. Additionally, DRAMs, by virtue of their dynamic nature, require refreshing of the memory contents in order to prevent losses thereof. SRAMs do not suffer from the refresh requirement, and have reduced operational overhead which compared to DRAMs such as elimination of page misses, etc. Although DRAMs have adequate speed when accessing locations on the same page, speed is reduced when other pages must be accessed.

Referring to the OSI 7-layer reference model discussed previously, and illustrated in FIG. 7, the higher layers typically have more information. Various types of products are available for performing switching-related functions at various levels of the OSI model. Hubs or repeaters operate at layer one, and essentially copy and “broadcast” incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the “spanning tree” algorithm to eliminate potential data loops; a data loop is a situation wherein a packet endlessly loops in a network looking for a particular address. The spanning tree algorithm defines a protocol for preventing data loops. Layer three switches, sometimes referred to as routers, can forward packets based upon the destination network address. Layer three switches are capable of learning addresses and maintaining tables thereof which correspond to port mappings. Processing speed for layer three switches can be improved by utilizing specialized high performance hardware, and off loading the host CPU so that instruction decisions do not delay packet forwarding.

SUMMARY OF THE INVENTION

A network switch according to the invention includes a data port for communicating with a data network, and a statistics counter coupled to the data port for monitoring operational parameters associated with the data port. The statistics counter includes statistics registers therein. A statistics gathering circuit is connected to the statistics counter for reading the statistics registers, and for transmitting the data from the statistics registers to a remote system memory. A method of monitoring port activity in the network switch according to the invention includes storing port activity data in a statistics register on a network switch, then reading the port activity data with the statistics gathering circuit. The port activity data is transmitted directly to the remote system memory, thereby reconstructing the statistics register in the remote system memory. The remote system memory can then be accessed via a remote CPU to read the reconstructed statistics register.

The invention also includes a network switch for processing packets, with the network switch including a data port for transmitting and receiving packets over a data network, and a tag insertion unit for inserting a stack-specific tag into a packet. A processing unit processes the packet in a stack of network switches in accordance with tag information in the stack-specific tag. A removing unit removes the stack-specific tag from the packet when the packet is being switched to a destination port. A statistics counter is connected to the data port for monitoring operational parameters associated with the data port. The statistics counter includes statistics registers therein. A statistics gathering circuit is connected to the statistics counter for reading the statistics registers, and for directly transmitting data from the statistics registers to a remote system memory.

The invention is also directed to a method of handling packets in a network switch. The method comprises the steps of inserting a stack-specific tag into an incoming packet, then processing the incoming packet in a stack of network switches in accordance with tag information in the stack-specific tag. Port activity data relating to a data port receiving the incoming packet is stored in a statistics register on the network switch. The port activity data is read with a statistics gathering unit. The port activity data is then transmitted directly to a remote system memory, thereby reconstructing the statistic register in the remote system memory. The remote system memory is then accessed with a remote CPU to read the reconstructed statistics register.

BRIEF DESCRIPTION OF THE DRAWINGS

The objects and features of the invention will be more readily understood with reference to the following description and the attached drawings, wherein:

FIG. 5 illustrates P-channel message types;

FIG. 6 illustrates a message format for S channel message types;

FIG. 11 illustrates the CBM cell format;

FIGS. 27A–27D illustrate ARL tables after addresses have been learned;

FIGS. 32A–32D illustrate ARL tables after address learning in a duplex configuration;

FIGS. 34A–34D illustrate ARL tables after address learning;

FIG. 36 illustrates an example of trunk group table initialization for the trunking configuration of FIG. 31;

FIG. 37 illustrates an example of trunk group table initialization for the trunking configuration of FIG. 33;

DETAILED DESCRIPTION OF THE PREFERRED EMBODIMENTS

Figure 1:
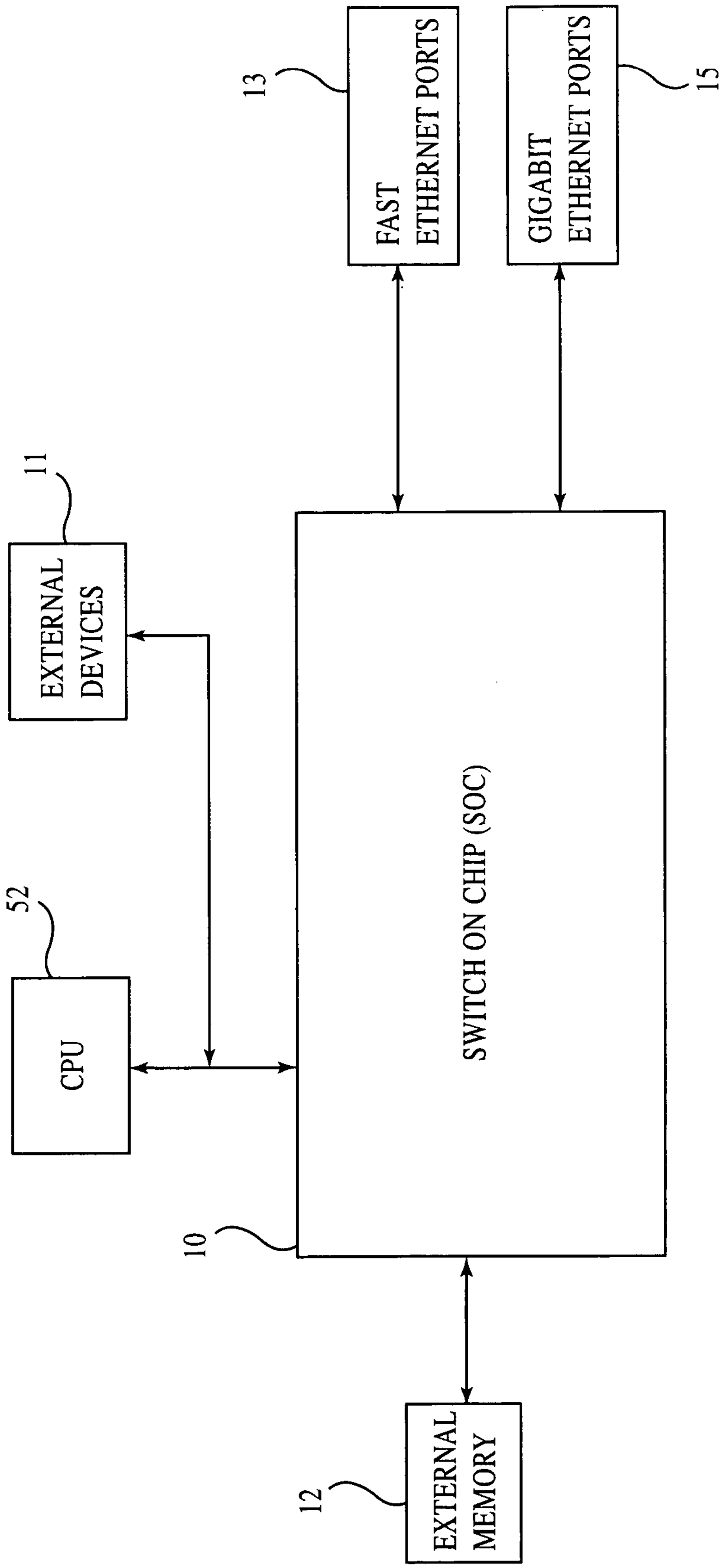
FIG. 1 is a general block diagram of elements of the present invention.

FIG. 1 illustrates a configuration wherein a switch-on-chip (SOC) 10, in accordance with the present invention, is functionally connected to external devices 11, external memory 12, fast ethernet ports 13, and gigabit ethernet ports 15. For the purposes of this embodiment, fast ethernet ports 13 will be considered low speed ethernet ports, since they are capable of operating at speeds ranging from 10 Mbps to 100 Mbps, while the gigabit ethernet ports 15, which are high speed ethernet ports, are capable of operating at 1000 Mbps. External devices 11 could include other switching devices for expanding switching capabilities, or other devices as may be required by a particular application. External memory 12 is additional off-chip memory, which is in addition to internal memory which is located on SOC 10, as will be discussed below. CPU 52 can be used as necessary to program SOC 10 with rules which are appropriate to control packet processing. However, once SOC 10 is appropriately programmed or configured, SOC 10 operates, as much as possible, in a free running manner without communicating with CPU 52. Because CPU 52 does not control every aspect of the operation of SOC 10, CPU 52 performance requirements, at least with respect to SOC 10, are fairly low. A less powerful and therefore less expensive CPU 52 can therefore be used when compared to known network switches. As also will be discussed below, SOC 10 utilizes external memory 12 in an efficient manner so that the cost and performance requirements of memory 12 can be reduced. Internal memory on SOC 10, as will be discussed below, is also configured to maximize switching throughput and minimize costs.

It should be noted that any number of fast ethernet ports 13 and gigabit ethernet ports 15 can be provided. In one embodiment, a maximum of 24 fast ethernet ports 13 and 2 gigabit ports 15 can be provided. Similarly, additional interconnect links to additional external devices 11, external memory 12, and CPUs 52 may be provided as necessary.

Figure 2:
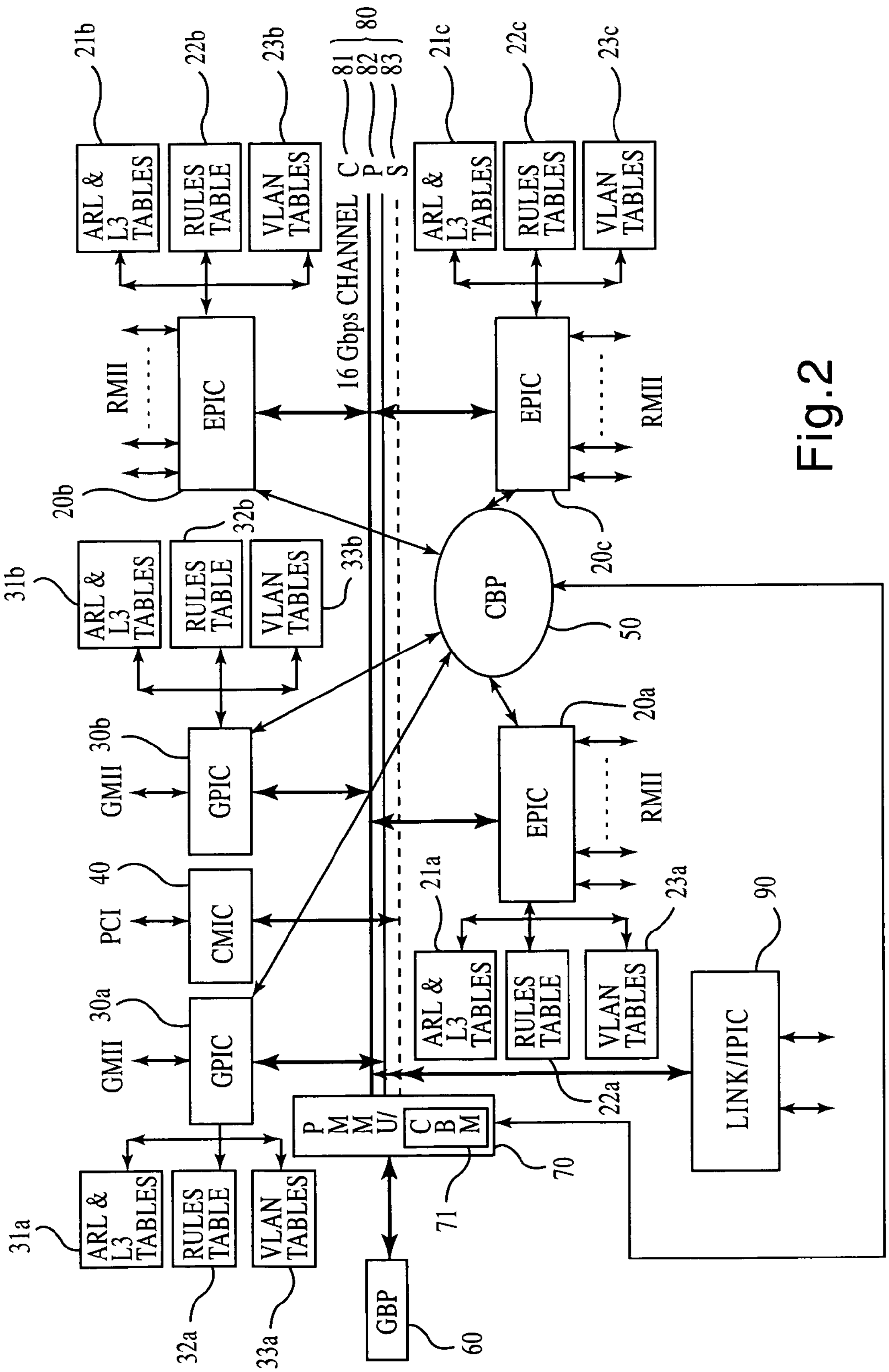
FIG. 2 is a more detailed block diagram of a network switch according to the present invention.

FIG. 2 illustrates a more detailed block diagram of the functional elements of SOC 10. As evident from FIG. 2 and as noted above, SOC 10 includes a plurality of modular systems on-chip, with each modular system, although being on the same chip, being functionally separate from other modular systems. Therefore, each module can efficiently operate in parallel with other modules, and this configuration enables a significant amount of freedom in updating and re-engineering SOC 10.

SOC 10 includes a plurality of Ethernet Port Interface Controllers (EPIC) 20*a*, 20*b*, 20*c*, etc., a plurality of Gigabit Port Interface Controllers (GPIC) 30*a*, 30*b*, etc., a CPU Management Interface Controller (CMIC) 40, a Common Buffer Memory Pool (CBP) 50, a Pipelined Memory Management Unit (PMMU) 70, including a Common Buffer Manager (CBM) 71, and a system-wide bus structure referred to as CPS channel 80. The PMMU 70 communicates with external memory 12, which includes a Global Buffer Memory Pool (GBP) 60. The CPS channel 80 comprises C channel 81, P channel 82, and S channel 83. The CPS channel is also referred to as the Cell Protocol Sideband Channel, and is a 17 Gbps channel which glues or interconnects the various modules together. As also illustrated in FIG. 2, other high speed interconnects can be provided, as shown as an extendible high speed interconnect. In one embodiment of the invention, this interconnect can be in the form of an interconnect port interface controller (IPIC) 90, which is capable of interfacing CPS channel 80 to external devices 11 through an extendible high speed interconnect link. As will be discussed below, each EPIC 20*a*, 20*b*, and 20*c*, generally referred to as EPIC 20, and GPIC 30*a* and 30*b*, generally referred to as GPIC 30, are closely interrelated with appropriate address resolution logic and layer three switching tables 21*a*, 21*b*, 21*c*, 31*a*, 31*b*, rules tables 22*a*, 22*b*, 22*c*, 31*a*, 31*b*, and VLAN tables 23*a*, 23*b*, 23*c*, 31*a*, 31*b*. These tables will be generally referred to as 21, 31, 22, 32, 23, 33, respectively. These tables, like other tables on SOC 10, are implemented in silicon as two-dimensional arrays.

In a preferred embodiment of the invention, each EPIC 20 supports 8 fast ethernet ports 13, and switches packets to and/or from these ports as may be appropriate. The ports, therefore, are connected to the network medium (coaxial, twisted pair, fiber, etc.) using known media connection technology, and communicates with the CPS channel 80 on the other side thereof. The interface of each EPIC 20 to the network medium can be provided through a Reduced Media Internal Interface (RMII), which enables the direct medium connection to SOC 10. As is known in the art, auto-negotiation is an aspect of fast ethernet, wherein the network is capable of negotiating a highest communication speed between a source and a destination based on the capabilities of the respective devices. The communication speed can vary, as noted previously, between 10 Mbps and 100 Mbps; auto-negotiation capability, therefore, is built directly into each EPIC module. The address resolution logic (ARL) and layer three tables (ARL/L3) 21*a*, 21*b*, 21*c*, rules table 22*a*, 22*b*, 22*c*, and VLAN tables 23*a*, 23*b*, and 23*c* are configured to be part of or interface with the associated EPIC in an efficient and expedient manner, also to support wirespeed packet flow.

Each EPIC 20 has separate ingress and egress functions. On the ingress side, self-initiated and CPU-initiated learning of level 2 address information can occur. Address resolution logic (ARL) is utilized to assist in this task. Address aging is built in as a feature, in order to eliminate the storage of address information which is no longer valid or useful. The EPIC also carries out layer 2 mirroring. A fast filtering processor (FFP) 141 (see FIG. 14) is incorporated into the EPIC, in order to accelerate packet forwarding and enhance packet flow. The ingress side of each EPIC and GPIC, illustrated in FIG. 8 as ingress submodule 14, has a significant amount of complexity to be able to properly process a significant number of different types of packets which may come in to the port, for linespeed buffering and then appropriate transfer to the egress. Functionally, each port on each module of SOC 10 has a separate ingress submodule 14 associated therewith. From an implementation perspective, however, in order to minimize the amount of hardware implemented on the single-chip SOC 10, common hardware elements in the silicon will be used to implement a plurality of ingress submodules on each particular module. The configuration of SOC 10 discussed herein enables concurrent lookups and filtering, and therefore, processing of up to 6.6 million packets per second. Layer two lookups, Layer three lookups and filtering occur simultaneously to achieve this level of performance. On the egress side, the EPIC is capable of supporting packet polling based either as an egress management or class of service (COS) function. Rerouting/scheduling of packets to be transmitted can occur, as well as head-of-line (HOL) blocking notification, packet aging, cell reassembly, and other functions associated with ethernet port interface.

Each GPIC 30 is similar to each EPIC 20, but supports only one gigabit ethernet port, and utilizes a port-specific ARL table, rather than utilizing an ARL table which is shared with any other ports. Additionally, instead of an RMII, each GPIC port interfaces to the network medium utilizing a gigabit media independent interface (GMII).

CMIC 40 acts as a gateway between the SOC 10 and the host CPU. The communication can be, for example, along a PCI bus, or other acceptable communications bus. CMIC 40 can provide sequential direct mapped accesses between the host CPU 52 and the SOC 10. CPU 52, through the CMIC 40, will be able to access numerous resources on SOC 10, including MIB counters, programmable registers, status and control registers, configuration registers, ARL tables, port-based VLAN tables, IEEE 802.1q VLAN tables, layer three tables, rules tables, CBP address and data memory, as well as GBP address and data memory. Optionally, the CMIC 40 can include DMA support, DMA chaining and scatter-gather, as well as master and target PCI64.

Common buffer memory pool or CBP 50 can be considered to be the on-chip data memory. In one embodiment of the invention, the CBP 50 is first level high speed SRAM memory, to maximize performance and minimize hardware overhead requirements. The CBP can have a size of, for example, 720 kilobytes running at 132 MHz. Packets stored in the CBP 50 are typically stored as cells, rather than packets. As illustrated in the figure, PMMU 70 also contains the Common Buffer Manager (CBM) 71 thereupon. CBM 71 handles queue management, and is responsible for assigning cell pointers to incoming cells, as well as assigning common packet IDs (CPID) once the packet is fully written into the CBP. CBM 71 can also handle management of the on-chip free address pointer pool, control actual data transfers to and from the data pool, and provide memory budget management.

Global memory buffer pool or GBP 60 acts as a second level memory, and can be located on-chip or off chip. In the preferred embodiment, GBP 60 is located off chip with respect to SOC 10. When located off-chip, GBP 60 is considered to be a part of or all of external memory 12. As a second level memory, the GBP does not need to be expensive high speed SRAMs, and can be a slower less expensive memory such as DRAM. The GBP is tightly coupled to the PMMU 70, and operates like the CBP in that packets are stored as cells. For broadcast and multicast messages, only one copy of the packet is stored in GBP 60.

As shown in the figure, PMMU 70 is located between GBP 60 and CPS channel 80, and acts as an external memory interface. In order to optimize memory utilization, PMMU 70 includes multiple read and write buffers, and supports numerous functions including global queue management, which broadly includes assignment of cell pointers for rerouted incoming packets, maintenance of the global FAP, time-optimized cell management, global memory budget management, GPID assignment and egress manager notification, write buffer management, read prefetches based upon egress manager/class of service, requests, and smart memory control.

As shown in FIG. 2, the CPS channel 80 is actually three separate channels, referred to as the C-channel, the P-channel, and the S-channel. The C-channel is 128 bits wide, and runs at 132 MHz. Packet transfers between ports occur on the C-channel. Since this channel is used solely for data transfer, there is no overhead associated with its use. The P-channel or protocol channel is synchronous or locked with the C-channel. During cell transfers, the message header is sent via the P-channel by the PMMU. The P-channel is 32 bits wide, and runs at 132 MHz.

The S or sideband channel runs at 132 MHz, and is 32 bits wide. The S-channel is used for functions such as for conveying Port Link Status, receive port full, port statistics, ARL table synchronization, memory and register access to CPU and other CPU management functions, and global memory full and common memory full notification.

Figure 3:
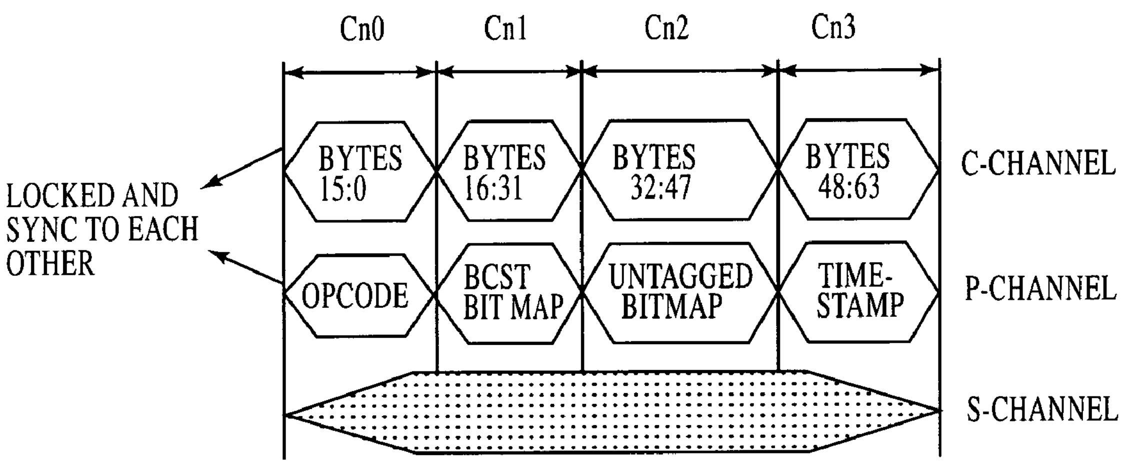
FIG. 3 illustrates the data flow on the CPS channel of a network switch according to the present invention.

A proper understanding of the operation of SOC 10 requires a proper understanding of the operation of CPS channel 80. Referring to FIG. 3, it can be seen that in SOC 10, on the ingress, packets are sliced by an EPIC 20 or GPIC 30 into 64-byte cells. The use of cells on-chip instead of packets makes it easier to adapt the SOC to work with cell based protocols such as, for example, Asynchronous Transfer Mode (ATM). Presently, however, ATM utilizes cells which are 53 bytes long, with 48 bytes for payload and 5 bytes for header. In the SOC, incoming packets are sliced into cells which are 64 bytes long as discussed above, and the cells are further divided into four separate 16 byte cell blocks Cn0 . . . Cn3. Locked with the C-channel is the P-channel, which locks the opcode in synchronization with Cn0. A port bit map is inserted into the P-channel during the phase Cn1. The untagged bit map is inserted into the P-channel during phase Cn2, and a time stamp is placed on the P-channel in Cn3. Independent from occurrences on the C and P-channel, the S-channel is used as a sideband, and is therefore decoupled from activities on the C and P-channel.

Cell or C-Channel

Figure 4A:
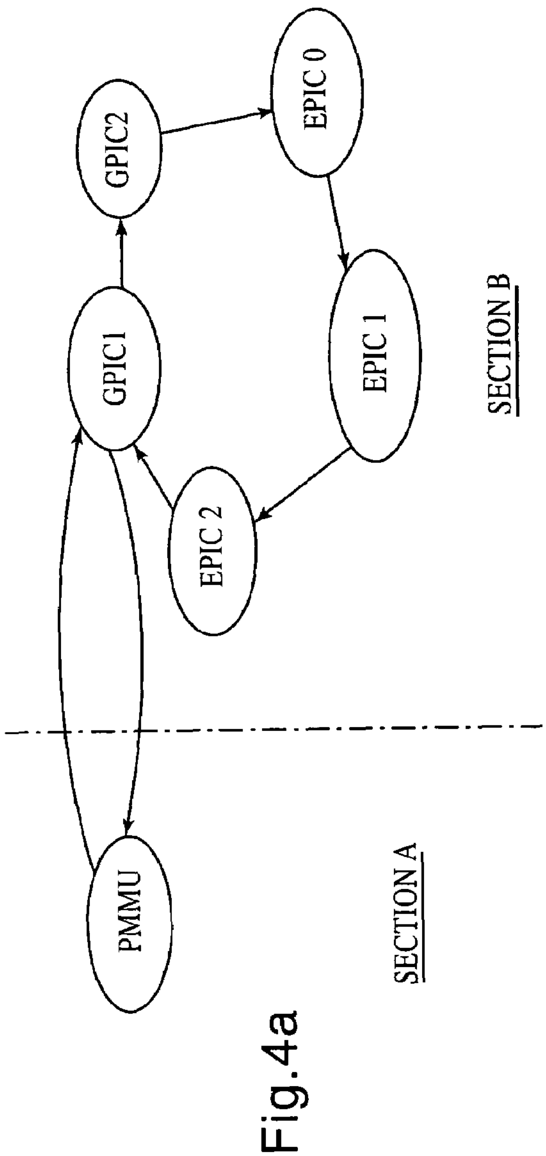
FIG. 4A illustrates demand priority round robin arbitration for access to the C-channel of the network switch.
Figure 4B:
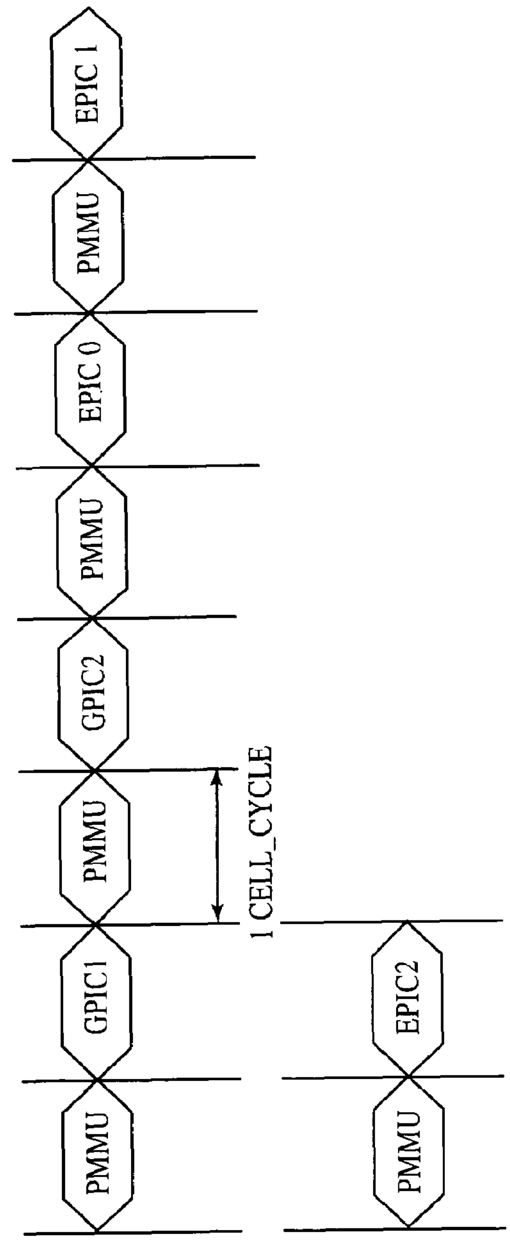
FIG. 4B illustrates access to the C-channel based upon the round robin arbitration illustrated in FIG. 4A.
Figure 7:
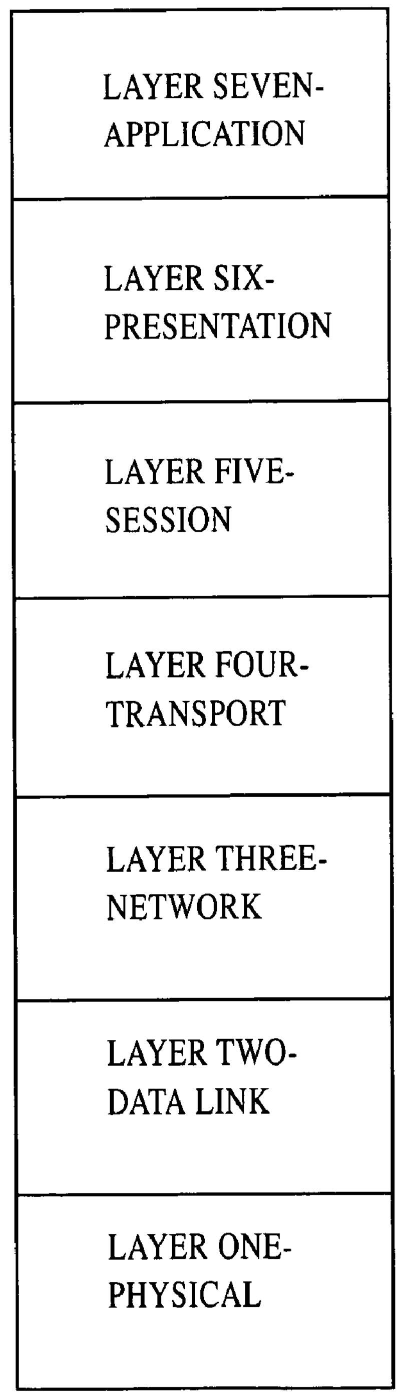
FIG. 7 is an illustration of the OSI 7 layer reference model.

Arbitration for the CPS channel occurs out of band. Every module (EPIC, GPIC, etc.) monitors the channel, and matching destination ports respond to appropriate transactions. C-channel arbitration is a demand priority round robin arbitration mechanism. If no requests are active, however, the default module, which can be selected during the configuration of SOC 10, can park on the channel and have complete access thereto. If all requests are active, the configuration of SOC 10 is such that the PMMU is granted access every other cell cycle, and EPICs 20 and GPICs 30 share equal access to the C-channel on a round robin basis. FIGS. 4A and 4B illustrate a C-channel arbitration mechanism wherein section A is the PMMU, and section B consists of two GPICs and three EPICs. The sections alternate access, and since the PMMU is the only module in section A, it gains access every other cycle. The modules in section B, as noted previously, obtain access on a round robin basis.

Protocol or P-Channel

Referring once again to the protocol or P-channel, a plurality of messages can be placed on the P-channel in order to properly direct flow of data flowing on the C-channel. Since P-channel 82 is 32 bits wide, and a message typically requires 128 bits, four smaller 32 bit messages are put together in order to form a complete P-channel message. The following list identifies the fields and function and the various bit counts of the 128 bit message on the P-channel.

Opcode—2 bits long—Identifies the type of message present on the C channel 81;

IP Bit—1 bit long—This bit is set to indicate that the packet is an IP switched packet;

IPX Bit—1 bit long—This bit is set to indicate that the packet is an IPX switched packet;

Next Cell—2 bits long—A series of values to identify the valid bytes in the corresponding cell on the C channel 81;

SRC DEST Port—6 bits long—Defines the port number which sends the message or receives the message, with the interpretation of the source or destination depending upon Opcode;

Cos—3 bits long—Defines class of service for the current packet being processed;

J—1 bit long—Describes whether the current packet is a jumbo packet;

S—1 bit long—Indicates whether the current cell is the first cell of the packet;

E—1 bit long—Indicates whether the current cell is the last cell of the packet;

CRC—2 bits long—Indicates whether a Cyclical Redundancy Check (CRC) value should be appended to the packet and whether a CRC value should be regenerated;

P Bit—1 bit long—Determines whether MMU should Purge the entire packet;

Len—7 bytes—Identifies the valid number of bytes in current transfer;

O—2 bits—Defines an optimization for processing by the CPU 52; and

Bc/Mc Bitmap—28 bits—Defines the broadcast or multicast bitmap. Identifies egress ports to which the packet should be set, regarding multicast and broadcast messages.

Untag Bits/Source Port—28/5 bits long—Depending upon Opcode, the packet is transferred from Port to MMU, and this field is interpreted as the untagged bit map. A different Opcode selection indicates that the packet is being transferred from MMU to egress port, and the last six bits of this field is interpreted as the Source Port field. The untagged bits identifies the egress ports which will strip the tag header, and the source port bits identifies the port number upon which the packet has entered the switch;

U Bit—1 bit long—For a particular Opcode selection (0×01, this bit being set indicates that the packet should leave the port as Untagged; in this case, tag stripping is performed by the appropriate MAC; CPU Opcode—18 bits long—These bits are set if the packet is being sent to the CPU for any reason. Opcodes are defined based upon filter match, learn bits being set, routing bits, destination lookup failure (DLF), station movement, etc;

Time Stamp—14 bits—The system puts a time stamp in this field when the packet arrives, with a granularity of 1 μsec.

The opcode field of the P-channel message defines the type of message currently being sent. While the opcode is currently shown as having a width of 2 bits, the opcode field can be widened as desired to account for new types of messages as may be defined in the future. Graphically, however, the P-channel message type defined above is shown in FIG. 5.

An early termination message is used to indicate to CBM 71 that the current packet is to be terminated. During operation, as discussed in more detail below, the status bit (S) field in the message is set to indicate the desire to purge the current packet from memory. Also in response to the status bit all applicable egress ports would purge the current packet prior to transmission.

The Src Dest Port field of the P-channel message, as stated above, define the destination and source port addresses, respectively. Each field is 6 bits wide and therefore allows for the addressing of sixty-four ports.

The CRC field of the message is two bits wide and defines CRC actions. Bit 0 of the field provides an indication whether the associated egress port should append a CRC to the current packet. An egress port would append a CRC to the current packet when bit 0 of the CRC field is set to a logical one. Bit 1 of the CRC field provides an indication whether the associated egress port should regenerate a CRC for the current packet. An egress port would regenerate a CRC when bit 1 of the CRC field is set to a logical one. The CRC field is only valid for the last cell transmitted as defined by the E bit field of P-channel message set to a logical one.

As with the CRC field, the status bit field (st), the Len field, and the Cell Count field of the message are only valid for the last cell of a packet being transmitted as defined by the E bit field of the message.

Last, the time stamp field of the message has a resolution of 1 μs and is valid only for the first cell of the packet defined by the S bit field of the message. A cell is defined as the first cell of a received packet when the S bit field of the message is set to a logical one value.

As is described in more detail below, the C channel 81 and the P channel 82 are synchronously tied together such that data on C channel 81 is transmitted over the CPS channel 80 while a corresponding P channel message is simultaneously transmitted.

S-Channel or Sideband Channel

The S channel 83 is a 32-bit wide channel which provides a separate communication path within the SOC 10. The S channel 83 is used for management by CPU 52, SOC 10 internal flow control, and SOC 10 inter-module messaging. The S channel 83 is a sideband channel of the CPS channel 80, and is electrically and physically isolated from the C channel 81 and the P channel 82. It is important to note that since the S channel is separate and distinct from the C channel 81 and the P channel 82, operation of the S channel 83 can continue without performance degradation related to the C channel 81 and P channel 82 operation. Conversely, since the C channel is not used for the transmission of system messages, but rather only data, there is no overhead associated with the C channel 81 and, thus, the C channel 81 is able to free-run as needed to handle incoming and outgoing packet information.

The S channel 83 of CPS channel 80 provides a system wide communication path for transmitting system messages, for example, providing the CPU 52 with access to the control structure of the SOC 10. System messages include port status information, including port link status, receive port full, and port statistics, ARL table 22 synchronization, CPU 52 access to GBP 60 and CBP 50 memory buffers and SOC 10 control registers, and memory full notification corresponding to GBP 60 and/or CBP 50.

FIG. 6 illustrates a message format for an S channel message on S channel 83. The message is formed of four 32-bit words; the bits of the fields of the words are defined as follows:

Opcode—6 bits long—Identifies the type of message present on the S channel;

Dest Port—6 bits long—Defines the port number to which the current S channel message is addressed;

Src Port—6 bits long—Defines the port number of which the current S channel message originated;

COS—3 bits long—Defines the class of service associated with the current S channel message; and C bit—1 bit long—Logically defines whether the current S channel message is intended for the CPU 52.

Error Code—2 bits long—Defines a valid error when the E bit is set;

DataLen—7 bits long—Defines the total number of data bytes in the Data field;

E bit—1 bit long—Logically indicates whether an error has occurred in the execution of the current command as defined by opcode;

Address—32 bits long—Defines the memory address associated with the current command as defined in opcode;

Data——127 bits long—Contains the data associated with the current opcode.

With the configuration of CPS channel 80 as explained above, the decoupling of the S channel from the C channel and the P channel is such that the bandwidth on the C channel can be preserved for cell transfer, and that overloading of the C channel does not affect communications on the sideband channel.

SOC Operation

The configuration of the SOC 10 supports fast ethernet ports, gigabit ports, and extendible interconnect links as discussed above. The SOC configuration can also be "stacked", thereby enabling significant port expansion capability. Once data packets have been received by SOC 10, sliced into cells, and placed on CPS channel 80, stacked SOC modules can interface with the CPS channel and monitor the channel, and extract appropriate information as necessary. As will be discussed below, a significant amount of concurrent lookups and filtering occurs as the packet comes in to ingress submodule 14 of an EPIC 20 or GPIC 30, with respect to layer two and layer three lookups, and fast filtering.

Figure 8:
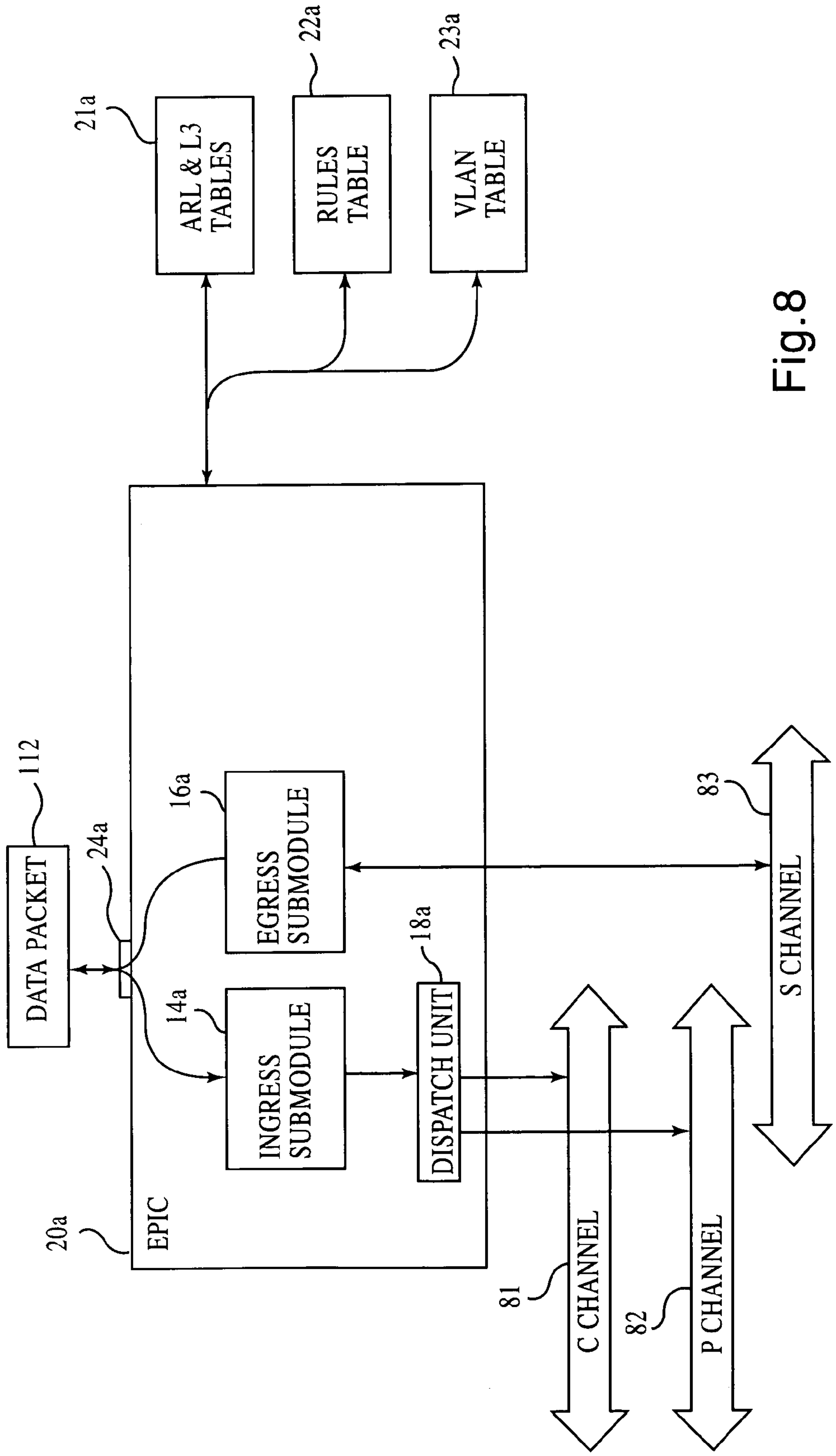
FIG. 8 illustrates an operational diagram of an EPIC module.
Figure 9:
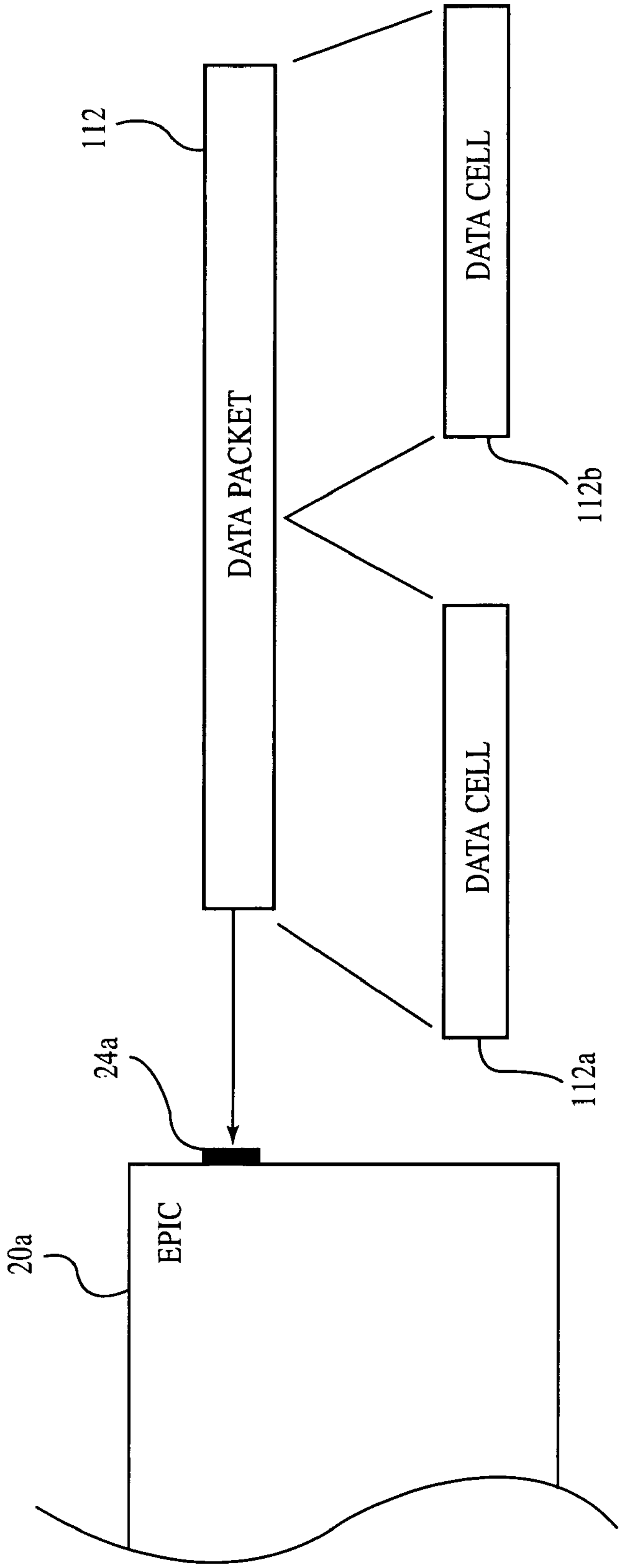
FIG. 9 illustrates the slicing of a data packet on the ingress to an EPIC module.

Now referring to FIGS. 8 and 9, the handling of a data packet is described. For explanation purposes, ethernet data to be received will consider to arrive at one of the ports 24*a* of EPIC 20*a*. It will be presumed that the packet is intended to be transmitted to a user on one of ports 24*c* of EPIC 20*c*. All EPICs 20 (20*a*, 20*b*, 20*c*, etc.) have similar features and functions, and each individually operate based on packet flow.

An input data packet 112 is applied to the port 24*a* is shown. The data packet 112 is, in this example, defined per the current standards for 10/100 Mbps Ethernet transmission and may have any length or structure as defined by that standard. This discussion will assume the length of the data packet 112 to be 1024 bits or 128 bytes.

When the data packet 112 is received by the EPIC module 20*a*, an ingress sub-module 14*a*, as an ingress function, determines the destination of the packet 112. The first 64 bytes of the data packet 112 is buffered by the ingress sub-module 14*a* and compared to data stored in the lookup tables 21*a* to determine the destination port 24*c*. Also as an ingress function, the ingress sub-module 14*a* slices the data packet 112 into a number of 64-byte cells; in this case, the 128 byte packet is sliced in two 64 byte cells 112*a* and 112*b*. While the data packet 112 is shown in this example to be exactly two 64-byte cells 112*a* and 112*b*, an actual incoming data packet may include any number of cells, with at least one cell of a length less than 64 bytes. Padding bytes are used to fill the cell. In such cases the ingress sub-module 14*a* disregards the padding bytes within the cell. Further discussions of packet handling will refer to packet 112 and/or cells 112*a* and 112*b*.

It should be noted that each EPIC 20 (as well as each GPIC 30) has an ingress submodule 14 and egress submodule 16, which provide port specific ingress and egress functions. All incoming packet processing occurs in ingress submodule 14, and features such as the fast filtering processor, layer two (L2) and layer three (L3) lookups, layer two learning, both self-initiated and CPU 52 initiated, layer two table management, layer two switching, packet slicing, and channel dispatching occurs in ingress submodule 14. After lookups, fast filter processing, and slicing into cells, as noted above and as will be discussed below, the packet is placed from ingress submodule 14 into dispatch unit 18, and then placed onto CPS channel 80 and memory management is handled by PMMU 70. A number of ingress buffers are provided in dispatch unit 18 to ensure proper handling of the packets/cells. Once the cells or cellularized packets are placed onto the CPS channel 80, the ingress submodule is finished with the packet. The ingress is not involved with dynamic memory allocation, or the specific path the cells will take toward the destination. Egress submodule 16, illustrated in FIG. 8 as submodule 16*a* of EPIC 20*a*, monitors CPS channel 80 and continuously looks for cells destined for a port of that particular EPIC 20. When the PMMU 70 receives a signal that an egress associated with a destination of a packet in memory is ready to receive cells, PMMU 70 pulls the cells associated with the packet out of the memory, as will be discussed below, and places the cells on CPS channel 80, destined for the appropriate egress submodule. A FIFO in the egress submodule 16 continuously sends a signal onto the CPS channel 80 that it is ready to receive packets, when there is room in the FIFO for packets or cells to be received. As noted previously, the CPS channel 80 is configured to handle cells, but cells of a particular packet are always handled together to avoid corrupting of packets.

In order to overcome data flow degradation problems associated with overhead usage of the C channel 81, all L2 learning and L2 table management is achieved through the use of the S channel 83. L2 self-initiated learning is achieved by deciphering the source address of a user at a given ingress port 24 utilizing the packet's associated address. Once the identity of the user at the ingress port 24 is determined, the ARL/L3 tables 21*a* are updated to reflect the user identification. The ARL/L3 tables 21 of each other EPIC 20 and GPIC 30 are updated to reflect the newly acquired user identification in a synchronizing step, as will be discussed below. As a result, while the ingress of EPIC 20*a* may determine that a given user is at a given port 24*a*, the egress of EPIC 20*b*, whose table 21*b* has been updated with the user's identification at port 24*a*, can then provide information to the User at port 24*a* without re-learning which port the user was connected.

Table management may also be achieved through the use of the CPU 52. CPU 52, via the CMIC 40, can provide the SOC 10 with software functions which result in the designation of the identification of a user at a given port 24. As discussed above, it is undesirable for the CPU 52 to access the packet information in its entirety since this would lead to performance degradation. Rather, the SOC 10 is programmed by the CPU 52 with identification information concerning the user. The SOC 10 can maintain real-time data flow since the table data communication between the CPU 52 and the SOC 10 occurs exclusively on the S channel 83. While the SOC 10 can provide the CPU 52 with direct packet information via the C channel 81, such a system setup is undesirable for the reasons set forth above. As stated above, as an ingress function an address resolution lookup is performed by examining the ARL table 21*a*. If the packet is addressed to one of the layer three (L3) switches of the SOC 10, then the ingress sub-module 14*a* performs the L3 and default table lookup. Once the destination port has been determined, the EPIC 20*a* sets a ready flag in the dispatch unit 18*a* which then arbitrates for C channel 81.

The C channel 81 arbitration scheme, as discussed previously and as illustrated in FIGS. 4A and 4B, is Demand Priority Round-Robin. Each I/O module, EPIC 20, GPIC 30, and CMIC 40, along with the PMMU 70, can initiate a request for C channel access. If no requests exist at any one given time, a default module established with a high priority gets complete access to the C channel 81. If any one single I/O module or the PMMU 70 requests C channel 81 access, that single module gains access to the C channel 81 on-demand.

If EPIC modules 20*a*, 20*b*, 20*c*, and GPIC modules 30*a* and 30*b*, and CMIC 40 simultaneously request C channel access, then access is granted in round-robin fashion. For a given arbitration time period each of the I/O modules would be provided access to the C channel 81. For example, each GPIC module 30*a* and 30*b* would be granted access, followed by the EPIC modules, and finally the CMIC 40. After every arbitration time period the next I/O module with a valid request would be given access to the C channel 81. This pattern would continue as long as each of the I/O modules provide an active C channel 81 access request.

If all the I/O modules, including the PMMU 70, request C channel 81 access, the PMMU 70 is granted access as shown in FIG. 4B since the PMMU provides a critical data path for all modules on the switch. Upon gaining access to the channel 81, the dispatch unit 18*a* proceeds in passing the received packet 112, one cell at a time, to C channel 81.

Referring again to FIG. 3, the individual C, P, and S channels of the CPS channel 80 are shown. Once the dispatch unit 18*a* has been given permission to access the CPS channel 80, during the first time period Cn0, the dispatch unit 18*a* places the first 16 bytes of the first cell 112*a* of the received packet 112 on the C channel 81. Concurrently, the dispatch unit 18*a* places the first P channel message corresponding to the currently transmitted cell. As stated above, the first P channel message defines, among other things, the message type. Therefore, this example is such that the first P channel message would define the current cell as being a unicast type message to be directed to the destination egress port 21*c*.

During the second clock cycle Cn1, the second 16 bytes (16:31) of the currently transmitted data cell 112*a* are placed on the C channel 81. Likewise, during the second clock cycle Cn1, the Bc/Mc Port Bitmap is placed on the P channel 82.

As indicated by the hatching of the S channel 83 data during the time periods Cn0 to Cn3 in FIG. 3, the operation of the S channel 83 is decoupled from the operation of the C channel 81 and the P channel 82. For example, the CPU 52, via the CMIC 40, can pass system level messages to non-active modules while an active module passes cells on the C channel 81. As previously stated, this is an important aspect of the SOC 10 since the S channel operation allows parallel task processing, permitting the transmission of cell data on the C channel 81 in real-time. Once the first cell 112*a* of the incoming packet 112 is placed on the CPS channel 80 the PMMU 70 determines whether the cell is to be transmitted to an egress port 21 local to the SOC 10.

If the PMMU 70 determines that the current cell 112*a* on the C channel 81 is destined for an egress port of the SOC 10, the PMMU 70 takes control of the cell data flow.

Figure 10:
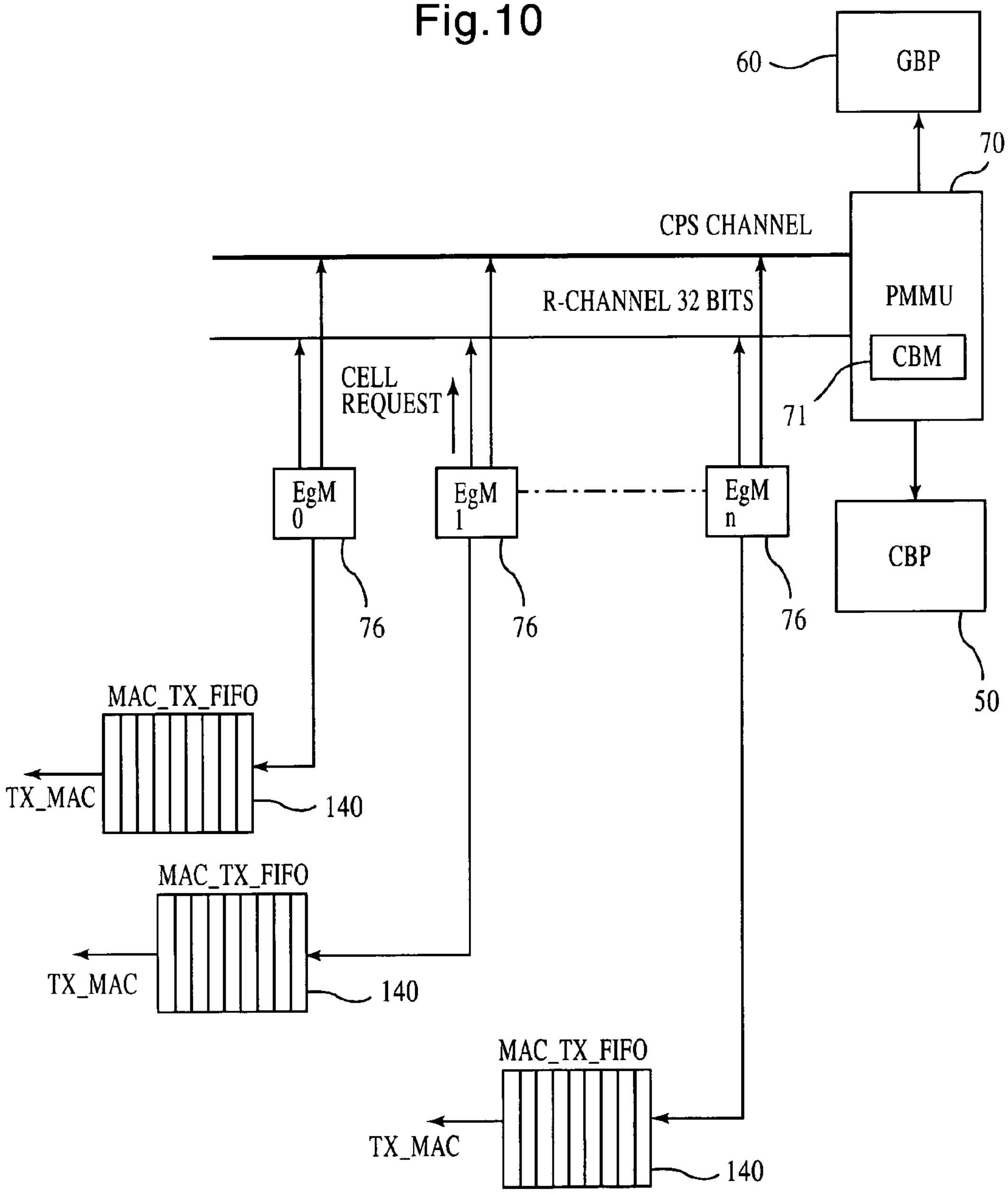
FIG. 10 is a detailed view of elements of the PMMU.

FIG. 10 illustrates, in more detail, the functional egress aspects of PMMU 70. PMMU 70 includes CBM 71, and interfaces between the GBP, CBP and a plurality of egress managers (EgM) 76 of egress submodule 18, with one egress manager 76 being provided for each egress port. CBM 71 is connected to each egress manager 76, in a parallel configuration, via R channel data bus 77. R channel data bus 77 is a 32-bit wide bus used by CBM 71 and egress managers 76 in the transmission of memory pointers and system messages. Each egress manager 76 is also connected to CPS channel 80, for the transfer of data cells 112*a* and 112*b*.

CBM 71, in summary, performs the functions of on-chip FAP (free address pool) management, transfer of cells to CBP 50, packet assembly and notification to the respective egress managers, rerouting of packets to GBP 60 via a global buffer manager, as well as handling packet flow from the GBP 60 to CBP 50. Memory clean up, memory budget management, channel interface, and cell pointer assignment are also functions of CBM 71. With respect to the free address pool, CBM 71 manages the free address pool and assigns free cell pointers to incoming cells. The free address pool is also written back by CBM 71, such that the released cell pointers from various egress managers 76 are appropriately cleared. Assuming that there is enough space available in CBP 50, and enough free address pointers available, CBM 71 maintains at least two cell pointers per egress manager 76 which is being managed. The first cell of a packet arrives at an egress manager 76, and CBM 71 writes this cell to the CBM memory allocation at the address pointed to by the first pointer. In the next cell header field, the second pointer is written. The format of the cell as stored in CBP 50 is shown in FIG. 11; each line is 18 bytes wide. Line 0 contains appropriate information with respect to first cell and last cell information, broadcast/multicast, number of egress ports for broadcast or multicast, cell length regarding the number of valid bytes in the cell, the next cell pointer, total cell count in the packet, and time stamp. The remaining lines contain cell data as 64 byte cells. The free address pool within PMMU 70 stores all free pointers for CBP 50. Each pointer in the free address pool points to a 64-byte cell in CBP 50; the actual cell stored in the CBP is a total of 72 bytes, with 64 bytes being byte data, and 8 bytes of control information. Functions such as HOL blocking high and low watermarks, out queue budget registers, CPID assignment, and other functions are handled in CBM 71, as explained herein.

When PMMU 70 determines that cell 112*a* is destined for an appropriate egress port on SOC 10, PMMU 70 controls the cell flow from CPS channel 80 to CBP 50. As the data packet 112 is received at PMMU 70 from CPS 80, CBM 71 determines whether or not sufficient memory is available in CBP 50 for the data packet 112. A free address pool (not shown) can provide storage for at least two cell pointers per egress manager 76, per class of service. If sufficient memory is available in CBP 50 for storage and identification of the incoming data packet, CBM 71 places the data cell information on CPS channel 80. The data cell information is provided by CBM 71 to CBP 50 at the assigned address. As new cells are received by PMMU 70, CBM 71 assigns cell pointers. The initial pointer for the first cell 112*a* points to the egress manager 76 which corresponds to the egress port to which the data packet 112 will be sent after it is placed in memory. In the example of FIG. 8, packets come in to port 24*a* of EPIC 20*a*, and are destined for port 24*c* of EPIC 20*c*. For each additional cell 112*b*, CBM 71 assigns a corresponding pointer. This corresponding cell pointer is stored as a two byte or 16 bit value NC_header, in an appropriate place on a control message, with the initial pointer to the corresponding egress manager 76, and successive cell pointers as part of each cell header, a linked list of memory pointers is formed which defines packet 112 when the packet is transmitted via the appropriate egress port, in this case 24*c*. Once the packet is fully written into CBP 50, a corresponding CBP Packet Identifier (CPID) is provided to the appropriate egress manager 76; this CPID points to the memory location of initial cell 112*a*. The CPID for the data packet is then used when the data packet 112 is sent to the destination egress port 24*c*. In actuality, the CBM 71 maintains two buffers containing a CBP cell pointer, with admission to the CBP being based upon a number of factors. An example of admission logic for CBP 50 will be discussed below with reference to FIG. 12.

Since CBM 71 controls data flow within SOC 10, the data flow associated with any ingress port can likewise be controlled. When packet 112 has been received and stored in CBP 50, a CPID is provided to the associated egress manager 76. The total number of data cells associated with the data packet is stored in a budget register (not shown). As more data packets 112 are received and designated to be sent to the same egress manager 76, the value of the budget register corresponding to the associated egress manager 76 is incremented by the number of data cells 112*a*, 112*b* of the new data cells received. The budget register therefore dynamically represents the total number of cells designated to be sent by any specific egress port on an EPIC 20. CBM 71 controls the inflow of additional data packets by comparing the budget register to a high watermark register value or a low watermark register value, for the same egress.

When the value of the budget register exceeds the high watermark value, the associated ingress port is disabled. Similarly, when data cells of an egress manager 76 are sent via the egress port, and the corresponding budget register decreases to a value below the low watermark value, the ingress port is once again enabled. When egress manager 76 initiates the transmission of packet 112, egress manager 76 notifies CBM 71, which then decrements the budget register value by the number of data cells which are transmitted. The specific high watermark values and low watermark values can be programmed by the user via CPU 52. This gives the user control over the data flow of any port on any EPIC 20 or GPIC 30.

Egress manager 76 is also capable of controlling data flow. Each egress manager 76 is provided with the capability to keep track of packet identification information in a packet pointer budget register; as a new pointer is received by egress manager 76, the associated packet pointer budget register is incremented. As egress manager 76 sends out a data packet 112, the packet pointer budget register is decremented. When a storage limit assigned to the register is reached, corresponding to a full packet identification pool, a notification message is sent to all ingress ports of the SOC 10, indicating that the destination egress port controlled by that egress manager 76 is unavailable. When the packet pointer budget register is decremented below the packet pool high watermark value, a notification message is sent that the destination egress port is now available. The notification messages are sent by CBM 71 on the S channel 83.

As noted previously, flow control may be provided by CBM 71, and also by ingress submodule 14 of either an EPIC 20 or GPIC 30. Ingress submodule 14 monitors cell transmission into ingress port 24. When a data packet 112 is received at an ingress port 24, the ingress submodule 14 increments a received budget register by the cell count of the incoming data packet. When a data packet 112 is sent, the corresponding ingress 14 decrements the received budget register by the cell count of the outgoing data packet 112. The budget register 72 is decremented by ingress 14 in response to a decrement cell count message initiated by CBM 71, when a data packet 112 is successfully transmitted from CBP 50.

Efficient handling of the CBP and GBP is necessary in order to maximize throughput, to prevent port starvation, and to prevent port underrun. For every ingress, there is a low watermark and a high watermark; if cell count is below the low watermark, the packet is admitted to the CBP, thereby preventing port starvation by giving the port an appropriate share of CBP space.

Figure 12:
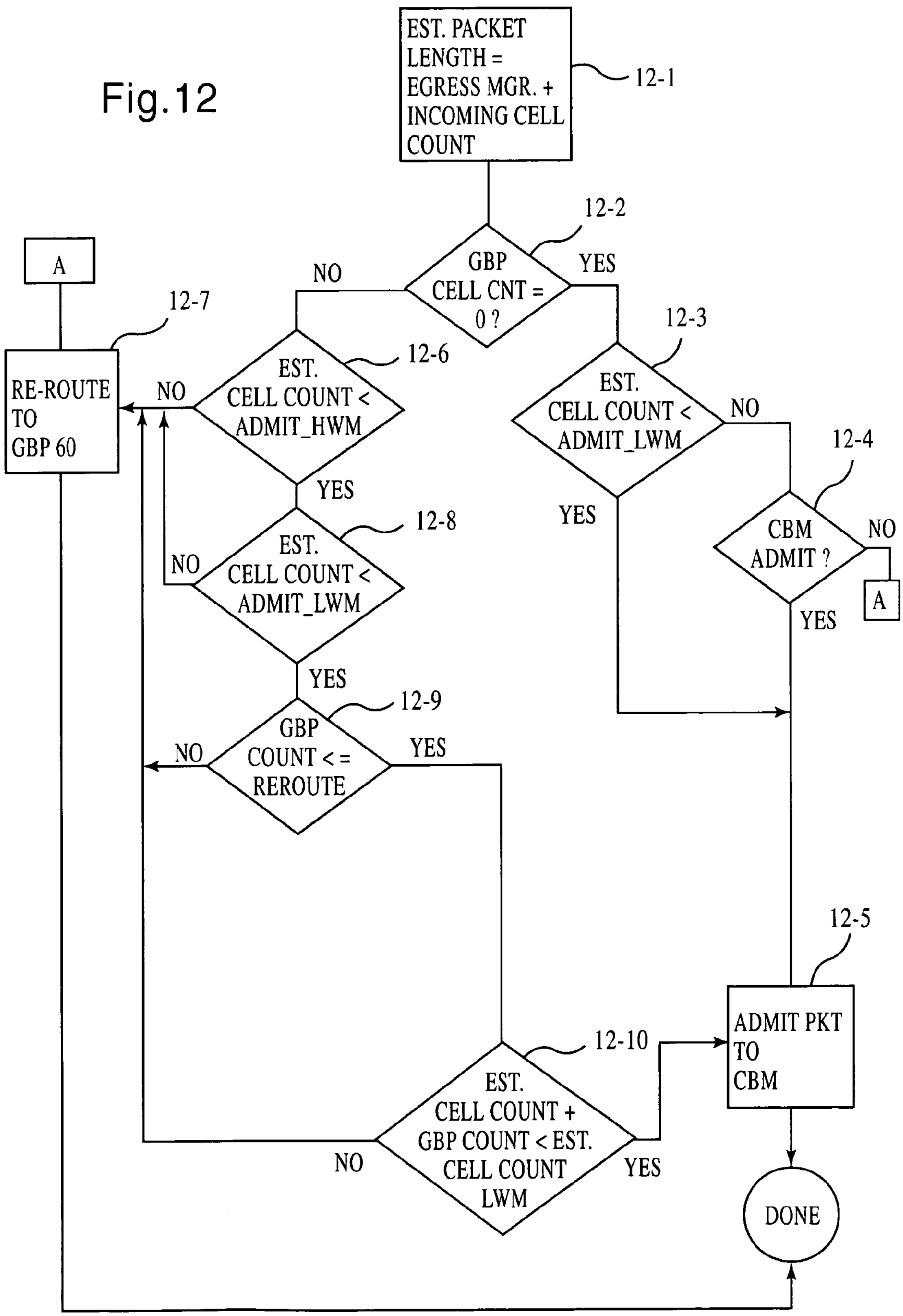
FIG. 12 illustrates an internal/external memory admission flow chart.

FIG. 12 generally illustrates the handling of a data packet 112 when it is received at an appropriate ingress port. This figure illustrates dynamic memory allocation on a single port, and is applicable for each ingress port. In step 12-1, packet length is estimated by estimating cell count based upon egress manager count plus incoming cell count. After this cell count is estimated, the GBP current cell count is checked at step 12-2 to determine whether or not the GBP 60 is empty. If the GBP cell count is 0, indicating that GBP 60 is empty, the method proceeds to step 12-3, where it is determined whether or not the estimated cell count from step 12-1 is less than the admission low watermark. The admission low watermark value enables the reception of new packets 112 into CBP 50 if the total number of cells in the associated egress is below the admission low watermark value. If yes, therefore, the packet is admitted at step 12-5. If the estimated cell count is not below the admission low watermark, CBM 71 then arbitrates for CBP memory allocation with other ingress ports of other EPICs and GPICs, in step 124. If the arbitration is unsuccessful, the incoming packet is sent to a reroute process, referred to as A. If the arbitration is successful, then the packet is admitted to the CBP at step 12-5. Admission to the CBP is necessary for linespeed communication to occur.

The above discussion is directed to a situation wherein the GBP cell count is determined to be 0. If in step 12-2 the GBP cell count is determined not to be 0, then the method proceeds to step 12-6, where the estimated cell count determined in step 12-1 is compared to the admission high watermark. If the answer is no, the packet is rerouted to GBP 60 at step 12-7. If the answer is yes, the estimated cell count is then compared to the admission low watermark at step 12-8. If the answer is no, which means that the estimated cell count is between the high watermark and the low watermark, then the packet is rerouted to GBP 60 at step 12-7. If the estimated cell count is below the admission low watermark, the GBP current count is compared with a reroute cell limit value at step 12-9. This reroute cell limit value is user programmable through CPU 52. If the GBP count is below or equal to the reroute cell limit value at step 12-9, the estimated cell count and GBP count are compared with an estimated cell count low watermark; if the combination of estimated cell count and GBP count are less than the estimated cell count low watermark, the packet is admitted to the CBP. If the sum is greater than the estimated cell count low watermark, then the packet is rerouted to GBP 60 at step 12-7. After rerouting to GBP 60, the GBP cell count is updated, and the packet processing is finished. It should be noted that if both the CBP and the GBP are full, the packet is dropped. Dropped packets are handled in accordance with known ethernet or network communication procedures, and have the effect of delaying communication. However, this configuration applies appropriate back pressure by setting watermarks, through CPU 52, to appropriate buffer values on a per port basis to maximize memory utilization. This CBP/GBP admission logic results in a distributed hierarchical shared memory configuration, with a hierarchy between CBP 50 and GBP 60, and hierarchies within the CBP.

Address Resolution (L2)+(L3)

Figure 14:
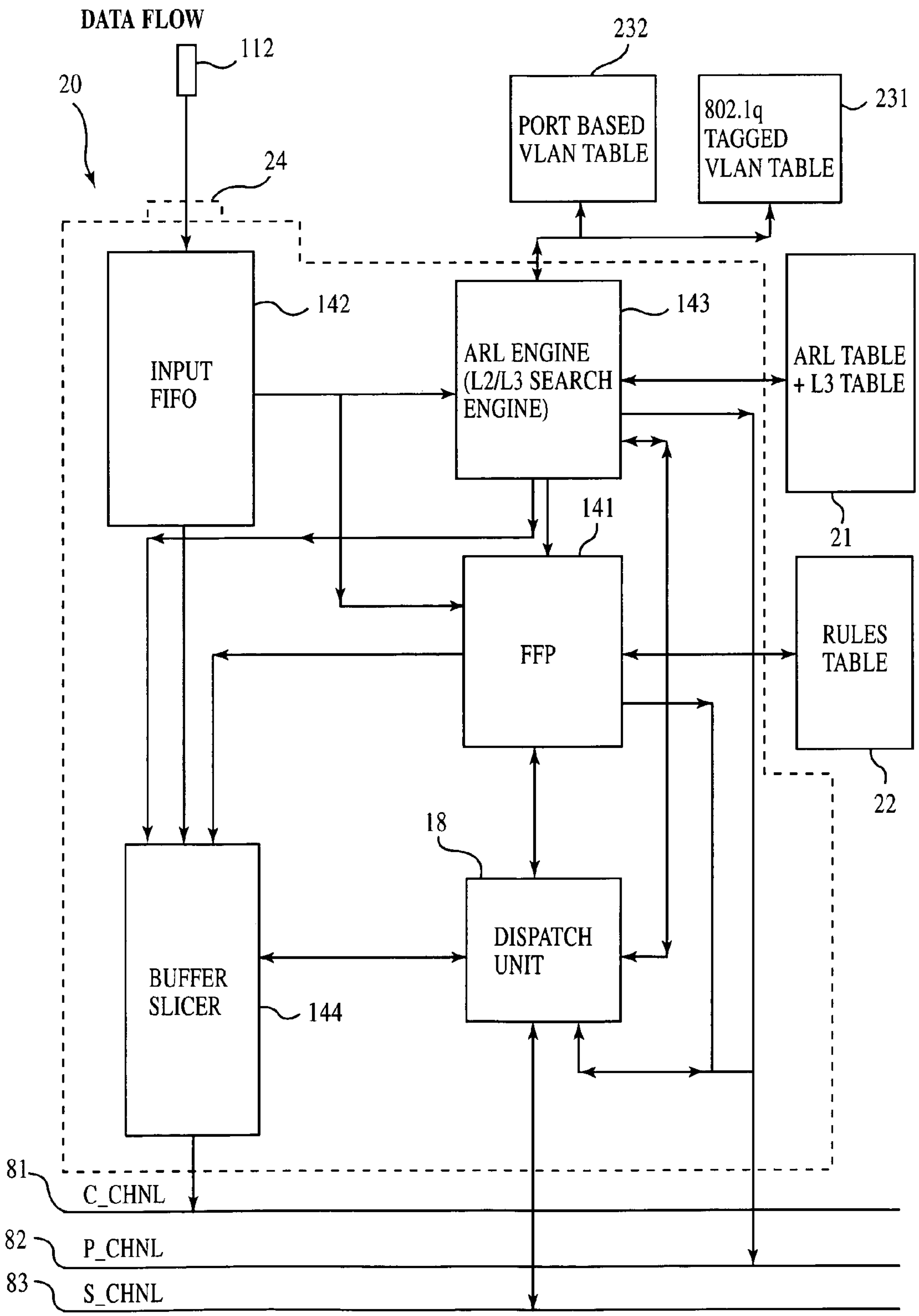
FIG. 14 illustrates more details of an EPIC module.

FIG. 14 illustrates some of the concurrent filtering and look-up details of a packet coming into the ingress side of an EPIC 20. FIG. 12, as discussed previously, illustrates the handling of a data packet with respect to admission into the distributed hierarchical shared memory. FIG. 14 addresses the application of filtering, address resolution, and rules application segments of SOC 10. These functions are performed simultaneously with respect to the CBP admission discussed above. As shown in the figure, packet 112 is received at input port 24 of EPIC 20. It is then directed to input FIFO 142. As soon as the first sixteen bytes of the packet arrive in the input FIFO 142, an address resolution request is sent to ARL engine 143; this initiates lookup in ARL/L3 tables 21.

A description of the fields of an ARL table of ARL/L3 tables 21 is as follows:

Mac Address—48 bits long—Mac Address;

VLAN tag—12 bits long—VLAN Tag Identifier as described in IEEE 802.1q standard for tagged packets. For an untagged Packet, this value is picked up from Port Based VLAN Table.

CosDst—3 bits long—Class of Service based on the Destination Address. COS identifies the priority of this packet. 8 levels of priorities as described in IEEE 802.1p standard.

Port Number—6 bits long—Port Number is the port on which this Mac address is learned.

SD_Disc Bits—2 bits long—These bits identifies whether the packet should be discarded based on Source Address or Destination Address. Value 1 means discard on source. Value 2 means discard on destination.

C bit—1 bit long—C Bit identifies that the packet should be given to CPU Port.

St Bit—1 bit long—St Bit identifies that this is a static entry (it is not learned Dynamically) and that means is should not be aged out. Only CPU 52 can delete this entry.

Ht Bit—1 bit long—Hit Bit—This bit is set if there is match with the Source Address. It is used in the aging Mechanism.

CosSrc—3 bits long—Class of Service based on the Source Address. COS identifies the priority of this packet.

L3 Bit—1 bit long—L3 Bit—identifies that this entry is created as result of L3 Interface Configuration. The Mac address in this entry is L3 interface Mac Address and that any Packet addresses to this Mac Address need to be routed.

T Bit—1 bit long—T Bit identifies that this Mac address is learned from one of the Trunk Ports. If there is a match on Destination address then output port is not decided on the Port Number in this entry, but is decided by the Trunk Identification Process based on the rules identified by the RTAG bits and the Trunk group Identified by the TGID.

TGID—3 bits long—TGID identifies the Trunk Group if the T Bit is set. SOC 10 supports 6 Trunk Groups per switch.

RTAG—3 bits long—RTAG identifies the Trunk selection criterion if the destination address matches this entry and the T bit is set in that entry. Value 1—based on Source Mac Address. Value 2—based on Destination Mac Address. Value 3—based on Source & destination Address. Value 4—based on Source IP Address. Value 5—based on Destination IP Address. Value 6—based on Source and Destination IP Address.

S C P—1 bit long—Source CoS Priority Bit—If this bit is set (in the matched Source Mac Entry) then Source CoS has priority over Destination Cos.

It should also be noted that VLAN tables 23 include a number of table formats; all of the tables and table formats will not be discussed here. However, as an example, the port based VLAN table fields are described as follows:

Port VLAN Id—12 bits long—Port VLAN Identifier is the VLAN Id used by Port Based VLAN.

Sp State—2 bits long—This field identifies the current Spanning Tree State. Value 0×00—Port is in Disable State. No packets are accepted in this state, not even BPDUs. Value 0×01—Port is in Blocking or Listening State. In this state no packets are accepted by the port, except BPDUs. Value 0×02—Port is in Learning State. In this state the packets are not forwarded to another Port but are accepted for learning. Value 0×03—Port is in Forwarding State. In this state the packets are accepted both for learning and forwarding.

Port Discard Bits—6 bits long—There are 6 bits in this field and each bit identifies the criterion to discard the packets coming in this port. Note: Bits 0 to 3 are not used. Bit 4—If this bit is set then all the frames coming on this port will be discarded. Bit 5—If this bit is set then any 802.1q Priority Tagged (vid=0) and Untagged frame coming on this port will be discarded.

J Bit—1 bit long—J Bit means Jumbo bit. If this bit is set then this port should accept Jumbo Frames.

RTAG—3 bits long—RTAG identifies the Trunk selection criterion if the destination address matches this entry and the T bit is set in that entry. Value 1—based on Source Mac Address. Value 2—based on Destination Mac Address. Value 3—based on Source & destination Address. Value 4—based on Source IP Address. Value 5—based on Destination IP Address. Value 6—based on Source and Destination IP Address.

T Bit—1 bit long—This bit identifies that the Port is a member of the Trunk Group.

C Learn Bit—1 bit long—Cpu Learn Bit—If this bit is set then the packet is send to the CPU whenever the source Address is learned.

PT—2 bits long—Port Type identifies the port Type. Value 0—10 Mbit Port. Value 1—100 Mbit Port. Value 2—1 Gbit Port. Value 3-CPU Port.

VLAN Port Bitmap—28 bits long—VLAN Port Bitmap Identifies all the egress ports on which the packet should go out.

B Bit—1 bit long—B bit is BPDU bit. If this bit is set then the Port rejects BPDUs. This Bit is set for Trunk Ports which are not supposed to accept BPDUs.

TGID—3 bits long—TGID—this field identifies the Trunk Group which this port belongs to.

Untagged Bitmap—28 bits long—This bitmap identifies the Untagged Members of the VLAN. i.e. if the frame destined out of these members ports should be transmitted without Tag Header.

M Bits—1 bit long—M Bit is used for Mirroring Functionality. If this bit is set then mirroring on Ingress is enabled.

The ARL engine 143 reads the packet; if the packet has a VLAN tag according to IEEE Standard 802.1q, then ARL engine 143 performs a look-up based upon tagged VLAN table 231, which is part of VLAN table 23. If the packet does not contain this tag, then the ARL engine performs VLAN lookup based upon the port based VLAN table 232. Once the VLAN is identified for the incoming packet, ARL engine 143 performs an ARL table search based upon the source MAC address and the destination MAC address. If the results of the destination search is an L3 interface MAC address, then an L3 search is performed of an L3 table within ARL/L3 table 21. If the L3 search is successful, then the packet is modified according to packet routing rules.

To better understand lookups, learning, and switching, it may be advisable to once again discuss the handling of packet 112 with respect to FIG. 8. If data packet 112 is sent from a source station A into port 24*a* of EPIC 20*a*, and destined for a destination station B on port 24*c* of EPIC 20*c*, ingress submodule 14*a* slices data packet 112 into cells 112*a* and 112*b*. The ingress submodule then reads the packet to determine the source MAC address and the destination MAC address. As discussed previously, ingress submodule 14*a*, in particular ARL engine 143, performs the lookup of appropriate tables within ARL/L3 tables 21*a*, and VLAN table 23*a*, to see if the destination MAC address exists in ARL/L3 tables 21*a*; if the address is not found, but if the VLAN IDs are the same for the source and destination, then ingress submodule 14*a* will set the packet to be sent to all ports. The packet will then propagate to the appropriate destination address. A “source search” and a “destination search" occurs in parallel. Concurrently, the source MAC address of the incoming packet is "learned", and therefore added to an ARL table within ARL/L3 table 21*a*. After the packet is received by the destination, an acknowledgement is sent by destination station B to source station A. Since the source MAC address of the incoming packet is learned by the appropriate table of B, the acknowledgement is appropriately sent to the port on which A is located. When the acknowledgement is received at port 24*a*, therefore, the ARL table learns the source MAC address of B from the acknowledgement packet. It should be noted that as long as the VLAN IDs (for tagged packets) of source MAC addresses and destination MAC addresses are the same, layer two switching as discussed above is performed. L2 switching and lookup is therefore based on the first 16 bytes of an incoming packet. For untagged packets, the port number field in the packet is indexed to the port-based VLAN table within VLAN table 23*a*, and the VLAN ID can then be determined. If the VLAN IDs are different, however, L3 switching is necessary wherein the packets are sent to a different VLAN. L3 switching, however, is based on the IP header field of the packet. The IP header includes source IP address, destination IP address, and TTL (time-to-live).

In order to more clearly understand layer three switching according to the invention, data packet 112 is sent from source station A onto port 24*a* of EPIC 20*a*, and is directed to destination station B; assume, however, that station B is disposed on a different VLAN, as evidenced by the source MAC address and the destination MAC address having differing VLAN IDs. The lookup for B would be unsuccessful since B is located on a different VLAN, and merely sending the packet to all ports on the VLAN would result in B never receiving the packet. Layer three switching, therefore, enables the bridging of VLAN boundaries, but requires reading of more packet information than just the MAC addresses of L2 switching. In addition to reading the source and destination MAC addresses, therefore, ingress 14*a* also reads the IP address of the source and destination. As noted previously, packet types are defined by IEEE and other standards, and are known in the art. By reading the IP address of the destination, SOC 10 is able to target the packet to an appropriate router interface which is consistent with the destination IP address. Packet 112 is therefore sent on to CPS channel 80 through dispatch unit 18*a*, destined for an appropriate router interface (not shown, and not part of SOC 10), upon which destination B is located. Control frames, identified as such by their destination address, are sent to CPU 52 via CMIC 40. The destination MAC address, therefore, is the router MAC address for B. The router MAC address is learned through the assistance of CPU 52, which uses an ARP (address resolution protocol) request to request the destination MAC address for the router for B, based upon the IP address of B. Through the use of the IP address, therefore, SOC 10 can learn the MAC address. Through the acknowledgement and learning process, however, it is only the first packet that is subject to this "slow" handling because of the involvement of CPU 52. After the appropriate MAC addresses are learned, linespeed switching can occur through the use of concurrent table lookups since the necessary information will be learned by the tables. Implementing the tables in silicon as two-dimensional arrays enables such rapid concurrent lookups. Once the MAC address for B has been learned, therefore, when packets come in with the IP address for B, ingress 14*a* changes the IP address to the destination MAC address, in order to enable linespeed switching. Also, the source address of the incoming packet is changed to the router MAC address for A rather than the IP address for A, so that the acknowledgement from B to A can be handled in a fast manner without needing to utilize a CPU on the destination end in order to identify the source MAC address to be the destination for the acknowledgement. Additionally, a TTL (time-to-live) field in the packet is appropriately manipulated in accordance with the IETF (Internet Engineering Task Force) standard. A unique aspect of SOC 10 is that all of the switching, packet processing, and table lookups are performed in hardware, rather than requiring CPU 52 or another CPU to spend time processing instructions. It should be noted that the layer three tables for EPIC 20 can have varying sizes; in a preferred embodiment, these tables are capable of holding up to 2000 addresses, and are subject to purging and deletion of aged addresses, as explained herein.

Referring again to the discussion of FIG. 14, as soon as the first 64 (sixty four) bytes of the packet arrive in input FIFO 142, a filtering request is sent to FFP 141. FFP 141 is an extensive filtering mechanism which enables SOC 10 to set inclusive and exclusive filters on any field of a packet from layer 2 to layer 7 of the OSI seven layer model. Filters are used for packet classification based upon a protocol fields in the packets. Various actions are taken based upon the packet classification, including packet discard, sending of the packet to the CPU, sending of the packet to other ports, sending the packet on certain COS priority queues, changing the type of service (TOS) precedence. The exclusive filter is primarily used for implementing security features, and allows a packet to proceed only if there is a filter match. If there is no match, the packet is discarded.

It should be noted that SOC 10 has a unique capability to handle both tagged and untagged packets coming in. Tagged packets are tagged in accordance with IEEE standards, and include a specific IEEE 802.1p priority field for the packet. Untagged packets, however, do not include an 802.1 p priority field therein. SOC 10 can assign an appropriate COS value for the packet, which can be considered to be equivalent to a weighted priority, based either upon the destination address or the source address of the packet, as matched in one of the table lookups. As noted in the ARL table format discussed herein, an SCP (Source COS Priority) bit is contained as one of the fields of the table. When this SCP bit is set, then SOC 10 will assign weighted priority based upon a source COS value in the ARL table. If the SCP is not set, then SOC 10 will assign a COS for the packet based upon the destination COS field in the ARL table. These COS values are three bit fields in the ARL table, as noted previously in the ARL table field descriptions.

FFP 141 is essentially a state machine driven programmable rules engine. The filters used by the FFP are 64 (sixty-four) bytes wide, and are applied on an incoming packet; any offset can be used, however, a preferred embodiment uses an offset of zero, and therefore operates on the first 64 bytes, or 512 bits, of a packet. The actions taken by the filter are tag insertion, priority mapping, TOS tag insertion, sending of the packet to the CPU, dropping of the packet, forwarding of the packet to an egress port, and sending the packet to a mirrored port. The filters utilized by FFP 141 are defined by rules table 22. Rules table 22 is completely programmable by CPU 52, through CMIC 40. The rules table can be, for example, 256 entries deep, and may be partitioned for inclusive and exclusive filters, with, again as an example, 128 entries for inclusive filters and 128 entries for exclusive filters. A filter database, within FFP 141, includes a number of inclusive mask registers and exclusive mask registers, such that the filters are formed based upon the rules in rules table 22, and the filters therefore essentially form a 64 byte wide mask or bit map which is applied on the incoming packet. If the filter is designated as an exclusive filter, the filter will exclude all packets unless there is a match. In other words, the exclusive filter allows a packet to go through the forwarding process only if there is a filter match. If there is no filter match, the packet is dropped. In an inclusive filter, if there is no match, no action is taken but the packet is not dropped. Action on an exclusive filter requires an exact match of all filter fields. If there is an exact match with an exclusive filter, therefore, action is taken as specified in the action field; the actions which may be taken, are discussed above. If there is no full match or exact of all of the filter fields, but there is a partial match, then the packet is dropped. A partial match is defined as either a match on the ingress field, egress field, or filter select fields. If there is neither a full match nor a partial match with the packet and the exclusive filter, then no action is taken and the packet proceeds through the forwarding process. The FFP configuration, taking action based upon the first 64 bytes of a packet, enhances the handling of real time traffic since packets can be filtered and action can be taken on the fly. Without an FFP according to the invention, the packet would need to be transferred to the CPU for appropriate action to be interpreted and taken. For inclusive filters, if there is a filter match, action is taken, and if there is no filter match, no action is taken; however, packets are not dropped based on a match or no match situation for inclusive filters.

In summary, the FFP includes a filter database with eight sets of inclusive filters and eight sets of exclusive filters, as separate filter masks. As a packet comes into the FFP, the filter masks are applied to the packet; in other words, a logical AND operation is performed with the mask and the packet. If there is a match, the matching entries are applied to rules tables 22, in order to determine which specific actions will be taken. As mentioned previously, the actions include 802.1 p tag insertion, 802.1 p priority mapping, IP TOS (type-of-service) tag insertion, sending of the packet to the CPU, discarding or dropping of the packet, forwarding the packet to an egress port, and sending the packet to the mirrored port. Since there are a limited number of fields in the rules table, and since particular rules must be applied for various types of packets, the rules table requirements are minimized in the present invention by the present invention setting all incoming packets to be "tagged" packets; all untagged packets, therefore, are subject to 802.1 p tag insertion, in order to reduce the number of entries which are necessary in the rules table. This action eliminates the need for entries regarding handling of untagged packets. It should be noted that specific packet types are defined by various IEEE and other networking standards, and will not be defined herein.

Figure 15:
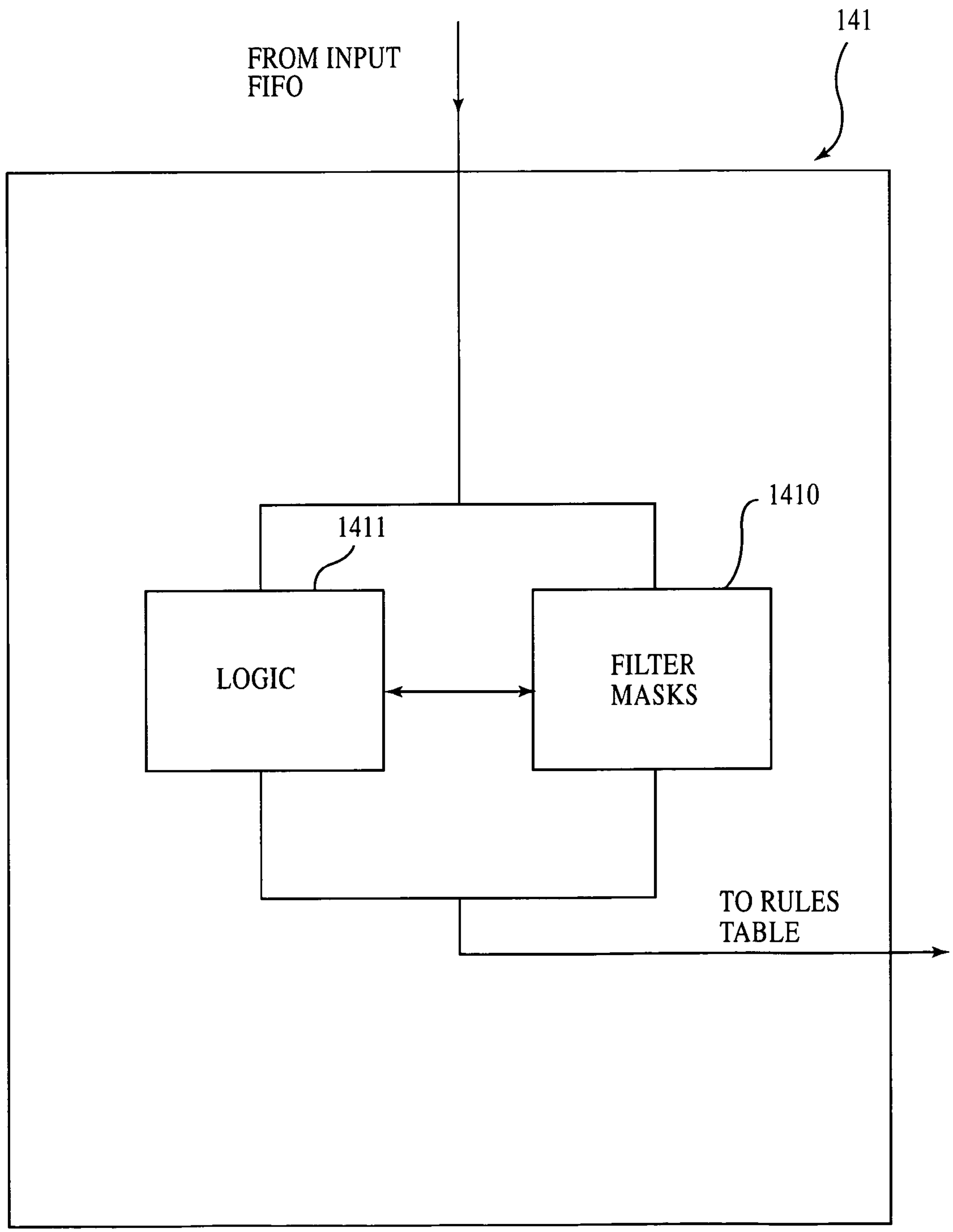
FIG. 15 is a block diagram of a fast filtering processor (FFP)

As noted previously, exclusive filters are defined in the rules table as filters which exclude packets for which there is no match; excluded packets are dropped. With inclusive filters, however, packets are not dropped in any circumstances. If there is a match, action is taken as discussed above; if there is no match, no action is taken and the packet proceeds through the forwarding process. Referring to FIG. 15, FFP 141 is shown to include filter database 1410 containing filter masks therein, communicating with logic circuitry 1411 for determining packet types and applying appropriate filter masks. After the filter mask is applied as noted above, the result of the application is applied to rules table 22, for appropriate lookup and action. It should be noted that the filter masks, rules tables, and logic, while programmable by CPU 52, do not rely upon CPU 52 for the processing and calculation thereof. After programming, a hardware configuration is provided which enables linespeed filter application and lookup.

Referring once again to FIG. 14, after FFP 141 applies appropriate configured filters and results are obtained from the appropriate rules table 22, logic 1411 in FFP 141 determines and takes the appropriate action. The filtering logic can discard the packet, send the packet to the CPU 52, modify the packet header or IP header, and recalculate any IP checksum fields or takes other appropriate action with respect to the headers. The modification occurs at buffer slicer 144, and the packet is placed on C channel 81. The control message and message header information is applied by the FFP 141 and ARL engine 143, and the message header is placed on P channel 82. Dispatch unit 18, also generally discussed with respect to FIG. 8, coordinates all dispatches to C channel, P channel and S channel. As noted previously, each EPIC module 20, GPIC module 30, PMMU 70, etc. are individually configured to communicate via the CPS channel. Each module can be independently modified, and as long as the CPS channel interfaces are maintained, internal modifications to any modules such as EPIC 20*a* should not affect any other modules such as EPIC 20*b*, or any GPICs 30.

Figure 17:
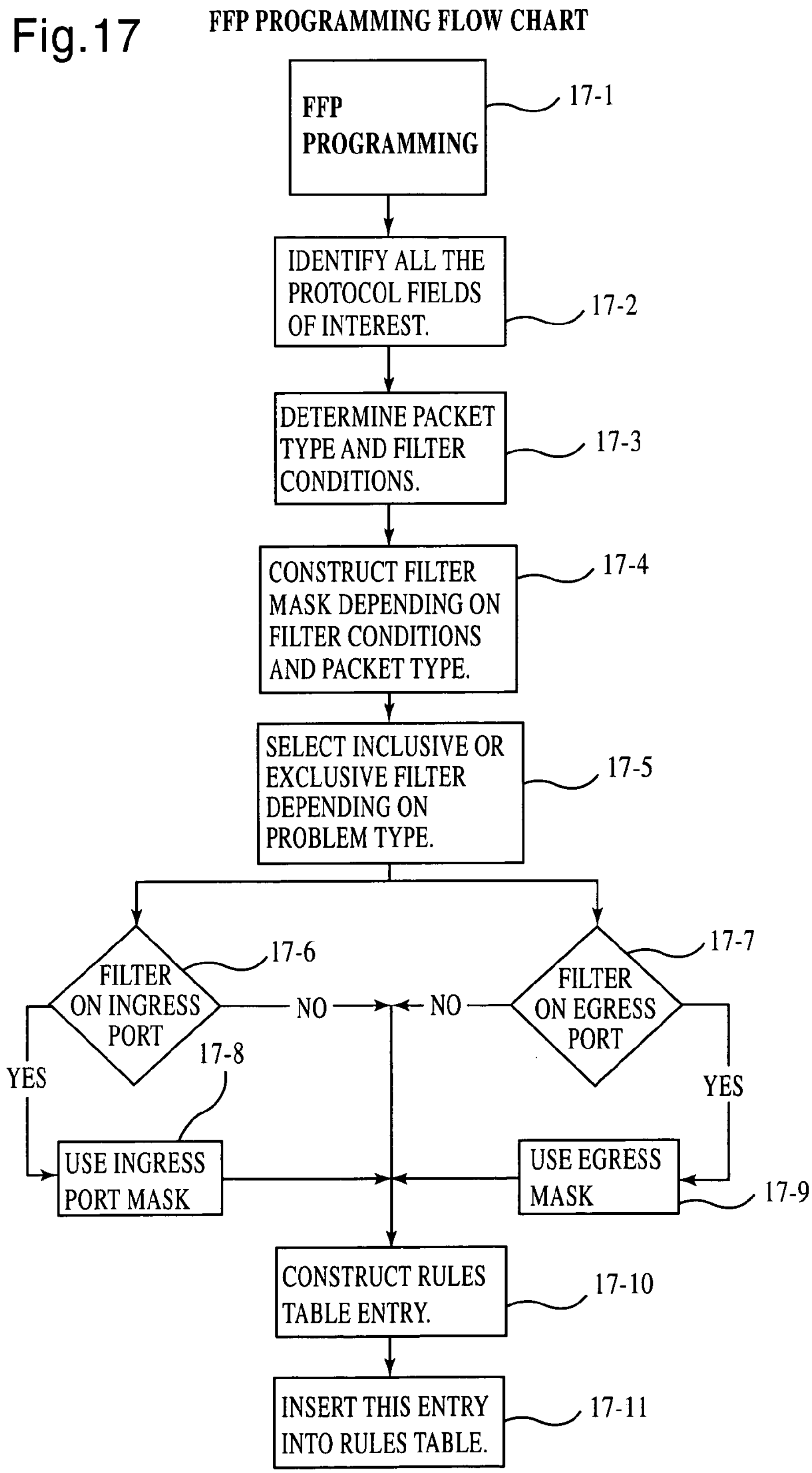
FIG. 17 illustrates a series of steps which are used to program an FFP.

As mentioned previously, FFP 141 is programmed by the user, through CPU 52, based upon the specific functions which are sought to be handled by each FFP 141. Referring to FIG. 17, it can be seen that in step 17-1, an FFP programming step is initiated by the user. Once programming has been initiated, the user identifies the protocol fields of the packet which are to be of interest for the filter, in step 17-2. In step 17-3, the packet type and filter conditions are determined, and in step 174, a filter mask is constructed based upon the identified packet type, and the desired filter conditions. The filter mask is essentially a bit map which is applied or ANDed with selected fields of the packet. After the filter mask is constructed, it is then determined whether the filter will be an inclusive or exclusive filter, depending upon the problems which are sought to be solved, the packets which are sought to be forwarded, actions sought to be taken, etc. In step 17-6, it is determined whether or not the filter is on the ingress port, and in step 17-7, it is determined whether or not the filter is on the egress port. If the filter is on the ingress port, an ingress port mask is used in step 17-8. If it is determined that the filter will be on the egress port, then an egress mask is used in step 17-9. Based upon these steps, a rules table entry for rules tables 22 is then constructed, and the entry or entries are placed into the appropriate rules table (steps 17-10 and 17-11). These steps are taken through the user inputting particular sets of rules and information into CPU 52 by an appropriate input device, and CPU 52 taking the appropriate action with respect to creating the filters, through CMIC 40 and the appropriate ingress or egress submodules on an appropriate EPIC module 20 or GPIC module 30.

It should also be noted that the block diagram of SOC 10 in FIG. 2 illustrates each GPIC 30 having its own ARL/L3 tables 31, rules table 32, and VLAN tables 33, and also each EPIC 20 also having its own ARL/L3 tables 21, rules table 22, and VLAN tables 23. In a preferred embodiment of the invention, however, two separate modules can share a common ARL/L3 table and a common VLAN table. Each module, however, has its own rules table 22. For example, therefore, GPIC 30*a* may share ARL/L3 table 21*a* and VLAN table 23*a* with EPIC 20*a*. Similarly, GPIC 30*b* may share ARL table 21*b* and VLAN table 23*b* with EPIC 20*b*. This sharing of tables reduces the number of gates which are required to implement the invention, and makes for simplified lookup and synchronization as will be discussed below.

Table Synchronization and Aging

SOC 10 utilizes a unique method of table synchronization and aging, to ensure that only current and active address information is maintained in the tables. When ARL/L3 tables are updated to include a new source address, a "hit bit" is set within the table of the "owner" or obtaining module to indicate that the address has been accessed. Also, when a new address is learned and placed in the ARL table, an S channel message is placed on S channel 83 as an ARL insert message, instructing all ARL/L3 tables on SOC 10 to learn this new address. The entry in the ARL/L3 tables includes an identification of the port which initially received the packet and learned the address. Therefore, if EPIC 20*a* contains the port which initially received the packet and therefore which initially learned the address, EPIC 20*a* becomes the "owner" of the address. Only EPIC 20*a*, therefore, can delete this address from the table. The ARL insert message is received by all of the modules, and the address is added into all of the ARL/L3 tables on SOC 10. CMIC 40 will also send the address information to CPU 52. When each module receives and learns the address information, an acknowledge or ACK message is sent back to EPIC 20*a*; as the owner further ARL insert messages cannot be sent from EPIC 20*a* until all ACK messages have been received from all of the modules. In a preferred embodiment of the invention, CMIC 40 does not send an ACK message, since CMIC 40 does not include ingress/egress modules thereupon, but only communicates with CPU 52. If multiple SOC 10 are provided in a stacked configuration, all ARL/L3 tables would be synchronized due to the fact that CPS channel 80 would be shared throughout the stacked modules.

Figure 18:
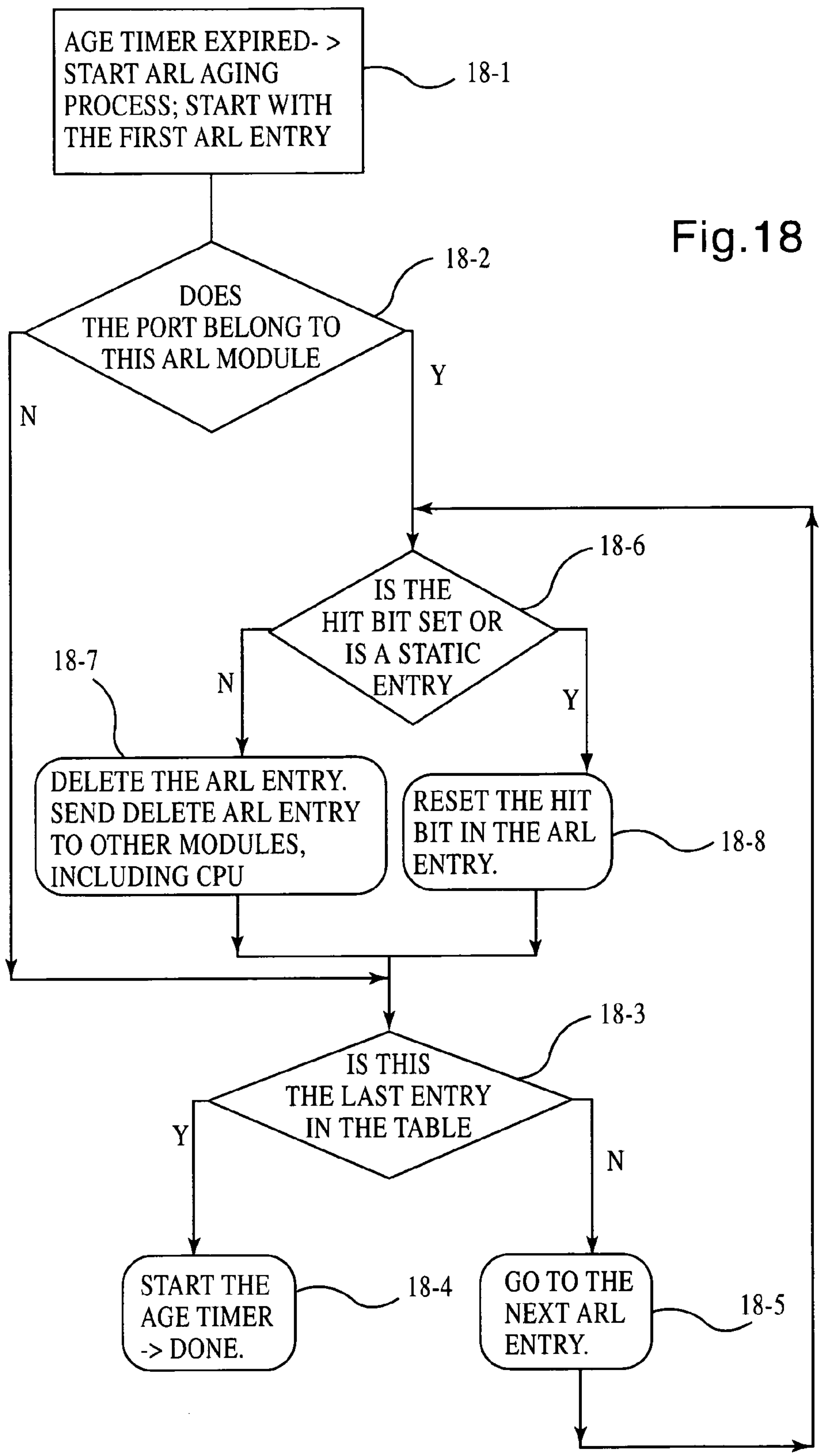
FIG. 18 is a flow chart illustrating the aging process for ARL (L2) and L3 tables.

Referring to FIG. 18, the ARL aging process is discussed. An age timer is provided within each EPIC module 20 and GPIC module 30, at step 18-1, it is determined whether the age timer has expired. If the timer has expired, the aging process begins by examining the first entry in ARL table 21. At step 18-2, it is determined whether or not the port referred to in the ARL entry belongs to the particular module. If the answer is no, the process proceeds to step 18-3, where it is determined whether or not this entry is the last entry in the table. If the answer is yes at step 18-3, the age timer is restarted and the process is completed at step 184. If this is not the last entry in the table, then the process is returned to the next ARL entry at step 18-5. If, however, at step 18-2 it is determined that the port does belong to this particular module, then, at step 18-6 it is determined whether or not the hit bit is set, or if this is a static entry. If the hit bit is set, the hit bit is reset at step 18-7, and the method then proceeds to step 18-3. If the hit bit is not set, the ARL entry is deleted at step 18-8, and a delete ARL entry message is sent on the CPS channel to the other modules, including CMIC 40, so that the table can be appropriately synchronized as noted above. This aging process can be performed on the ARL (layer two) entries, as well as layer three entries, in order to ensure that aged packets are appropriately deleted from the tables by the owners of the entries. As noted previously, the aging process is only performed on entries where the port referred to belongs to the particular module which is performing the aging process. To this end, therefore, the hit bit is only set in the owner module. The hit bit is not set for entries in tables of other modules which receive the ARL insert message. The hit bit is therefore always set to zero in the synchronized non-owner tables.

The purpose of the source and destination searches, and the overall lookups, is to identify the port number within SOC 10 to which the packet should be directed to after it is placed either CBP 50 or GBP 60. Of course, a source lookup failure results in learning of the source from the source MAC address information in the packet; a destination lookup failure, however, since no port would be identified, results in the packet being sent to all ports on SOC 10. As long as the destination VLAN ID is the same as the source VLAN ID, the packet will propagate the VLAN and reach the ultimate destination, at which point an acknowledgement packet will be received, thereby enabling the ARL table to learn the destination port for use on subsequent packets. If the VLAN IDs are different, an L3 lookup and learning process will be performed, as discussed previously. It should be noted that each EPIC and each GPIC contains a FIFO queue to store ARL insert messages, since, although each module can only send one message at a time, if each module sends an insert message, a queue must be provided for appropriate handling of the messages.

Port Movement

After the ARL/L3 tables have entries in them, the situation sometimes arises where a particular user or station may change location from one port to another port. In order to prevent transmission errors, therefore, SOC 10 includes capabilities of identifying such movement, and updating the table entries appropriately. For example, if station A, located for example on port 1, seeks to communicate with station B, whose entries indicate that user B is located on port 26. If station B is then moved to a different port, for example, port 15, a destination lookup failure will occur and the packet will be sent to all ports. When the packet is received by station B at port 15, station B will send an acknowledge (ACK) message, which will be received by the ingress of the EPIC/GPIC module containing port 1 thereupon. A source lookup (of the acknowledge message) will yield a match on the source address, but the port information will not match. The EPIC/GPIC which receives the packet from B, therefore, must delete the old entry from the ARL/L3 table, and also send an ARL/L3 delete message onto the S channel so that all tables are synchronized. Then, the new source information, with the correct port, is inserted into the ARL/L3 table, and an ARL/L3 insert message is placed on the S channel, thereby synchronizing the ARL/L3 tables with the new information. The updated ARL insert message cannot be sent until all of the acknowledgement messages are sent regarding the ARL delete message, to ensure proper table synchronization. As stated previously, typical ARL insertion and deletion commands can only be initiated by the owner module. In the case of port movement, however, since port movement may be identified by any module sending a packet to a moved port, the port movement-related deletion and insertion messages can be initiated by any module.

Trunking

Figure 19:
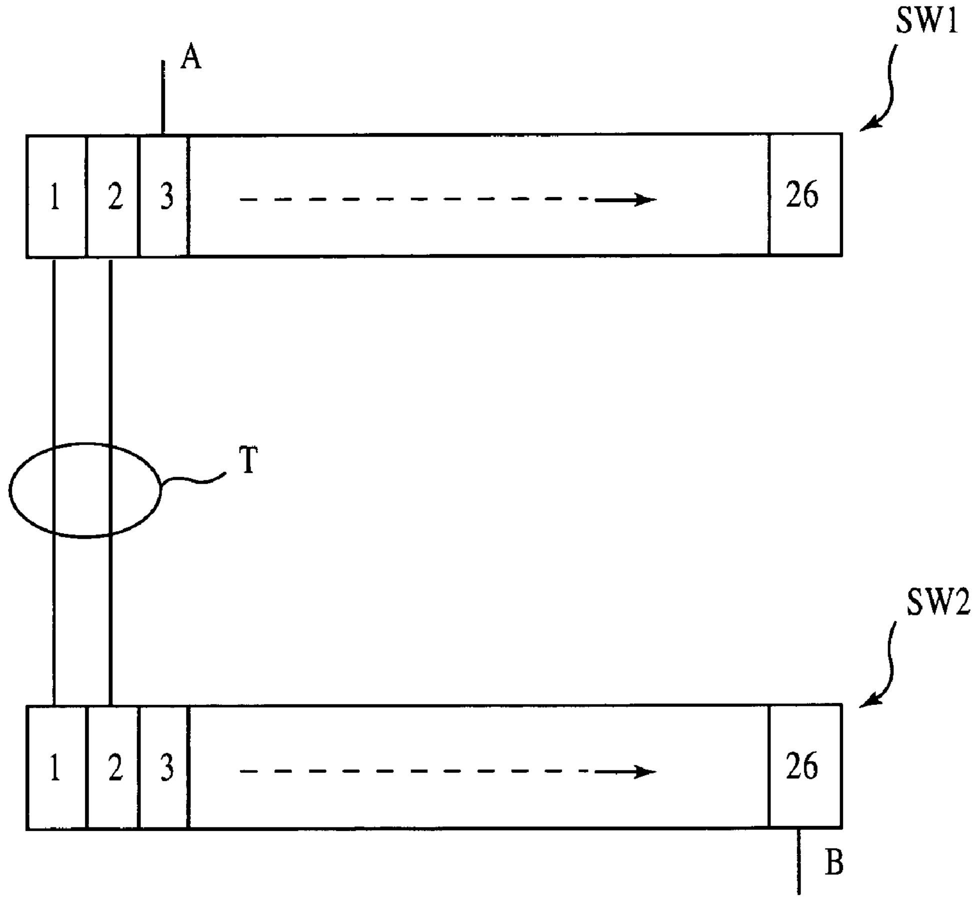
FIG. 19 illustrates communication using a trunk group according to the present invention.

During the configuration process wherein a local area network is configured by an administrator with a plurality of switches, etc., numerous ports can be "trunked" to increase bandwidth. For example, if traffic between a first switch SW1 and a second switch SW2 is anticipated as being high, the LAN can be configured such that a plurality of ports, for example ports 1 and 2, can be connected together. In a 100 megabits per second environment, the trunking of two ports effectively provides an increased bandwidth of 200 megabits per second between the two ports. The two ports 1 and 2, are therefore identified as a trunk group, and CPU 52 is used to properly configure the handling of the trunk group. Once a trunk group is identified, it is treated as a plurality of ports acting as one logical port. FIG. 19 illustrates a configuration wherein SW1, containing a plurality of ports thereon, has a trunk group with ports 1 and 2 of SW2, with the trunk group being two communication lines connecting ports 1 and 2 of each of SW1 and SW2. This forms trunk group T. In this example, station A, connected to port 3 of SW1, is seeking to communicate or send a packet to station B, located on port 26 of switch SW2. The packet must travel, therefore, through trunk group T from port 3 of SW1 to port 26 of SW2. It should be noted that the trunk group could include any of a number of ports between the switches. As traffic flow increases between SW1 and SW2, trunk group T could be reconfigured by the administrator to include more ports, thereby effectively increasing bandwidth. In addition to providing increased bandwidth, trunking provides redundancy in the event of a failure of one of the links between the switches. Once the trunk group is created, a user programs SOC 10 through CPU 52 to recognize the appropriate trunk group or trunk groups, with trunk group identification (TGID) information. A trunk group port bit map is prepared for each TGID; and a trunk group table, provided for each module on SOC 10, is used to implement the trunk group, which can also be called a port bundle. A trunk group bit map table is also provided. These two tables are provided on a per module basis, and, like tables 21, 22, and 23, are implemented in silicon as two-dimensional arrays. In one embodiment of SOC 10, six trunk groups can be supported, with each trunk group having up to eight trunk ports thereupon. For communication, however, in order to prevent out-of-ordering of packets or frames, the same port must be used for packet flow. Identification of which port will be used for communication is based upon any of the following: source MAC address, destination MAC address, source IP address, destination IP address, or combinations of source and destination addresses. If source MAC is used, as an example, if station A on port 3 of SW1 is seeking to send a packet to station B on port 26 of SW2, then the last three bits of the source MAC address of station A, which are in the source address field of the packet, are used to generate a trunk port index. The trunk port index, which is then looked up on the trunk group table by the ingress submodule 14 of the particular port on the switch, in order to determine which port of the trunk group will be used for the communication. In other words, when a packet is sought to be sent from station A to station B, address resolution is conducted as set forth above. If the packet is to be handled through a trunk group, then a T bit will be set in the ARL entry which is matched by the destination address. If the T bit or trunk bit is set, then the destination address is learned from one of the trunk ports. The egress port, therefore, is not learned from the port number obtained in the ARL entry, but is instead learned from the trunk group ID and rules tag (RTAG) which is picked up from the ARL entry, and which can be used to identify the trunk port based upon the trunk port index contained in the trunk group table. The RTAG and TGID which are contained in the ARL entry therefore define which part of the packet is used to generate the trunk port index. For example, if the RTAG value is 1, then the last three bits of the source MAC address are used to identify the trunk port index; using the trunk group table, the trunk port index can then be used to identify the appropriate trunk port for communication. If the RTAG value is 2, then it is the last three bits of the destination MAC address which are used to generate the trunk port index. If the RTAG is 3, then the last three bits of the source MAC address are XORED with the last three bits of the destination MAC address. The result of this operation is used to generate the trunk port index. For IP packets, additional RTAG values are used so that the source IP and destination IP addresses are used for the trunk port index, rather than the MAC addresses.

SOC 10 is configured such that if a trunk port goes down or fails for any reason, notification is sent through CMIC 40 to CPU 52. CPU 52 is then configured to automatically review the trunk group table, and VLAN tables to make sure that the appropriate port bit maps are changed to reflect the fact that a port has gone down and is therefore removed. Similarly, when the trunk port or link is reestablished, the process has to be reversed and a message must be sent to CPU 52 so that the VLAN tables, trunk group tables, etc. can be updated to reflect the presence of the trunk port.

Furthermore, it should be noted that since the trunk group is treated as a single logical link, the trunk group is configured to accept control frames or control packets, also known as BPDUs, only one of the trunk ports. The port based VLAN table, therefore, must be configured to reject incoming BPDUs of non-specified trunk ports. This rejection can be easily set by the setting of a B bit in the VLAN table. IEEE standard 802.1d defines an algorithm known as the spanning tree algorithm, for avoiding data loops in switches where trunk groups exist. Referring to FIG. 19, a logical loop could exist between ports 1 and 2 and switches SW1 and SW2. The spanning algorithm tree defines four separate states, with these states including disabling, blocking, listening, learning, and forwarding. The port based VLAN table is configured to enable CPU 52 to program the ports for a specific ARL state, so that the ARL logic takes the appropriate action on the incoming packets. As noted previously, the B bit in the VLAN table provides the capability to reject BPDUs. The St bit in the ARL table enables the CPU to learn the static entries; as noted in FIG. 18, static entries are not aged by the aging process. The hit bit in the ARL table, as mentioned previously, enables the ARL engine 143 to detect whether or not there was a hit on this entry. In other words, SOC 10 utilizes a unique configuration of ARL tables, VLAN tables, modules, etc. in order to provide an efficient silicon based implementation of the spanning tree states.

In certain situations, such as a destination lookup failure (DLF) where a packet is sent to all ports on a VLAN, or a multicast packet, the trunk group bit map table is configured to pickup appropriate port information so that the packet is not sent back to the members of the same source trunk group. This prevents unnecessary traffic on the LAN, and maintains the efficiency at the trunk group.

IP/IPX

Referring again to FIG. 14, each EPIC 20 or GPIC 30 can be configured to enable support of both IP and IPX protocol at linespeed. This flexibility is provided without having any negative effect on system performance, and utilizes a table, implemented in silicon, which can be selected for IP protocol, IPX protocol, or a combination of IP protocol and IPX protocol. This capability is provided within logic circuitry 1411, and utilizes an IP longest prefix cache lookup (IP_LPC), and an IPX longest prefix cache lookup (IPX-_LPC). During the layer 3 lookup, a number of concurrent searches are performed; an L3 fast lookup, and the IP longest prefix cache lookup, are concurrently performed if the packet is identified by the packet header as an IP packet. If the packet header identifies the packet as an IPX packet, the L3 fast lookup and the IPX longest prefix cache lookup will be concurrently performed. It should be noted that ARL/L3 tables 21/31 include an IP default router table which is utilized for an IP longest prefix cache lookup when the packet is identified as an IP packet, and also includes an IPX default router table which is utilized when the packet header identifies the packet as an IPX packet. Appropriate hexadecimal codes are used to determine the packet types. If the packet is identified as neither an IP packet nor an IPX packet, the packet is directed to CPU 52 via CPS channel 80 and CMIC 40. It should be noted that if the packet is identified as an IPX packet, it could be any one of four types of IPX packets. The four types are Ethernet 802.3, Ethernet 802.2, Ethernet SNAP, and Ethernet II.

The concurrent lookup of L3 and either IP or IPX are important to the performance of SOC 10. In one embodiment of SOC 10, the L3 table would include a portion which has IP address information, and another portion which has IPX information, as the default router tables. These default router tables, as noted previously, are searched depending upon whether the packet is an IP packet or an IPX packet. In order to more clearly illustrate the tables, the L3 table format for an L3 table within ARL/L3 tables 21 is as follows:

IP or IPX Address—32 bits long—IP or IPX Address—is a 32 bit IP or IPX Address. The Destination IP or IPX Address in a packet is used as a key in searching this table.

Mac Address—48 bits long—Mac Address is really the next Hop Mac Address. This Mac address is used as the Destination Mac Address in the forwarded IP Packet.

Port Number—6 bits long—Port Number—is the port number the packet has to go out if the Destination IP Address matches this entry's IP Address.

L3 Interface Num—5 bits long—L3 Interface Num—This L3 Interface Number is used to get the Router Mac Address from the L3 Interface Table.

L3 Hit Bit—1 bit long—L3 Hit bit—is used to check if there is hit on this Entry. The hit bit is set when the Source IP Address search matches this entry. The L3 Aging Process ages the entry if this bit is not set.

Frame Type—2 bits long—Frame Type indicates type of IPX Frame (802.2, Ethernet II, SNAP and 802.3) accepted by this IPX Node. Value 00—Ethernet II Frame. Value 01—SNAP Frame. Value 02—802.2 Frame. Value 03—802.3 Frame.

Reserved—4 bits long—Reserved for future use.

The fields of the default IP router table are as follows:

IP Subnet Address—32 bits long—IP Subnet Address—is a 32 bit IP Address of the Subnet.

Mac Address—48 bits long—Mac Address is really the next Hop Mac Address and in this case is the Mac Address of the default Router.

Port Number—6 bits long—Port Number is the port number forwarded packet has to go out.

L3 Interface Num—5 bits long—L3 Interface Num is L3 Interface Number.

IP Subnet Bits—5 bits long—IP Subnet Bits is total number of Subnet Bits in the Subnet Mask. These bits are ANDED with Destination IP Address before comparing with Subnet Address.

C Bit—1 bit long—C Bit—If this bit is set then send the packet to CPU also.

The fields of the default IPX router table within ARL/L3 tables 21 are as follows:

IPX Subnet Address—32 bits long—IPX Subnet Address is a 32 bit IPX Address of the Subnet.

Mac Address—48 bits long—Mac Address is really the next Hop Mac Address and in this case is the Mac Address of the default Router.

Port Number—6 bits long—Port Number is the port number forwarded packet has to go out.

L3 Interface Num—5 bits long—L3 Interface Num is L3 Interface Number.

IPX Subnet Bits—5 bits long—IPX Subnet Bits is total number of Subnet Bits in the Subnet Mask. These bits are ANDED with Destination IPX Address before comparing with Subnet Address.

C Bit—1 bit long—C Bit—If this bit is set then send the packet to CPU also.

If a match is not found in the L3 table for the destination IP address, longest prefix match in the default IP router fails, then the packet is given to the CPU. Similarly, if a match is not found on the L3 table for a destination IPX address, and the longest prefix match in the default IPX router fails, then the packet is given to the CPU. The lookups are done in parallel, but if the destination IP or IPX address is found in the L3 table, then the results of the default router table lookup are abandoned.

The longest prefix cache lookup, whether it be for IP or IPX, includes repetitive matching attempts of bits of the IP subnet address. The longest prefix match consists of ANDing the destination IP address with the number of IP or IPX subnet bits and comparing the result with the IP subnet address. Once a longest prefix match is found, as long as the TTL is not equal to one, then appropriate IP check sums are recalculated, the destination MAC address is replaced with the next hop MAC address, and the source MAC address is replaced with the router MAC address of the interface. The VLAN ID is obtained from the L3 interface table, and the packet is then sent as either tagged or untagged, as appropriate. If the C bit is set, a copy of the packet is sent to the CPU as may be necessary for learning or other CPU-related functions.

It should be noted, therefore, that if a packet arrives destined to a MAC address associated with a level 3 interface for a selected VLAN, the ingress looks for a match at an IP/IPX destination subnet level. If there is no IP/IPX destination subnet match, the packet is forwarded to CPU 52 for appropriate routing. However, if an IP/IPX match is made, then the MAC address of the next hop and the egress port number is identified and the packet is appropriately forwarded.

In other words, the ingress of the EPIC 20 or GPIC 30 is configured with respect to ARL/L3 tables 21 so that when a packet enters ingress submodule 14, the ingress can identify whether or not the packet is an IP packet or an IPX packet. IP packets are directed to an IP/ARL lookup, and IPX configured packets are directed to an IPX/ARL lookup. If an L3 match is found during the L3 lookup, then the longest prefix match lookups are abandoned.

HOL Blocking

SOC 10 incorporates some unique data flow characteristics, in order maximize efficiency and switching speed. In network communications, a concept known as head-of-line or HOL blocking occurs when a port is attempting to send a packet to a congested port, and immediately behind that packet is another packet which is intended to be sent to an un-congested port. The congestion at the destination port of the first packet would result in delay of the transfer of the second packet to the un-congested port. Each EPIC 20 and GPIC 30 within SOC 10 includes a unique HOL blocking mechanism in order to maximize throughput and minimize the negative effects that a single congested port would have on traffic going to un-congested ports. For example, if a port on a GPIC 30, with a data rate of, for example, 1000 megabits per second is attempting to send data to another port 24*a* on EPIC 20*a*, port 24*a* would immediately be congested. Each port on each GPIC 30 and EPIC 20 is programmed by CPU 52 to have a high watermark and a low watermark per port per class of service (COS), with respect to buffer space within CBP 50. The fact that the head of line blocking mechanism enables per port per COS head of line blocking prevention enables a more efficient data flow than that which is known in the art. When the output queue for a particular port hits the preprogrammed high watermark within the allocated buffer in CBP 50, PMMU 70 sends, on S channel 83, a COS queue status notification to the appropriate ingress module of the appropriate GPIC 30 or EPIC 20. When the message is received, the active port register corresponding to the COS indicated in the message is updated. If the port bit for that particular port is set to zero, then the ingress is configured to drop all packets going to that port. Although the dropped packets will have a negative effect on communication to the congested port, the dropping of the packets destined for congested ports enables packets going to un-congested ports to be expeditiously forwarded thereto. When the output queue goes below the preprogrammed low watermark, PMMU 70 sends a COS queue status notification message on the sideband channel with the bit set for the port. When the ingress gets this message, the bit corresponding to the port in the active port register for the module can send the packet to the appropriate output queue. By waiting until the output queue goes below the low watermark before re-activating the port, a hysteresis is built into the system to prevent constant activation and deactivation of the port based upon the forwarding of only one packet, or a small number of packets. It should be noted that every module has an active port register. As an example, each COS per port may have four registers for storing the high watermark and the low watermark; these registers can store data in terms of number of cells on the output queue, or in terms of number of packets on the output queue. In the case of a unicast message, the packet is merely dropped; in the case of multicast or broadcast messages, the message is dropped with respect to congested ports, but forwarded to uncongested ports. PMMU 70 includes all logic required to implement this mechanism to prevent HOL blocking, with respect to budgeting of cells and packets. PMMU 70 includes an HOL blocking marker register to implement the mechanism based upon cells. If the local cell count plus the global cell count for a particular egress port exceeds the HOL blocking marker register value, then PMMU 70 sends the HOL status notification message. PMMU 70 can also implement an early HOL notification, through the use of a bit in the PMMU configuration register which is referred to as a Use Advanced Warning Bit. If this bit is set, the PMMU 70 sends the HOL notification message if the local cell count plus the global cell count plus 121 is greater than the value in the HOL blocking marker register. 121 is the number of cells in a jumbo frame.

With respect to the hysteresis discussed above, it should be noted that PMMU 70 implements both a spatial and a temporal hysteresis. When the local cell count plus global cell count value goes below the value in the HOL blocking marker register, then a poaching timer value from a PMMU configuration register is used to load into a counter. The counter is decremented every 32 clock cycles. When the counter reaches 0, PMMU 70 sends the HOL status message with the new port bit map. The bit corresponding to the egress port is reset to 0, to indicate that there is no more HOL blocking on the egress port. In order to carry on HOL blocking prevention based upon packets, a skid mark value is defined in the PMMU configuration register. If the number of transaction queue entries plus the skid mark value is greater than the maximum transaction queue size per COS, then PMMU 70 sends the COS queue status message on the S channel. Once the ingress port receives this message, the ingress port will stop sending packets for this particular port and COS combination. Depending upon the configuration and the packet length received for the egress port, either the head of line blocking for the cell high watermark or the head of line blocking for the packet high watermark may be reached first. This configuration, therefore, works to prevent either a small series of very large packets or a large series of very small packets from creating HOL blocking problems.

The low watermark discussed previously with respect to CBP admission logic is for the purpose of ensuring that independent of traffic conditions, each port will have appropriate buffer space allocated in the CBP to prevent port starvation, and ensure that each port will be able to communicate with every other port to the extent that the network can support such communication.

Referring again to PMMU 70 illustrated in FIG. 10, CBM 71 is configured to maximize availability of address pointers associated with incoming packets from a free address pool. CBM 71, as noted previously, stores the first cell pointer until incoming packet 112 is received and assembled either in CBP 50, or GBP 60. If the purge flag of the corresponding P channel message is set, CBM 71 purges the incoming data packet 112, and therefore makes the address pointers GPID/CPID associated with the incoming packet to be available. When the purge flag is set, therefore, CBM 71 essentially flushes or purges the packet from processing of SOC 10, thereby preventing subsequent communication with the associated egress manager 76 associated with the purged packet. CBM 71 is also configured to communicate with egress managers 76 to delete aged and congested packets. Aged and congested packets are directed to CBM 71 based upon the associated starting address pointer, and the reclaim unit within CBM 71 frees the pointers associated with the packets to be deleted; this is, essentially, accomplished by modifying the free address pool to reflect this change. The memory budget value is updated by decrementing the current value of the associated memory by the number of data cells which are purged.

To summarize, resolved packets are placed on C channel 81 by ingress submodule 14 as discussed with respect to FIG. 8. CBM 71 interfaces with the CPS channel, and every time there is a cell/packet addressed to an egress port, CBM 71 assigns cell pointers, and manages the linked list. A plurality of concurrent reassembly engines are provided, with one reassembly engine for each egress manager 76, and tracks the frame status. Once a plurality of cells representing a packet is fully written into CBP 50, CBM 71 sends out CPIDs to the respective egress managers, as discussed above. The CPIDs point to the first cell of the packet in the CBP; packet flow is then controlled by egress managers 76 to transaction MACs 140 once the CPID/GPID assignment is completed by CBM 71. The budget register (not shown) of the respective egress manager 76 is appropriately decremented by the number of cells associated with the egress, after the complete packet is written into the CBP 50. EGM 76 writes the appropriate PIDs into its transaction FIFO. Since there are multiple classes of service (COSs), then the egress manager 76 writes the PIDs into the selected transaction FIFO corresponding to the selected COS. As will be discussed below with respect to FIG. 13, each egress manager 76 has its own scheduler interfacing to the transaction pool or transaction FIFO on one side, and the packet pool or packet FIFO on the other side. The transaction FIFO includes all PIDs, and the packet pool or packet FIFO includes only CPIDs. The packet FIFO interfaces to the transaction FIFO, and initiates transmission based upon requests from the transmission MAC. Once transmission is started, data is read from CBP 50 one cell at a time, based upon transaction FIFO requests.

Figure 13:
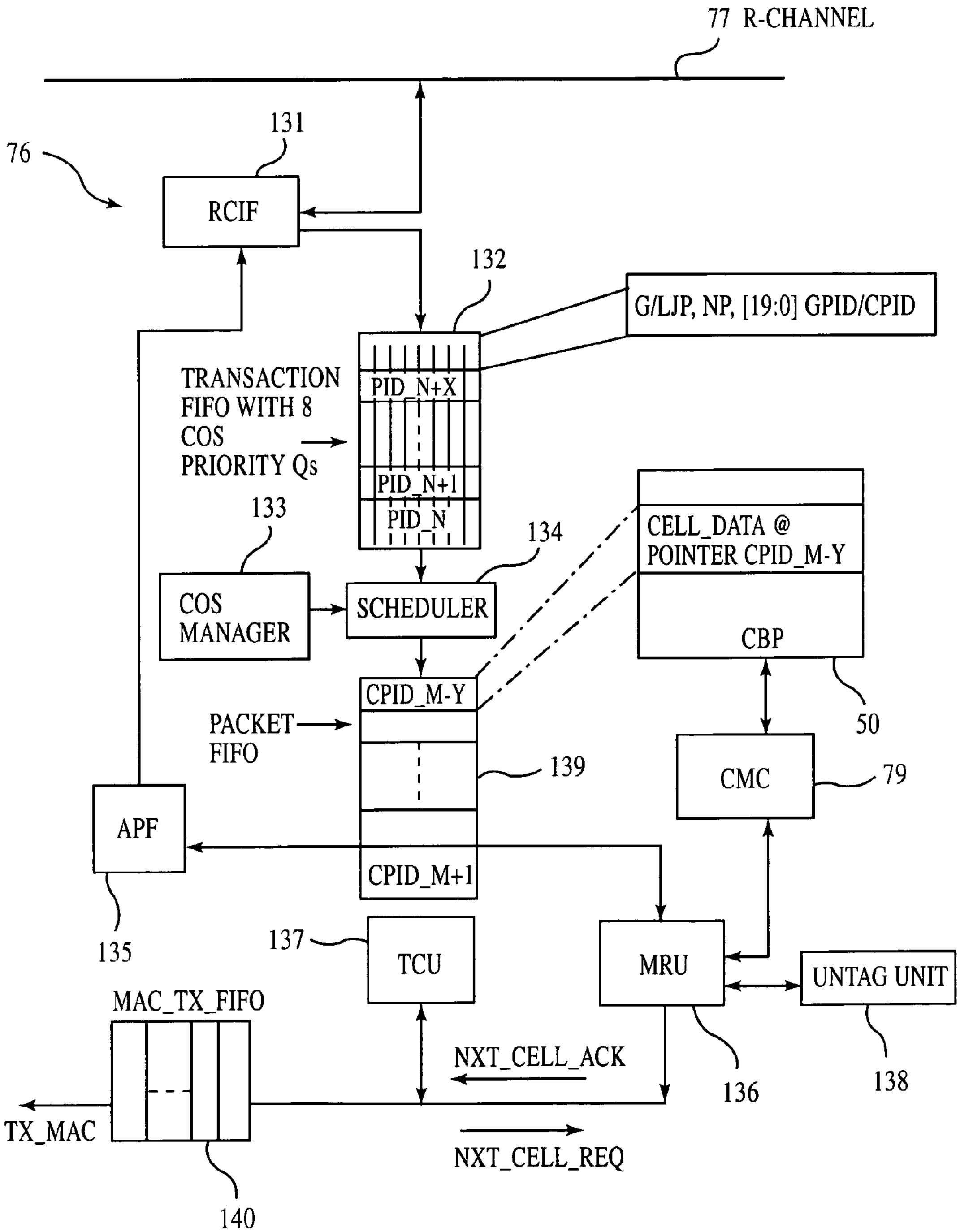
FIG. 13 illustrates a block diagram of an egress manager 76 illustrated in FIG. 10.

As noted previously, there is one egress manager for each port of every EPIC 20 and GPIC 30, and is associated with egress sub-module 18. FIG. 13 illustrates a block diagram of an egress manager 76 communicating with R channel 77. For each data packet 112 received by an ingress submodule 14 of an EPIC 20 of SOC 10, CBM 71 assigns a Pointer Identification (PID); if the packet 112 is admitted to CBP 50, the CBM 71 assigns a CPID, and if the packet 112 is admitted to GBP 60, the CBM 71 assigns a GPID number. At this time, CBM 71 notifies the corresponding egress manager 76 which will handle the packet 112, and passes the PID to the corresponding egress manager 76 through R channel 77. In the case of a unicast packet, only one egress manager 76 would receive the PID. However, if the incoming packet were a multicast or broadcast packet, each egress manager 76 to which the packet is directed will receive the PID. For this reason, a multicast or broadcast packet needs only to be stored once in the appropriate memory, be it either CBP 50 or GBP 60.

Each egress manager 76 includes an R channel interface unit (RCIF) 131, a transaction FIFO 132, a COS manager 133, a scheduler 134, an accelerated packet flush unit (APF) 135, a memory read unit (MRU) 136, a time stamp check unit (TCU) 137, and an untag unit 138. MRU 136 communicates with CMC 79, which is connected to CBP 50. Scheduler 134 is connected to a packet FIFO 139. RCIF 131 handles all messages between CBM 71 and egress manager 76. When a packet 112 is received and stored in SOC 10, CBM 71 passes the packet information to RCIF 131 of the associated egress manager 76. The packet information will include an indication of whether or not the packet is stored in CBP 50 or GBP 70, the size of the packet, and the PID. RCIF 131 then passes the received packet information to transaction FIFO 132. Transaction FIFO 132 is a fixed depth FIFO with eight COS priority queues, and is arranged as a matrix with a number of rows and columns. Each column of transaction FIFO 132 represents a class of service (COS), and the total number of rows equals the number of transactions allowed for any one class of service. COS manager 133 works in conjunction with scheduler 134 in order to provide policy based quality of service (QOS), based upon ethernet standards. As data packets arrive in one or more of the COS priority queues of transaction FIFO 132, scheduler 134 directs a selected packet pointer from one of the priority queues to the packet FIFO 139. The selection of the packet pointer is based upon a queue scheduling algorithm, which is programmed by a user through CPU 52, within COS manager 133. An example of a COS issue is video, which requires greater bandwidth than text documents. A data packet 112 of video information may therefore be passed to packet FIFO 139 ahead of a packet associated with a text document. The COS manager 133 would therefore direct scheduler 134 to select the packet pointer associated with the packet of video data.

The COS manager 133 can also be programmed using a strict priority based scheduling method, or a weighted priority based scheduling method of selecting the next packet pointer in transaction FIFO 132. Utilizing a strict priority based scheduling method, each of the eight COS priority queues are provided with a priority with respect to each other COS queue. Any packets residing in the highest priority COS queue are extracted from transaction FIFO 132 for transmission. On the other hand, utilizing a weighted priority based scheduling scheme, each COS priority queue is provided with a programmable bandwidth. After assigning the queue priority of each COS queue, each COS priority queue is given a minimum and a maximum bandwidth. The minimum and maximum bandwidth values are user programmable. Once the higher priority queues achieve their minimum bandwidth value, COS manager 133 allocates any remaining bandwidth based upon any occurrence of exceeding the maximum bandwidth for any one priority queue. This configuration guarantees that a maximum bandwidth will be achieved by the high priority queues, while the lower priority queues are provided with a lower bandwidth.

The programmable nature of the COS manager enables the scheduling algorithm to be modified based upon a user's specific needs. For example, COS manager 133 can consider a maximum packet delay value which must be met by a transaction FIFO queue. In other words, COS manager 133 can require that a packet 112 is not delayed in transmission by the maximum packet delay value; this ensures that the data flow of high speed data such as audio, video, and other real time data is continuously and smoothly transmitted.

If the requested packet is located in CBP 50, the CPID is passed from transaction FIFO 132 to packet FIFO 139. If the requested packet is located in GBP 60, the scheduler initiates a fetch of the packet from GBP 60 to CBP 50; packet FIFO 139 only utilizes valid CPID information, and does not utilize GPID information. The packet FIFO 139 only communicates with the CBP and not the GBP. When the egress seeks to retrieve a packet, the packet can only be retrieved from the CBP; for this reason, if the requested packet is located in the GBP 60, the scheduler fetches the packet so that the egress can properly retrieve the packet from the CBP.

APF 135 monitors the status of packet FIFO 139. After packet FIFO 139 is full for a specified time period, APF 135 flushes out the packet FIFO. The CBM reclaim unit is provided with the packet pointers stored in packet FIFO 139 by APF 135, and the reclaim unit is instructed by APF 135 to release the packet pointers as part of the free address pool. APF 135 also disables the ingress port 21 associated with the egress manager 76.

While packet FIFO 139 receives the packet pointers from scheduler 134, MRU 136 extracts the packet pointers for dispatch to the proper egress port. After MRU 136 receives the packet pointer, it passes the packet pointer information to CMC 79, which retrieves each data cell from CBP 50. MRU 136 passes the first data cell 112*a*, incorporating cell header information, to TCU 137 and untag unit 138. TCU 137 determines whether the packet has aged by comparing the time stamps stored within data cell 112*a* and the current time. If the storage time is greater than a programmable discard time, then packet 112 is discarded as an aged packet. Additionally, if there is a pending request to untag the data cell 112*a*, untag unit 138 will remove the tag header prior to dispatching the packet. Tag headers are defined in IEEE Standard 802.1q.

Egress manager 76, through MRU 136, interfaces with transmission FIFO 140, which is a transmission FIFO for an appropriate media access controller (MAC); media access controllers are known in the ethernet art. MRU 136 prefetches the data packet 112 from the appropriate memory, and sends the packet to transmission FIFO 140, flagging the beginning and the ending of the packet. If necessary, transmission FIFO 140 will pad the packet so that the packet is 64 bytes in length.

As shown in FIG. 9, packet 112 is sliced or segmented into a plurality of 64 byte data cells for handling within SOC 10. The segmentation of packets into cells simplifies handling thereof, and improves granularity, as well as making it simpler to adapt SOC 10 to cell-based protocols such as ATM. However, before the cells are transmitted out of SOC 10, they must be reassembled into packet format for proper communication in accordance with the appropriate communication protocol. A cell reassembly engine (not shown) is incorporated within each egress of SOC 10 to reassemble the sliced cells 112*a* and 112*b* into an appropriately processed and massaged packet for further communication.

Figure 16:
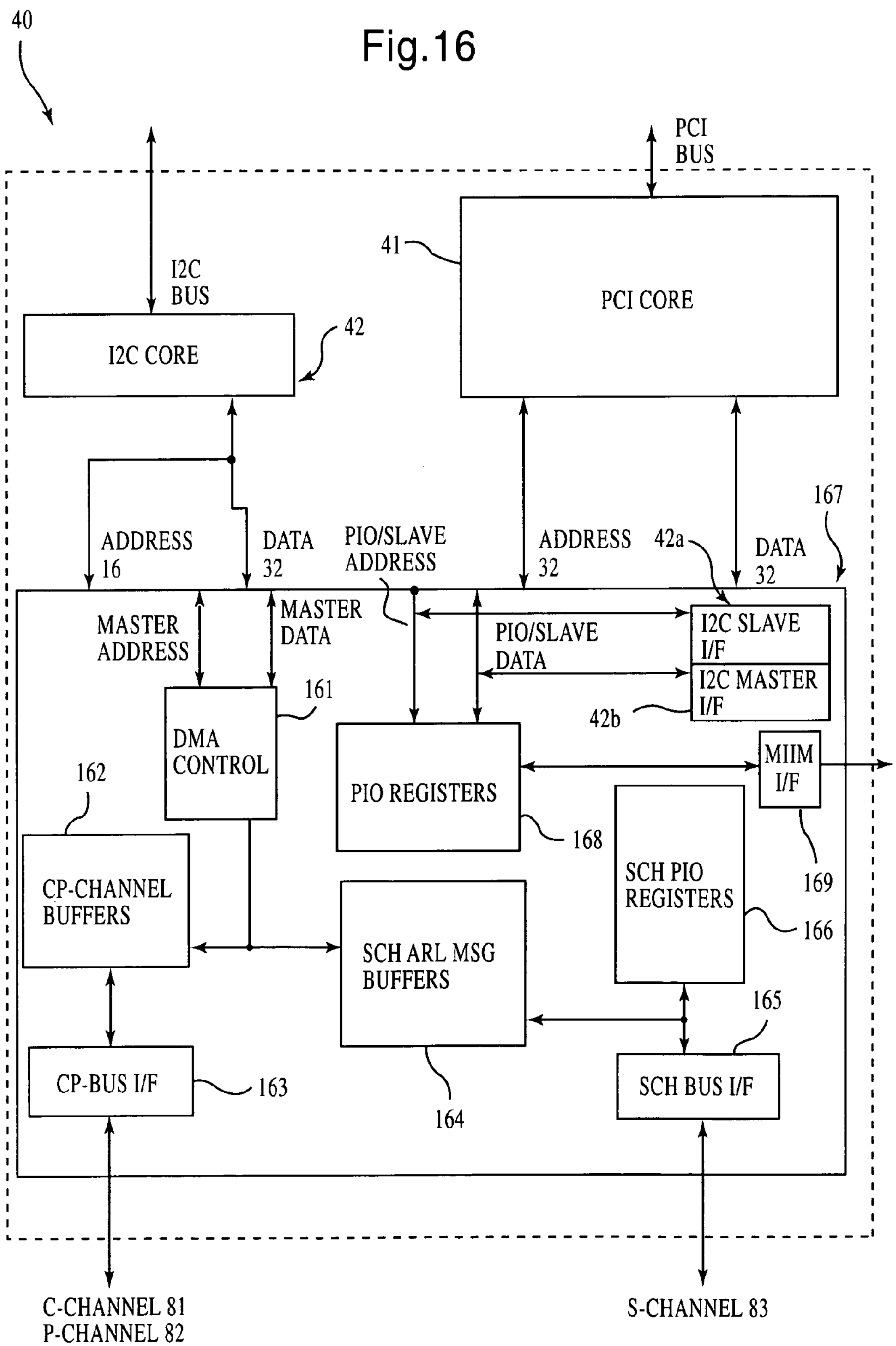
FIG. 16 is a block diagram of the elements of CMIC 40.

FIG. 16 is a block diagram showing some of the elements of CPU interface or CMIC 40. In a preferred embodiment, CMIC 40 provides a 32 bit 66 MHz PCI interface, as well as an I2C interface between SOC 10 and external CPU 52. PCI communication is controlled by PCI core 41, and I2C communication is performed by I2C core 42, through CMIC bus 167. As shown in the figure, many CMIC 40 elements communicate with each other through CMIC bus 167. The PCI interface is typically used for configuration and programming of SOC 10 elements such as rules tables, filter masks, packet handling, etc., as well as moving data to and from the CPU or other PCI uplink. The PCI interface is suitable for high end systems wherein CPU 52 is a powerful CPU and running a sufficient protocol stack as required to support layer two and layer three switching functions. The I2C interface is suitable for low end systems, where CPU 52 is primarily used for initialization. Low end systems would seldom change the configuration of SOC 10 after the switch is up and running.

CPU 52 is treated by SOC 10 as any other port. Therefore, CMIC 40 must provide necessary port functions much like other port functions defined above. CMIC 40 supports all S channel commands and messages, thereby enabling CPU 52 to access the entire packet memory and register set; this also enables CPU 52 to issue insert and delete entries into ARL/L3 tables, issue initialize CFAP/SFAP commands, read/write memory commands and ACKs, read/write register command and ACKs, etc. Internal to SOC 10, CMIC 40 interfaces to C channel 81, P channel 82, and S channel 83, and is capable of acting as an S channel master as well as S channel slave. To this end, CPU 52 must read or write 32-bit D words. For ARL table insertion and deletion, CMIC 40 supports buffering of four insert/delete messages which can be polled or interrupt driven. ARL messages can also be placed directly into CPU memory through a DMA access using an ARL DMA controller 161. DMA controller 161 can interrupt CPU 52 after transfer of any ARL message, or when all the requested ARL packets have been placed into CPU memory.

Communication between CMIC 40 and C channel 81/P channel 82 is performed through the use of CP-channel buffers 162 for buffering C and P channel messages, and CP bus interface 163. S channel ARL message buffers 164 and S channel bus interface 165 enable communication with S channel 83. As noted previously, PIO (Programmed Input/Output) registers are used, as illustrated by SCH PIO registers 166 and PIO registers 168, to access the S channel, as well as to program other control, status, address, and data registers. PIO registers 168 communicate with CMIC bus 167 through I2C slave interface 42*a* and I2C master interface 42*b*. DMA controller 161 enables chaining, in memory, thereby allowing CPU 52 to transfer multiple packets of data without continuous CPU intervention. Each DMA channel can therefore be programmed to perform a read or write DMA operation. Specific descriptor formats may be selected as appropriate to execute a desired DMA function according to application rules. For receiving cells from PMMU 70 for transfer to memory, if appropriate, CMIC 40 acts as an egress port, and follows egress protocol as discussed previously. For transferring cells to PMMU 70, CMIC 40 acts as an ingress port, and follows ingress protocol as discussed previously. CMIC 40 checks for active ports, COS queue availability and other ingress functions, as well as supporting the HOL blocking mechanism discussed above. CMIC 40 supports single and burst PIO operations; however, burst should be limited to S channel buffers and ARL insert/delete message buffers. Referring once again to I2C slave interface 42*a*, the CMIC 40 is configured to have an I2C slave address so that an external I2C master can access registers of CMIC 40. CMIC 40 can inversely operate as an I2C master, and therefore, access other I2C slaves. It should be noted that CMIC 40 can also support MIIM through MIIM interface 169. MIIM support is defined by IEEE Standard 802.3u, and will not be further discussed herein. Similarly, other operational aspects of CMIC 40 are outside of the scope of this invention.

A unique and advantageous aspect of SOC 10 is the ability of doing concurrent lookups with respect to layer two (ARL), layer three, and filtering. When an incoming packet comes in to an ingress submodule 14 of either an EPIC 20 or a GPIC 30, as discussed previously, the module is capable of concurrently performing an address lookup to determine if the destination address is within a same VLAN as a source address; if the VLAN IDs are the same, layer 2 or ARL lookup should be sufficient to properly switch the packet in a store and forward configuration. If the VLAN IDs are different, then layer three switching must occur based upon appropriate identification of the destination address, and switching to an appropriate port to get to the VLAN of the destination address. Layer three switching, therefore, must be performed in order to cross VLAN boundaries. Once SOC 10 determines that L3 switching is necessary, SOC 10 identifies the MAC address of a destination router, based upon the L3 lookup. L3 lookup is determined based upon a reading in the beginning portion of the packet of whether or not the L3 bit is set. If the L3 bit is set, then L3 lookup will be necessary in order to identify appropriate routing instructions. If the lookup is unsuccessful, a request is sent to CPU 52 and CPU 52 takes appropriate steps to identify appropriate routing for the packet. Once the CPU has obtained the appropriate routing information, the information is stored in the L3 lookup table, and for the next packet, the lookup will be successful and the packet will be switched in the store and forward configuration.

Thus, the present invention comprises a method for allocating memory locations of a network switch. The network switch has internal (on-chip) memory and an external (off-chip) memory. Memory locations are allocated between the internal memory and the external memory according to a pre-defined algorithm.

The pre-defined algorithm allocates memory locations between the internal memory and the external memory based upon the amount of internal memory available for the egress port of the network switch from which the data packet is to be transmitted by the network switch. When the internal memory available for the egress port from which the data packet is to be transmitted is above a predetermined threshold, then the data packet is stored in the internal memory.

When the internal memory available for the egress port from which the data packet is to be transmitted is below the predetermined threshold value, then the data packet is stored in the external memory.

Thus, this distributed hierarchical shared memory architecture defines a self-balancing mechanism. That is, for egress ports having few data packets in their egress queues, the incoming data packets which are to be switched to these egress ports are sent to the internal memory, whereas for egress ports having many data packets in their egress queues, the incoming data packets which are to be switched to these egress ports are stored in the external memory.

Preferably, any data packets which are stored in external memory are subsequently re-routed back to the internal memory before being provided to an egress port for transmission from the network switch.

Thus, according to the present invention, the transmission line rate is maintained on each egress port even though the architecture utilizes slower speed DRAMs for at least a portion of packet storage. Preferably, this distributed hierarchical shared memory architecture uses SRAM as a packet memory cache or internal memory and uses standard DRAMs or SDRAMs as an external memory, so as to provide a desired cost-benefit ratio.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

The preceding discussion of a specific network switch is provided for a better understanding of the discussion of the stacked configurations as will follow. It will be known to a person of ordinary skill in the art, however, that the inventions discussed herein with respect to stacking configurations are not limited to the particular switch configurations discussed above.

Figure 20:
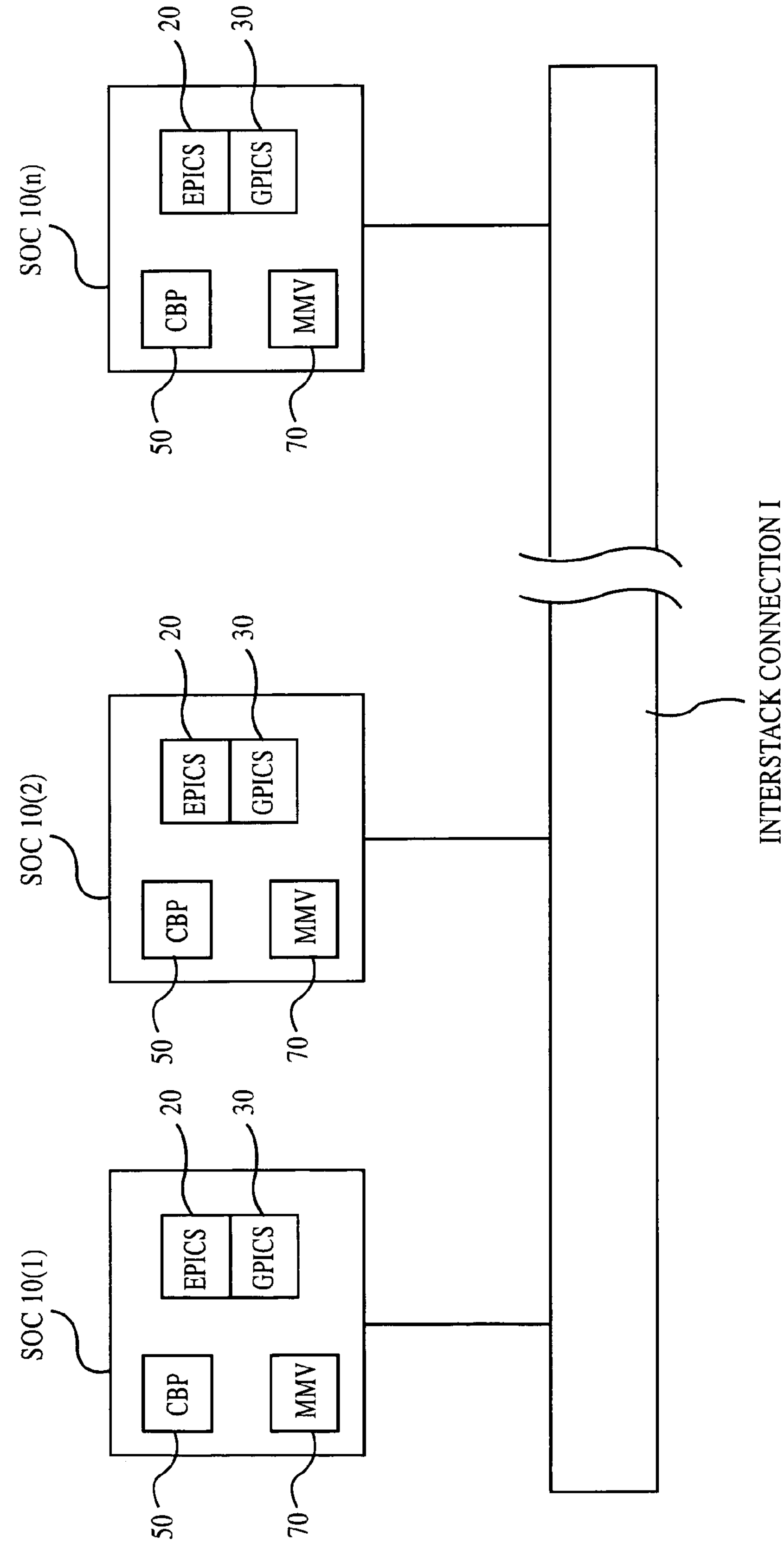
FIG. 20 illustrates a generic stacking configuration for network switches.
Figure 21:
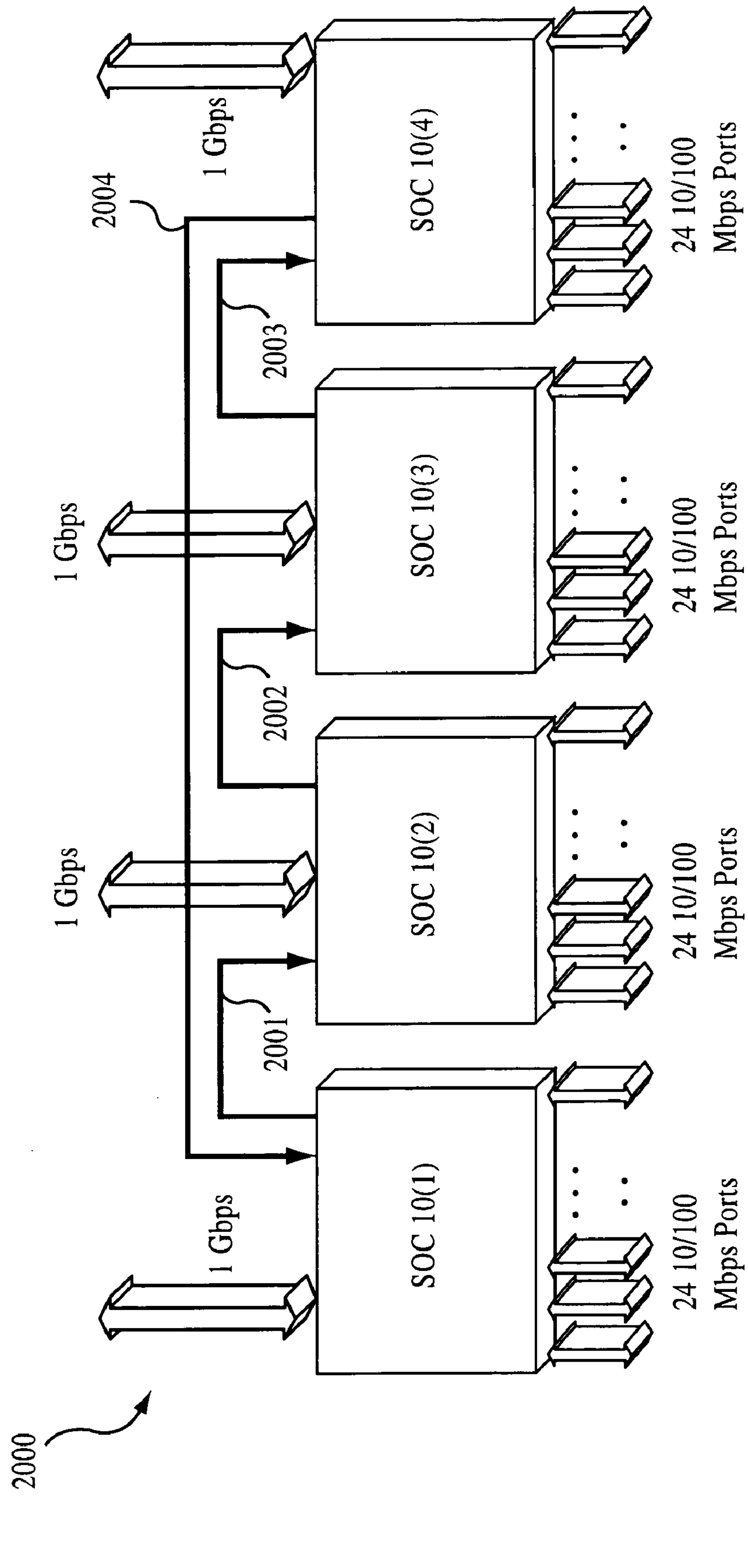
FIG. 21 illustrates a first embodiment of a stacking configuration for network switches.

FIG. 20 illustrates a configuration where a plurality of SOCs 10(1). . . . 10(*n*) are connected by interstack connection I. SOCs 10(1)–10(*n*) include the elements which are illustrated in FIG. 2. FIG. 20 schematically illustrates CVP 50, MMU 70, EPICs 20 and GPICs 30 of each SOC 10. Interstack connection I is used to provide a stacking configuration between the switches, and can utilize, as an example, at least one gigabit uplink or other ports of each switch to provide a simplex or duplex stacking configuration as will be discussed below. FIG. 2 illustrates a configuration wherein a plurality of SOCs 10(1)–10(4) are connected in a cascade configuration using GPIC modules 30 to create a stack. Using an example where each SOC 10 contains 24 low speed ethernet ports having a maximum speed of 100 Megabits per second, and two gigabit ports. The configuration of FIG. 21, therefore, results in 96 ethernet ports and 4 usable gigabit ports, with four other gigabit ports being used to link the stack as what is called a stacked link. Interconnection as shown in FIG. 21 results in what is referred to as a simplex ring, enabling unidirectional communication at a rate of one-two gigabits per second. All of the ports of the stack may be on the same VLAN, or a plurality of VLANs may be present on the stack. Multiple VLANs can be present on the same switch. The VLAN configurations are determined by the user, depending upon network requirements. This is true for all SOC 10 switch configurations. It should be noted, however, that these particular configurations used as examples only, and are not intended to limit the scope of the claimed invention.

Figure 22:
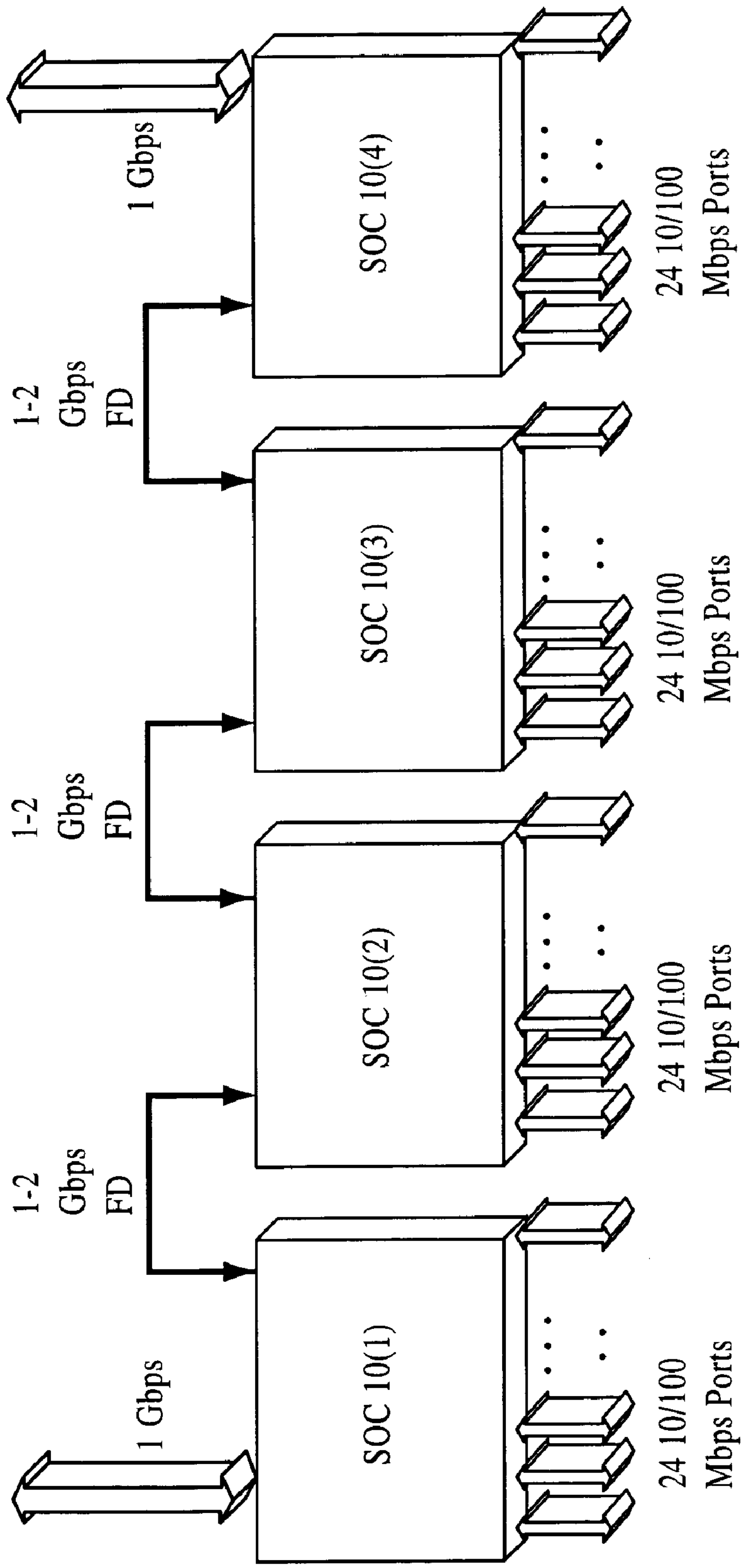
FIG. 22 illustrates a second embodiment of a stacking configuration for network switches.

FIG. 22 illustrates a second configuration of four stacked SOC 10 switches, SOC 10(1) . . . 10(4). However, any number of switches could be stacked in this manner. The configuration of FIG. 22 utilizes bi-directional gigabit links to create a full duplex configuration. The utilization of bi-directional gigabit links, therefore, eliminates the availability of a gigabit uplink for each SOC 10 unless additional GPIC modules are provided in the switch. The only available gigabit uplinks for the stack, therefore, are one gigabit port at each of the end modules. In this example, therefore, 96 low speed ethernet ports and 2 gigabit ethernet ports are provided.

Figure 23:
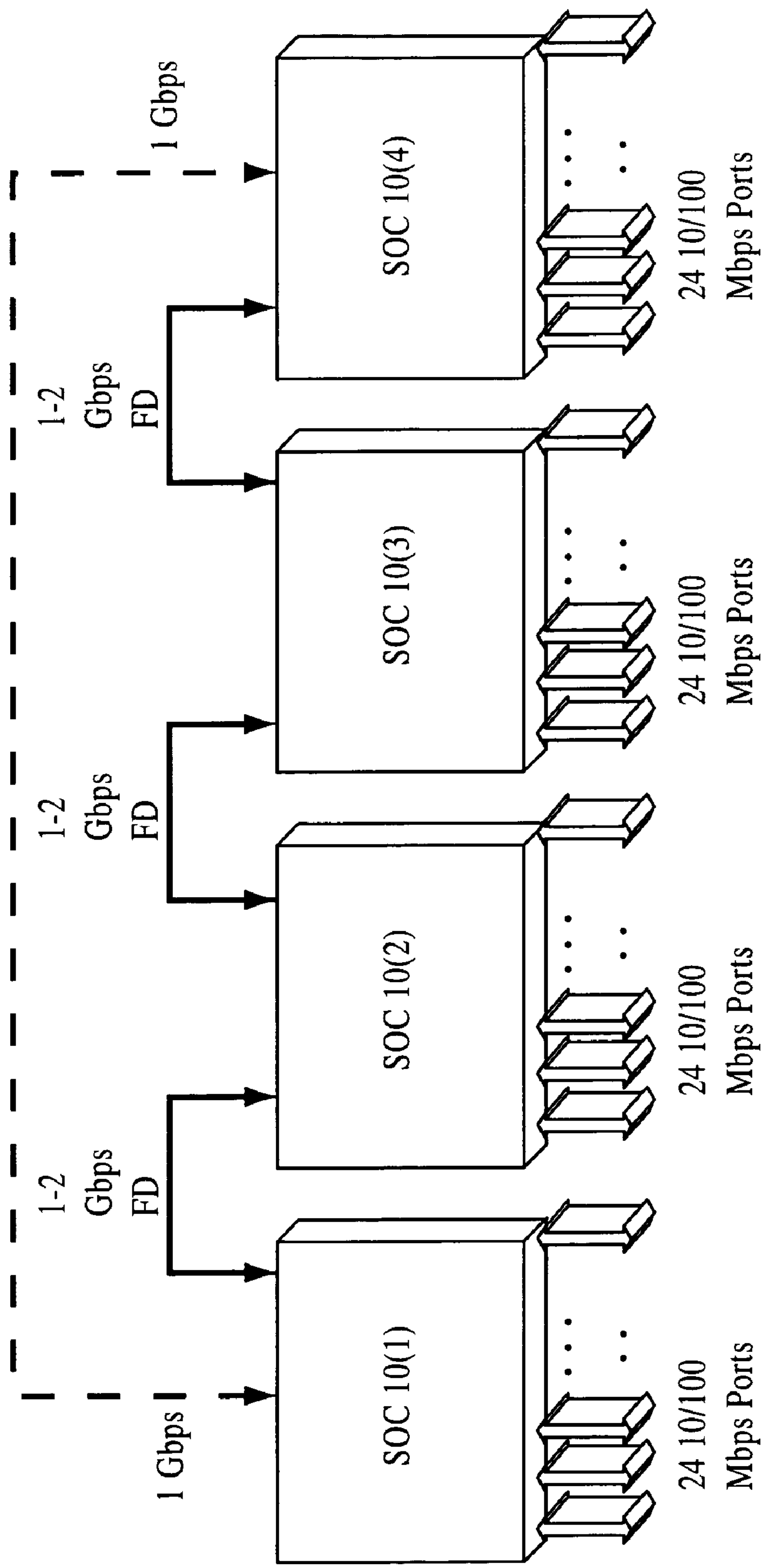
FIG. 23 illustrates a third embodiment of a stacking configuration for network switches.

FIG. 23 illustrates a third configuration for stacking four SOC 10 switches. In this configuration, the interconnection is similar to the configuration of FIG. 22, except that the two gigabit ports at the end modules are connected as a passive link, thereby providing redundancy. A passive link in this configuration is referred to in this manner since the spanning tree protocol discussed previously is capable of putting this link in a blocking mode, thereby preventing looping of packets. A trade-off in this blocking mode, however, is that no gigabit uplinks are available unless an additional GPIC module 30 is installed in each SOC 10. Packet flow, address learning, trunking, and other aspects of these stacked configurations will now be discussed.

In the embodiment of FIG. 21, as a first example, a series of unique steps are taken in order to control packet flow and address learning throughout the stack. A packet being sent from a source port on one SOC 10 to a destination port on another SOC 10 is cascaded in a series of complete store-and-forward steps to reach the destination. The cascading is accomplished through a series of interstack links or hops 2001, 2002, 2003, and 2004, which is one example of an implementation of interstack connection I. Referring to FIG. 24, packet flow can be analyzed with respect to a packet coming into stack 2000 on one port, destined for another port on the stack. In this example, let us assume that station A, connected to port 1 on SOC 10(1), seeks to send a packet to station B, located on port 1 of switch SOC 10(3). The packet would come in to the ingress submodule 14 of SOC 10(1). SOC 10(1) would be configured as a stacked module, to add a stack-specific interstack tag or IS tag into the packet. The IS tag is, in this example, a four byte tag which is added into the packet in order to enable packet handling in the stack. It should be noted that, in this configuration of the invention, SOC 10 is used as an example of a switch or router which can be stacked in a way to utilize the invention. The invention is not limited, however, to switches having the configuration of SOC 10; other switch configurations may be utilized. As discussed previously, SOC 10 slices incoming packets into 64 byte cells. Since cell handling is not an aspect of this portion of the invention, the following discussion will be directed solely to the handling of packets.

Figure 24A:
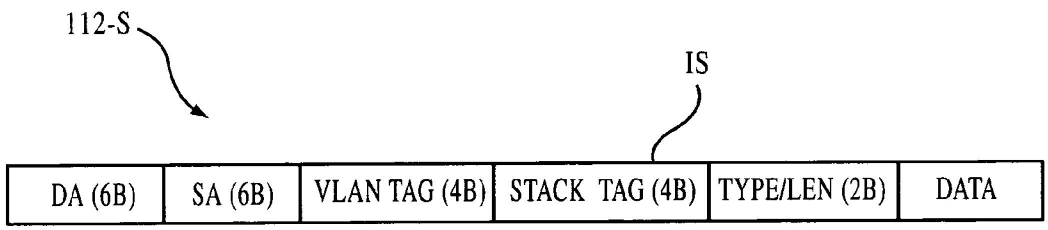
FIG. 24A illustrates a packet having an IS tag inserted therein.
Figure 24B:
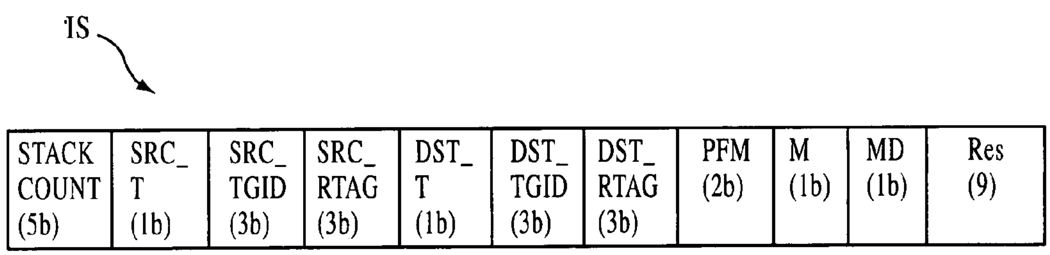
FIG. 24B illustrates the specific fields of the IS tag.

FIG. 24A illustrates an example of a data packet 112-S, having a four byte interstack tag IS inserted after the VLAN tag. It should be noted that although interstack tag IS is added after the VLAN tag in the present invention, the interstack tag could be effectively added anywhere in the packet. FIG. 24B illustrates the particular fields of an interstack tag, as will be discussed below:

Stack_Cnt—5 bits long—Stack count; describes the number of hops the packet can go through before it is deleted. The number of hops is one less than the number of modules in the stack. If the stack count is zero the packet is dropped. This is to prevent looping of the packet when there is a DLF. This field is not used when the stacking mode is full-duplex.

SRC_T—1 bit long—If this bit is set, then the source port is part of a trunk group.

SRC_TGID—3 bits long—SRC_TGID identifies the Trunk Group if the SRC_T bit is set.

SRC_RTAG—3 bits long—SRC_RTAG identifies the Trunk Selection for the source trunk port. This is used to populate the ARL table in the other modules if the SRC_T bit is set.

DST_T—1 bit long—If this bit is set, the destination port is part of a trunk group.

DST_TGID—3 bits long—DST_TGID identifies the Trunk Group if the DST_T bit is set.

DST_RTAG—3 bits long—DST_RTAG identifies the Trunk Selection Criterion if the DST_T bit is set.

PFM—2 bits long—PFM—Port Filtering Mode for port N (ingress port).

Value O—operates in Port Filtering Mode A; Value 1—operates in Port Filtering Mode B (default); and Value 2—operates in Port Filtering Mode C.

M—1 bit long—If this bit is set, then this is a mirrored packet.

MD—1 bit long—If this bit is set and the M bit is set, then the packet is sent only to the mirrored-to-port. If this bit is not set and the M bit is set, then the packet is sent to the mirrored-to-port as well as the destination port (for ingress mirroring).

Reserved—9 bits long—Reserved for future use.

In the case of SOC 10, if the incoming packet is untagged, the ingress will also tag the packet with an appropriate VLAN tag. The IS tag is inserted into the packet immediately after the VLAN tag. An appropriate circuit is provided in each SOC 10 to recognize and provide the necessary tagging information.

With respect to the specific tag fields, the stack count field corresponds to the number of modules in the stack, and therefore describes the number of hops which the packet can go through before it is deleted. The SRC_T tag is the same as the T bit discussed previously with respect to ARL tables 21 in SOC 10. If the SRC_T bit is set, then the source port is part of a trunk group. Therefore, if the SRC_T bit is set in the IS tag, then the source port has been identified as a trunk port. In summary, therefore, as the packet comes in to SOC 10(1), an ARL table lookup, on the source lookup, is performed. The status of the T bit is checked. If it is determined that the source port is a trunk port, certain trunk rules are applied as discussed previously, and as will be discussed below.

The SRC_TGID field is three bits long, and identifies the trunk group if the SRC_T bit has been set. Of course, if the SRC_T bit has not been set, this field is not used. Similarly, the SRC_RTAG identifies the trunk selection for the source trunk port, also as discussed previously. The remaining fields in the IS tag are discussed above. Packet flow within stack 2000 is defined by a number of rules.

Addresses are learned as discussed previously, through the occurrence of a source lookup failure (SLF). Assuming that the stack is being initialized, and all tables on each of SOC 10(1). SOC 10(4) are empty. A packet being sent from station A on port number 1 of SOC 10(1), destined for station B on port number 1 of SOC 10(3), comes into port number 1 of SOC 10(1). When arriving at ingress submodule 14 of SOC 10(1), an interstack tag, having the fields set forth above, is inserted into the packet. Also, if the packet is an untagged packet, a VLAN tag is inserted immediately before the IS tag. ARL engine 143 of SOC 10(1) reads the packet, and identifies the appropriate VLAN based upon either the tagged VLAN table 231 or port based VLAN table 232. An ARL table search is then performed. Since the ARL tables are empty, a source lookup failure (SLF) occurs. As a result, the source MAC address of station A of the incoming packet is "learned" and added to the ARL table within ARL/L3 table 21*a* of SOC 10(1). Concurrently, a destination search occurs, to see if the MAC address for destination B is located in the ARL table. A destination lookup failure (DLF) will occur. Upon the occurrence of a DLF, the packet is flooded to all ports on the associated VLAN to which the source port belongs. As a result, the packet will be sent to SOC 10(2) on port 26 of SOC 10(1), and thereby received on port 26 of SOC 10(2). The interstack link, which in this case is on port 26, must be configured to be a member of that VLAN if the VLAN spans across two or more switches. Before the packet is sent out from SOC 10(1), the stack count field of the IS tag is set to three, which is the maximum value for a four module stack as illustrated in FIG. 21. For any number of switches n, the stack count is initially set to n-1. Upon receipt on port 26 of SOC 10(2) via interconnect 2001, a source lookup is performed by ingress submodule 14 of SOC 10(2). A source lookup failure occurs, and the MAC address for station A is learned on SOC 10(2). The stack count of the IS tag is decremented by one, and is now 2. A destination lookup failure occurs on destination lookup, since destination B has not been learned on SOC 10(2). The packet is therefore flooded on all ports of the associated VLAN. The packet is then received on port 26 of SOC 10(3). On source lookup, a source lookup failure occurs, and the address is learned in the ARL table of SOC 10(3). The stack count field is decremented by one, a destination lookup failure occurs, and the packet is flooded to all ports of the associated VLAN. When the packet is flooded to all ports, the packet is received at the destination on port number 1 of SOC 10(3). The packet is also sent on the interstack link to port 26 of SOC 10(4). A source lookup failure results in the source address, which is the MAC address for station A, being learned on the ARL table for SOC 10(4). The stack count is decremented by one, thereby making it zero, and a destination lookup occurs, which results in a failure. The packet is then sent to all ports on the associated VLAN. However, since the stack count is zero, the packet is not sent on the interstack link. The stack count reaching zero indicates that the packet has looped through the stack once, stopping at each SOC 10 on the stack. Further looping through the stack is thereby prevented.

The following procedure is followed with respect to address learning and packet flow when station B is the source and is sending a packet to station A. A packet from station B arrives on port 1 of SOC 10(3). Ingress 14 of SOC 10(3) inserts an appropriate IS tag into the packet. Since station B, formerly the destination, has not yet been learned in the ARL table of SOC 10(3), a source lookup failure occurs, and the MAC address for station B is learned on SOC 10(3). The stack count in the interstack tag, as mentioned previously, is set to three (n-1). A destination lookup results in a hit, and the packet is switched to port 26. For stacked module 10(3), the MAC address for station A has already been learned and thereby requires switching only to port 26 of SOC 10(3). The packet is received at port 26 of SOC 10(4). A source lookup failure occurs, and the MAC address for station B is learned in the ARL table of SOC 10(4). The stack count is decremented to two, and the destination lookup results in the packet being sent out on port 26 of SOC 10(4). The packet is received on port 26 of SOC 10(1), where a source lookup failure occurs, and the MAC address for station B is learned on the ARL table for SOC 10(1). Stack count is decremented, and the destination lookup results in the packet being switched to port 1. Station A receives the packet. Since the stack count is still one, the packet is sent on the stack link to port 26 of SOC 10(2). A source lookup failure occurs, and the MAC address for station B is learned on SOC 10(2). Stack count is decremented to zero. A destination lookup results in a hit, but the packet is not switched to port 26 because the stack count is zero. The MAC addresses for station A and station B have therefore been learned on each module of the stack. The contents of the ARL tables for each of the SOC 10 modules are not identical, however, since the stacking configuration results in SOC 10(2), 10(3), and 10(4) identifying station A as being located on port 26, because that is the port on the particular module to which the packet must be switched in order to reach station A. In the ARL table for SOC 10(1), however, station A is properly identified as being located on port 1. Similarly, station B is identified as being located on port 26 for each SOC except for SOC 10(3). Since station A is connected to port 1 of SOC 10(3), the ARL table for SOC 10(3) properly identifies the particular port on which the station is actually located.

After the addresses have been learned in the ARL tables, packet flow from station A to station B requires fewer steps, and causes less switch traffic. A packet destined for station B comes in from station A on port number 1 of SOC 10(1). An IS tag is inserted by the ingress. A source lookup is a hit because station A has already been learned, stack count is set to three, and the destination lookup results in the packet being switched to port 26 of SOC 10(1). SOC 10(2) receives the packet on port 26, a source lookup is a hit, stack count is decremented, and a destination lookup results in switching of the packet out to port 26 of SOC 10(3). SOC 10(3) receives the packet on port 26, source lookup is a hit, stack count is decremented, destination lookup results in a hit, and the packet is switched to port 1 of SOC 10(3), where it is received by station B. Since the stack count is decremented for each hop after the first hop, it is not yet zero. The packet is then sent to SOC 10(4) on port 26 of SOC 10(3), in accordance with the stack configuration. Source lookup is a hit, stack count is decremented, destination lookup is a hit, but the packet is then dropped by SOC 10(4) since the stack count is now zero.

It should be noted that in the above discussion, and the following discussions, ingress submodule 14, ARL/L3 table 21, and other aspects of an EPIC 20, as discussed previously, are generally discussed with respect to a particular SOC 10. It is noted that in configurations wherein SOC 10*s* are stacked as illustrated in FIGS. 20-23, ports will be associated with a particular EPIC 20, and a particular ingress submodule, egress submodule, etc. associated with that EPIC will be utilized. In configurations where the stacked switches utilize a different switch architecture, the insertion of the interstack tag, address learning, stack count decrement, etc. will be handled by appropriately configured circuits and submodules, as would be apparent to a person of skill in the art based upon the information contained herein. It should be noted that switches which are stacked in this configuration also includes a circuit or other means which strips or removes the IS tag and the port VLAN ID (if added) from the packet before the packet is switched out of the stack. The IS tag and the port VLAN ID are important only for handling within a stack and/or within the switch.

Aging of ARL entries in a configuration utilizing SOC 10 switches is as discussed previously. Each ARL table ages entries independently of each other. If an entry is deleted from one SOC 10 (tables within each switch are synchronized as discussed above, but not tables within a stack), a source lookup failure will only occur in that switch if a packet is received by that switch and the address has already been aged out. A destination lookup failure, however, may not necessarily occur for packets arriving on the stack link port; if the DST_T bit is set, a destination lookup failure will not occur. Necessary destination information can be picked up from the DST_TGID and DST_RTAG fields. If the DST_T bit is not set, however, and the address has been deleted or aged out, then a destination lookup failure will occur in the local module.

Although aging should be straightforward in view of the above-referenced discussion, the following example will presume that the entries for station A and station B have been deleted from SOC 10(2) due to the aging process. When station A seeks to send a packet to station B, the following flow occurs. Port 1 of SOC 10(1) receives the packet; on destination lookup, the packet is switched to port 26 due to a destination hit; stack count is set to three. The packet is received on port 26 of switch SOC 10(2), and a source lookup results in a source lookup failure since the address station A had already been deleted from the ARL table. The source address is therefore learned, and added to the ARL table of SOC 10(2). The stack count is decremented to two. The destination lookup results in a destination lookup failure, and the packet is flooded to all ports of the associated VLAN on SOC 10(2). The packet is received on port 26 of SOC 10(3), where the stack count is decremented to one, the destination lookup is a hit and the packet is switched to port 1, where it is received by station B. The packet is then forwarded on the stack link or interstack link to port 26 of SOC 10(4), where the stack count is decremented to zero. Although the destination lookup is a hit indicating that the packet should be sent out on port 26, the packet is dropped because the stack count is zero.

Figure 26:
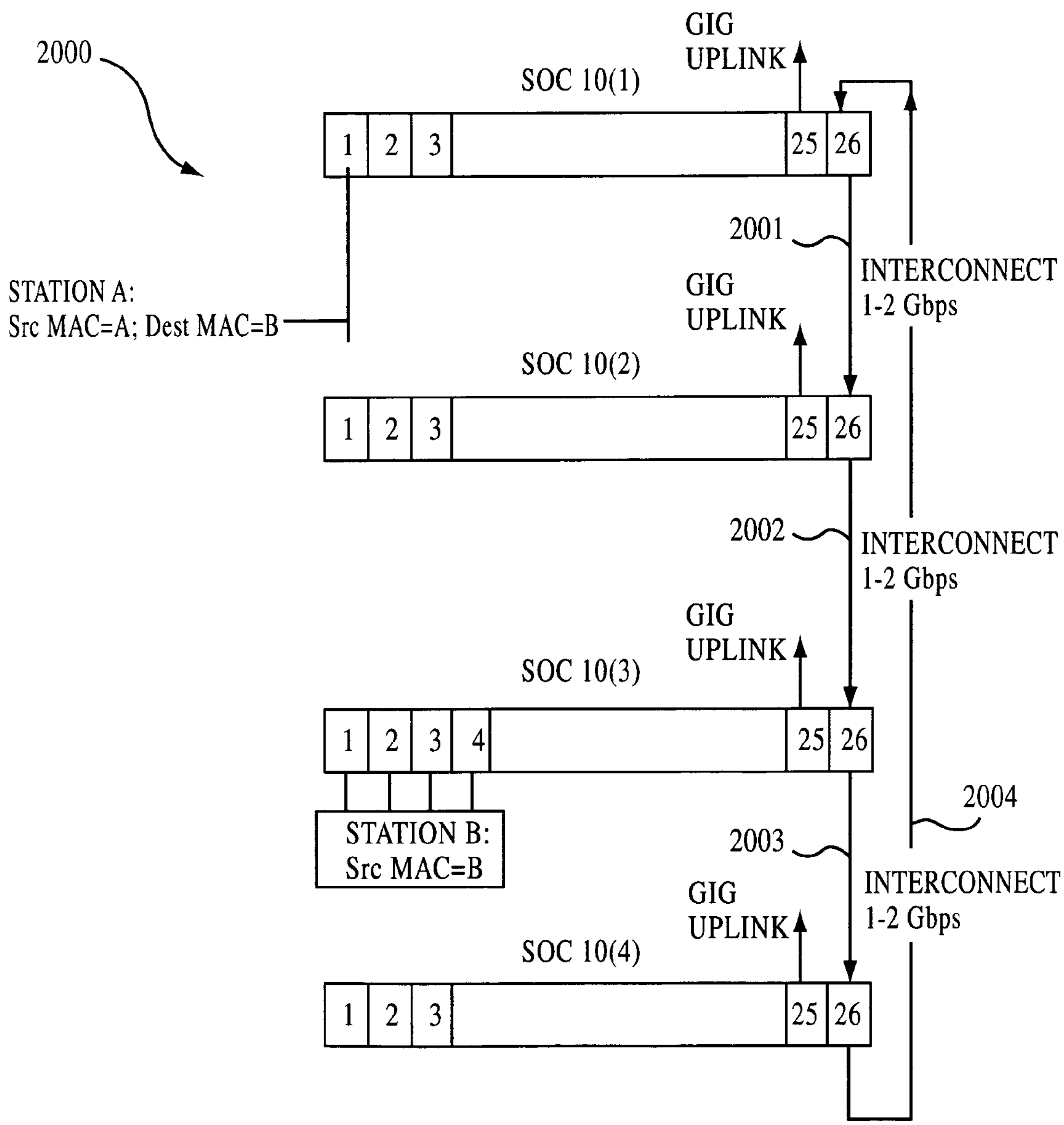
FIG. 26 illustrates address learning similar to FIG. 25, but with a trunking configuration.

FIG. 26 illustrates packet flow in a simplex connection as shown in FIG. 21, but where trunk groups are involved. In the example of FIG. 26, a trunk group is provided on SOC 10(3), which is an example where all of the members of the trunk group are disposed on the same module. In this example, station B on SOC 10(3) includes a trunk group of four ports. This example will assume that the TGID is two, and the RTAG is two for the trunk port connecting station B. If station A is seeking to send a packet to station B, port 1 of SOC 10(1) receives the packet from station A. Assuming that all tables are empty, a source lookup failure occurs, and the source address or MAC address of station A is learned on switch 1. A destination lookup failure results, and the packet is flooded to all ports of the VLAN. As mentioned previously, of course, the appropriate interstack or IS tag is added on the ingress, and the stack count is set to three. The packet is received on port 26 of SOC 10(2), and a source lookup failure occurs resulting in the source address of the packet from port 26 being learned. The stack count is decremented to two. A destination lookup failure occurs, and the packet is sent to all ports of the VLAN on SOC 10(2). The packet is then received on port 26 of switch SOC 10(3). A source lookup failure occurs, and the address is learned in the ARL table for switch SOC 10(3). The stack count is decremented to one. On destination lookup, a destination lookup failure occurs. A destination lookup failure on a switch having trunk ports, however, is not flooded to all trunk ports, but only sent on a designated trunk port as specified in the 802.1Q table and in the PVLAN table, in addition to other ports which are members of the associated VLAN. Station B then receives the packet. Since the stack count is not yet zero, the packet is sent to SOC 10(4). A source lookup failure occurs, the address is learned, the stack count is decremented to zero, a destination lookup occurs which results in a failure. The packet is then flooded to all ports of the associated VLAN except the stack link port, thereby again preventing looping through the stack. It should be noted that, once the stack count has been decremented to zero in any packet forwarding situation, if the destination lookup results in a hit, then the packet will be forwarded to the destination address. If a destination lookup failure occurs, then the packet will be forwarded to all ports on the associated VLAN except the stack link port, and except any trunk ports according to the 802.1 Q table. If the destination lookup results in the destination port being identified as the stacked link port, then the packet is dropped since a complete loop would have already been made through the stack, and the packet would have already been sent to the destination port.

Figure 25:
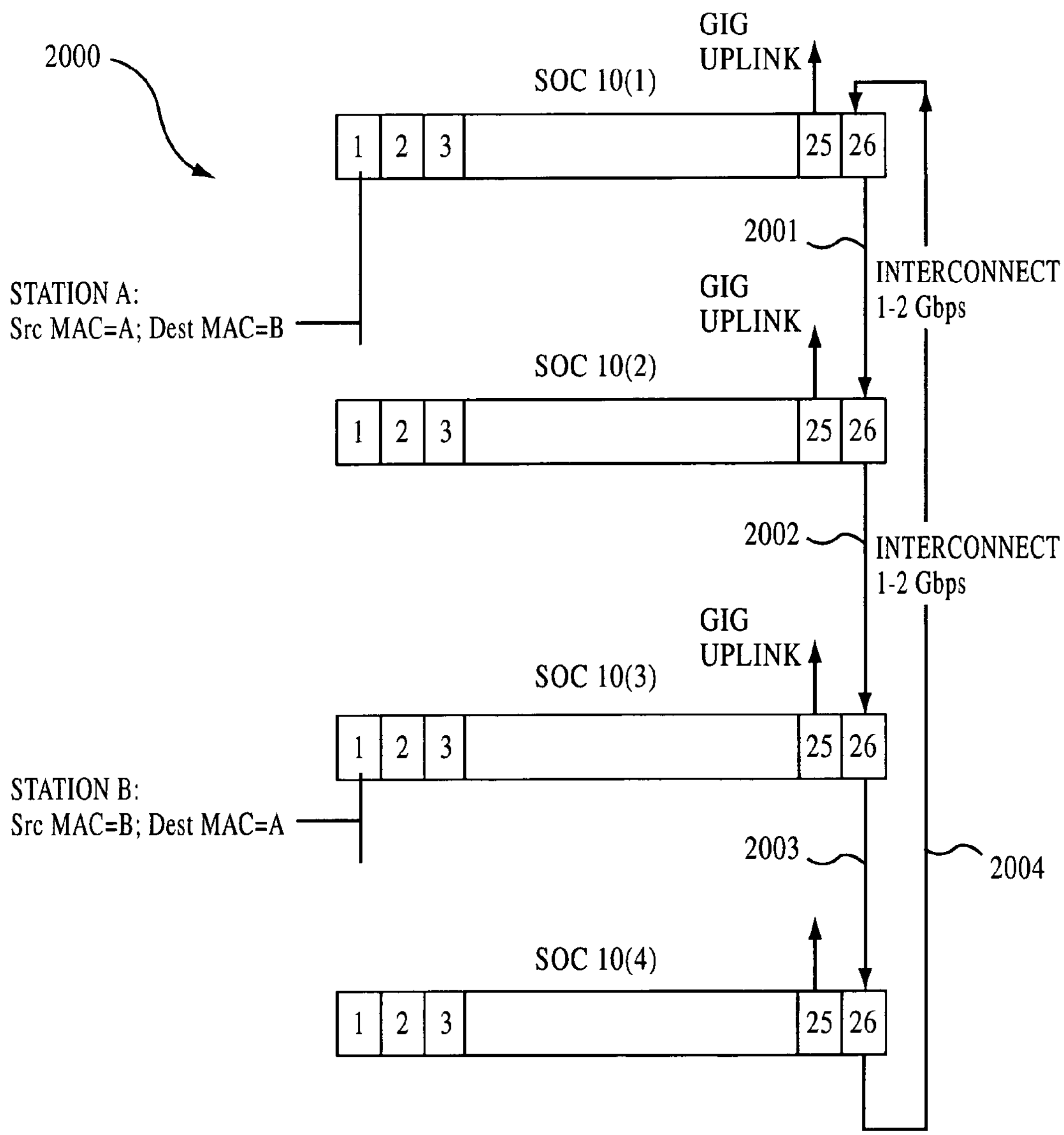
FIG. 25 illustrates address learning in a stacking configuration as illustrated in FIG. 20.

For the situation where station B on the trunk port sends a packet to station A, this example will presume that the packet arrives from station B on port 1 of SOC 10(3). The ingress submodule 14 of SOC 10(3) appends the appropriate IS tag. On address lookup, a source lookup failure occurs and the source address is learned. Pertinent information regarding the source address for the trunk configuration is port number, MAC address, VLAN ID, T bit status, TGID, and RTAG. Since the packet coming in from station B is coming in on a trunk port, the T bit is set to 1, and the TGID and RTAG information is appropriately picked up from the PVLAN table. The stack count is set to three, and the ingress logic of SOC 10(3) performs a destination address lookup. This results in a hit in the ARL table, since address A has already been learned. The packet is switched to port 26 of SOC 10(3). The trunking rules are such that the packet is not sent to the same members of the trunk group from which the packet originated. The IS tag, therefore, is such that the SRC_T bit is set, the SRC_TGID equals 2, and the SRC_RTAG equals 2. The packet is received on port 26 of SOC 10(4); a source lookup occurs, resulting in a source lookup failure. The source address of the packet is learned, and since the SRC_T bit is set, the TGID and the RTAG information is picked up from the interstack tag. The stack count is decremented by one, and a destination lookup is performed. This results in an ARL hit, since address A has already been learned. The packet is switched on port 26 of SOC 10(4). The packet is then received on port 26 of switch SOC 10(1). A source lookup results in a source lookup failure, and the source address of the packet is learned. The TGID and RTAG information is also picked up from the interstack tag. The destination lookup is a hit, and the packet is switched to port 1. Station A receives the packet. The packet is also sent on the interstack link to SOC 10(2), since the stack count is not yet zero. The source address is learned on SOC 10(2) because of a source lookup failure, and although the destination lookup results in a hit, the packet is not forwarded since the stack count is decremented to zero in SOC 10(2). FIGS. 27A–27D illustrate examples of the ARL table contents after this learning procedure. FIG. 25A illustrates the ARL table information for SOC 10(1), FIG. 27B illustrates the ARL table information for SOC 10(2), FIG. 27C illustrates the ARL table information for SOC 10(3) and FIG. 27D illustrates the ARL table information for SOC 10(4). As discussed previously, the ARL table synchronization within each SOC 10 ensures that all of the ARL tables within a particular SOC 10 will contain the same information.

After the addresses are learned, packets are handled without SLFs and DLFs unless aging or other phenomena results in address deletion. The configuration of the trunk group will result in the DST_T bit being set in the IS tag for packets destined for a trunk port. The destination TGID and destination RTAG data are picked up from the ARL table. The setting of the destination T bit (DST_T) will result in the TGID and RTAG information being picked up; if the DST_T bit is not set, then the TGID and RTAG fields are not important and are considered "don't care" fields.

Figure 28:
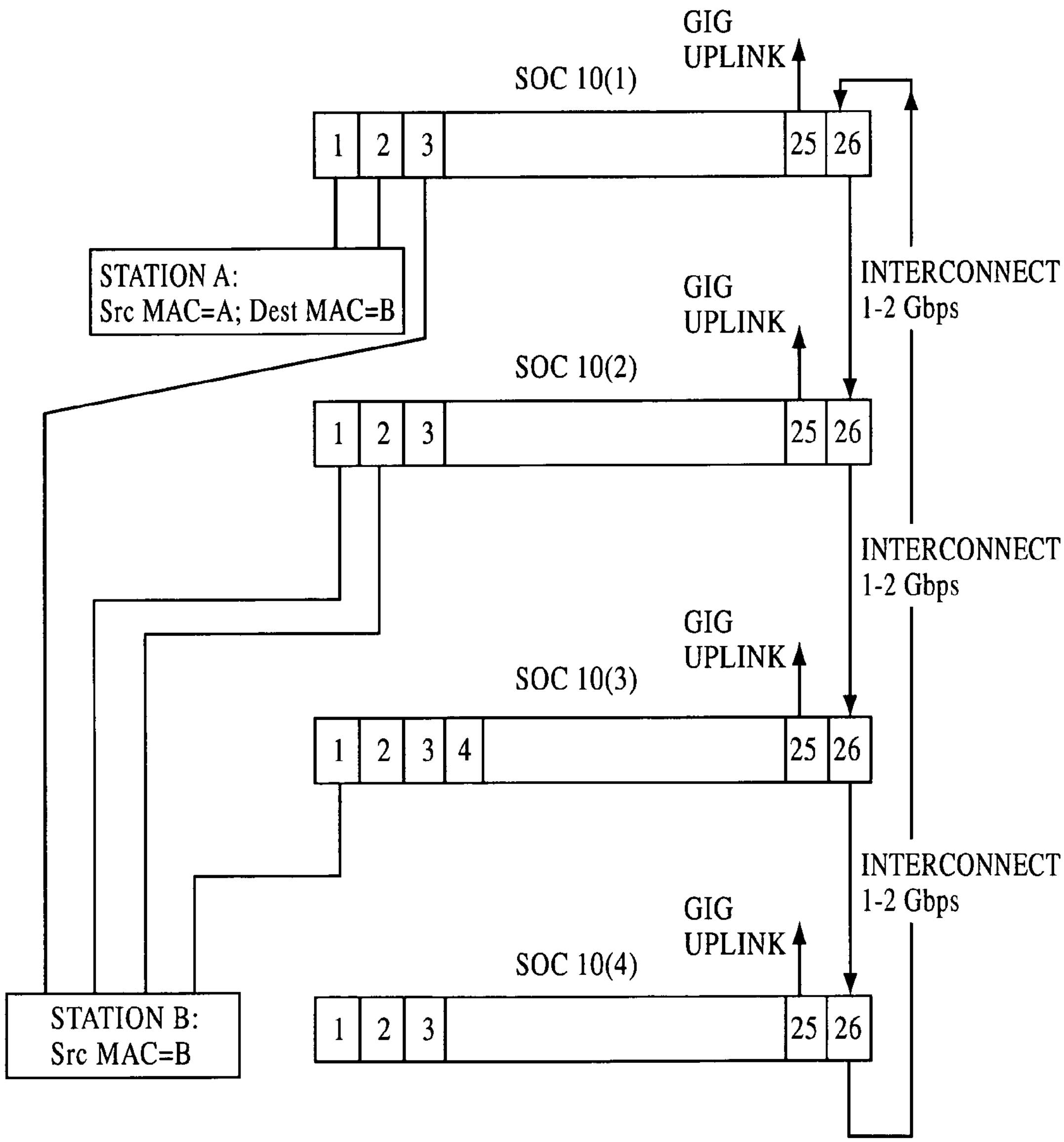
FIG. 28 illustrates another trunking configuration.

FIG. 28 illustrates a configuration where trunk members are spread across several modules. FIG. 28 illustrates a configuration wherein station A is on a trunk group having a TGID of 1 and an RTAG of 1. Station A on a trunk port on switch SOC 10(1) sends a packet to station B on a trunk port in switch SOC 10(3). A packet is received from station A on, for example, trunk port 1 of SOC 10. The IS tag is inserted into the packet, a source lookup failure occurs, and the address of station A is learned on SOC 10(1). In the ARL table for SOC 10(1), the MAC address and VLAN ID are learned for station A, the T bit is set to one since the source port is located on a trunk group. The stack count is set to three, a destination lookup is performed, and a destination lookup failure occurs. The packet is then "flooded" to all ports of the associated VLAN. However, in order to avoid looping, the packet cannot be sent out on the trunk ports. For this purpose, the TGID is very important. The source TGID identifies the ports which are disabled with respect to the packet being sent on all ports in the event of a DLF, multicast, unicast, etc., so that the port bitmap is properly configured. The destination TGID gives you the trunk group identifier, and the destination RTAG gives you the index into the table to point to the appropriate port which the packet goes out on. The T bit, TGID, and RTAG, therefore, control appropriate communication on the trunk port to prevent looping. The remainder of address learning in this configuration is similar to that which is previously described; however, the MAC address A is learned on the trunk port. The above-described procedure of one loop through the stack occurs, learning the source addresses, decrementing the stack count, and flooding to appropriate ports on DLFs, until the stack count becomes zero.

In a case where station A sends a packet to station B after the addresses are learned, the packet is received from station A on the trunk port, the source lookup indicates a hit, and the T bit is set. SRC_T bit is set, the TGID and RTAG for the source trunk port from the ARL table is copied to the SRC_TGID and SRC_RTAG fields. In the inserted IS tag, the stack count is set to three. Destination lookup results in a hit, and the T bit is set for the destination address. The DST_T bit is set, and the TGID and RTAG for the destination trunk port for the ARL table is copied to the DST_TGID and the DST_RTAG. Port selection is performed based upon the DST_TGID and DST_RTAG. In this example, port selection in SOC 10(1) indicates the stack link port of SOC 10(2) is port 26. The packet is sent on port 26 to SOC 10(2). Since the DST_T bit is set, the TGID and RTAG information is used to select the trunk port. In this example, the packet is sent to port 26. The packet is then received on port 26 of SOC 10(3). In this case, the DST_T bit, TGID, and RTAG information are used to select the trunk port which, in FIG. 26, is port 1. In each hop, of course, the stack count is decremented. At this point, the stack count is currently one, so the packet is sent to SOC 10(4). The packet is not forwarded from SOC 10(4), however, since decrementing the stack count results in the stack count being zero.

Stack Management

Figure 29:
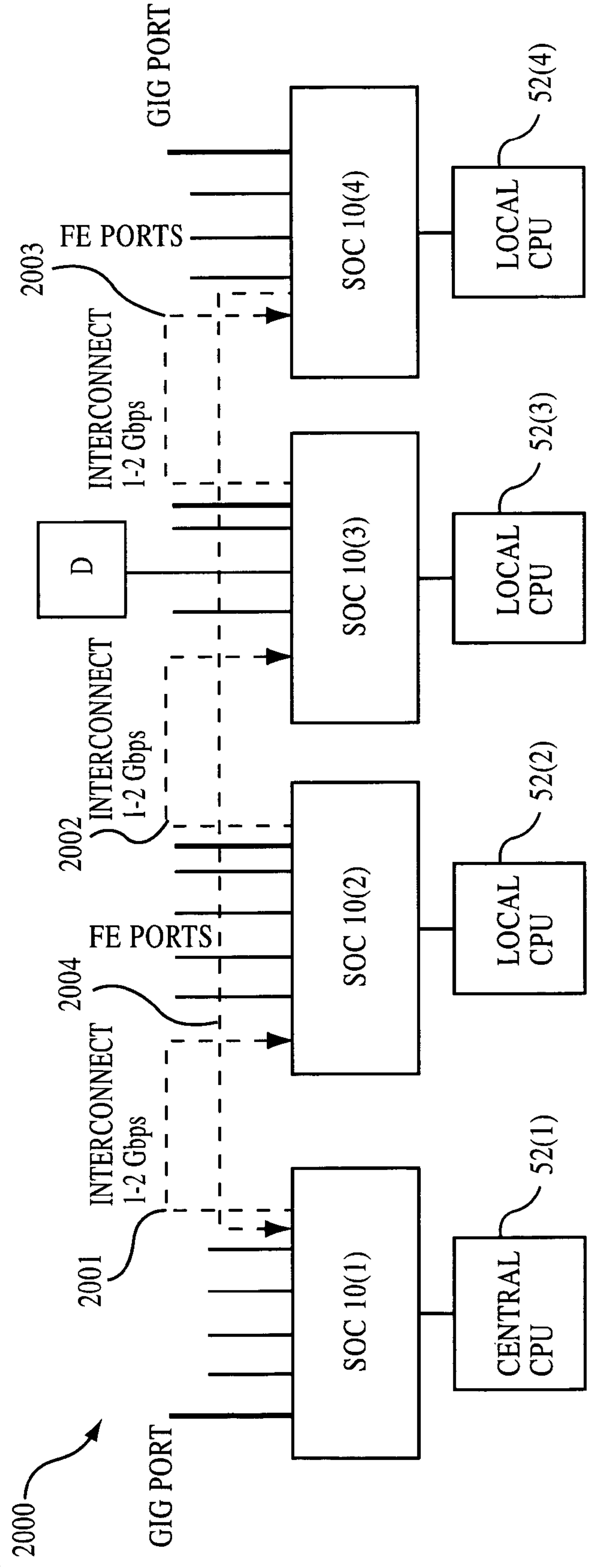
FIG. 29 illustrates the handling of SNMP packets utilizing a central CPU and local CPUs.

FIG. 29 illustrates a configuration of stack 2000 wherein a plurality of CPUs 52(1) . . . 52(4) which work in conjunction with SOC 10(1), 10(2), 10(3), and 10(4), respectively. The configuration in this example is such that CPU 52(1) is a central CPU for controlling a protocol stack for the entire system. This configuration is such that there is only one IP address for the entire system. The configuration of which SOC 10 is directly connected to the central CPU is determined when the stack is configured. The configuration of FIG. 29 becomes important for handling unique protocols such as simple network management protocol (SNMP). An example of an SNMP request may be for station D, located on a port of SOC 10(3), to obtain information regarding a counter value on SOC 10(4). To enable such inquiries, the MAC address for SOC 10(1), containing central CPU 52(1), is programmed in all ARL tables such that any packet with that destination MAC address is sent to SOC 10(1). The request is received on SOC 10(3). The ingress logic for SOC 10(3) will send the packet to SOC 10(1), by sending the packet first over stack link or interstack link 2003 to SOC 10(4), which then sends the packet over interstack link 2004 to reach SOC 10(1). Upon receipt, the packet will be read and passed to central CPU 52(1), which will process the SNMP request. When processing the request, central CPU 52(1) will determine that the request requires data from switch SOC 10(4). SOC 10(1) then sends a control message to SOC 10(4), using SOC 10(4)'s MAC address, to read the counter value. The counter value is read, and a control message reply is sent back to SOC 10(1), using SOC 10(1)'s MAC address. After SOC 10(1) receives the response, an SNMP response is generated and sent to station D.

Port Mirroring

In certain situations, a network administrator or responsible individual may determine that certain types of packets or certain ports will be designated such that copies of packets are sent to a designated "mirrored to" port. The mirrored-to designation is identified in the address resolution process by the setting of the M bit in the interstack tag. If the M bit is set, the module ID is picked up from the port mirroring register in the ARL table, and the module ID is made part of the interstack tag. The port mirroring register contains a six bit field for the mirrored-to port. The field represents the port number on which the packet is to be sent for mirroring. If the port number is a stack link or interstack link port, then the mirrored-to port is located on another module. If the port number is other than the stack link, then the mirrored-to port is on the local module. When a packet is sent on the stack link with the M bit set and the MD bit set, the appropriate module will receive the packet and send the packet to the mirrored-to port within that module which is picked from the port mirroring register of that module. The packet is not sent to the destination port. If the M bit is set and the MD bit is not set, then the packet is sent to the mirrored-to port as well as the destination port.

Full Duplex

Figure 30:
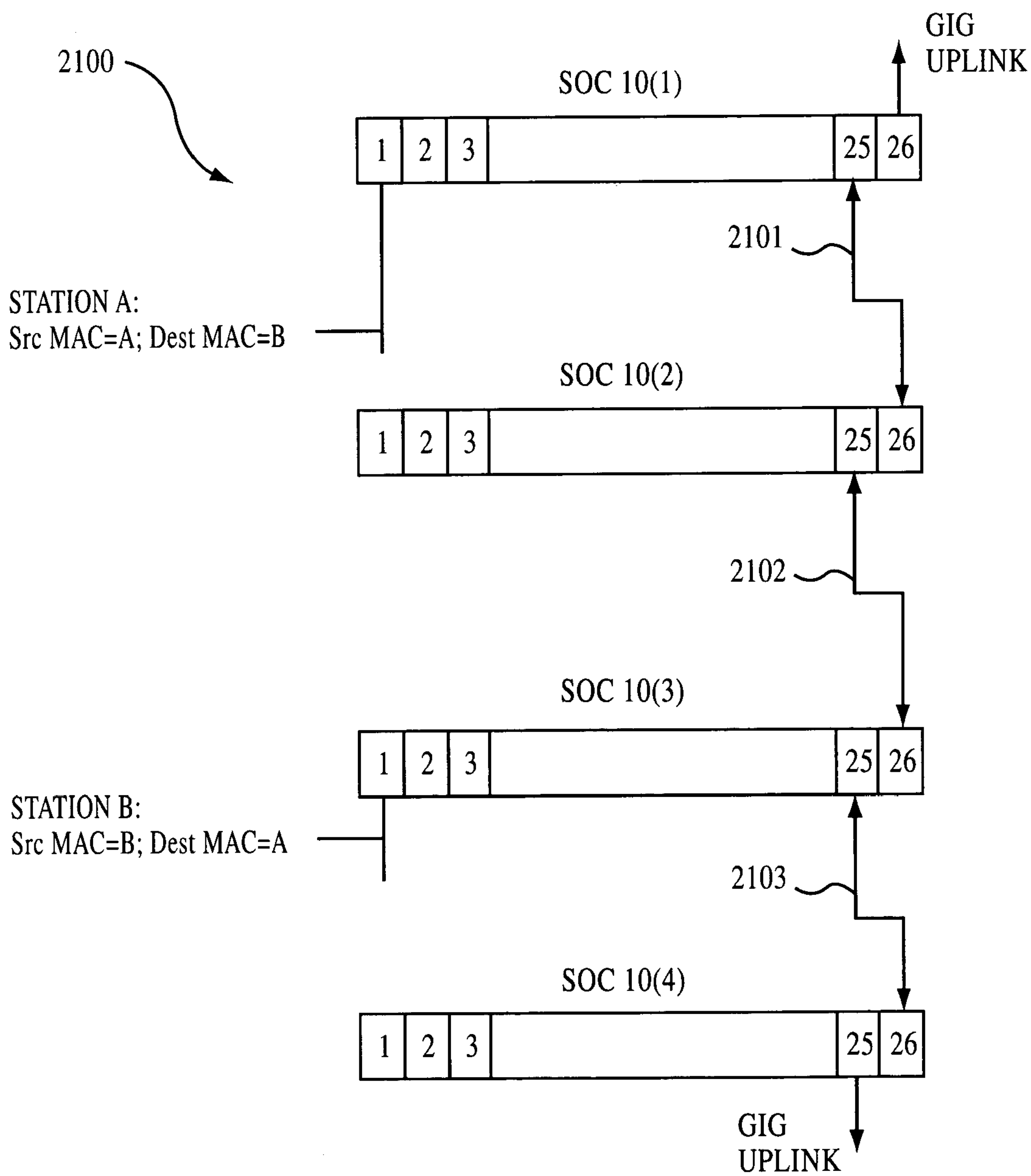
FIG. 30 illustrates address learning in a duplex configuration as illustrated in FIGS. 22 and 23.

Reference will now be made to FIG. 30. This figure will be used to illustrate packet flow among switches on the duplex-configured stack arrangements illustrated in FIGS. 22 and 23. As mentioned previously, the configurations of FIG. 22 and FIG. 23 both provide full duplex communication. The configuration of Figure of 23, however, utilizes the remaining gigabit uplinks to provide a level of redundancy and fault tolerance. In practice, however, the configuration of FIG. 22 may be more practical. In properly functioning duplex configured stacks, however, packet flow and address learning are essentially the same for both configurations.

Duplex stack 2100 includes, in this example, four switches such as SOC 10(1) . . . SOC 10(4). Instead of 4 unidirectional interstack links, however, bi-directional links 2101, 2102, and 2103 enable bi-directional communication between each of the switches. This configuration requires that each of the ports associated with the interstack links are located on the same VLAN. If a plurality of VLANs are supported by the stack, then all of the ports must be members of all of the VLANs. The duplex configuration enables SOC 10(2), as an example to be able to communicate with SOC 10(1) with one hop upward, rather than three hops downward, which is what would be required in the unidirectional simplex configuration. SOC 10(4), however, will require 3 hops upward to communicate with SOC 10(1), since there is no direct connection in either direction. It should be noted that upward and downward are used herein as relative terms with respect to the figures, but in actual practice are only logical hops rather than physical hops. Because of the multi-directional capabilities, and because port bitmaps prevent outgoing packets from being sent on the same ports upon which they came in, the stack count portion of the interstack tag is not utilized.

The following discussion will be directed to packet flow in a situation where station A, located on port 1 of SOC 10(1) in FIG. 30, seeks to send a packet to station B, located on port 1 of SOC 10(3). The packet comes in to ingress 14 of SOC 10(1); an interstack tag is inserted into the packet. Since all of the tables are initially empty, a source lookup failure will occur, and the address of station A is learned on the appropriate ARL table of SOC 10(1). A destination lookup failure will occur, and the packet will be sent to all ports of the associated VLAN. In the configuration of FIG. 30, therefore, the packet will be sent on interstack link 2101 from port 25 of SOC 10(1) to port 26 of SOC 10(2). A source lookup failure occurs, and the source address is learned on SOC 10(2). A destination lookup failure occurs, and the packet is sent on all ports of the associated VLAN. The switches are configured such that the port bitmaps for DLFs do not allow the packet to be sent out on the same port on which it came in. This would include port 25 of switch SOC 10(2), but not port 26 of SOC 10(2). The packet will be sent to port 26 of switch SOC 10(3) from port 25 of SOC 10(2). A source lookup failure will occur, the address for station A will be learned in the ARL table of SOC 10(3). A destination lookup failure will also occur, and the packet will be sent on all ports except port 26. Station B, therefore, will receive the packet, as will SOC 10(4). In SOC 10(4), the address for station A will be learned, a destination lookup failure will occur, and the packet will be sent to all ports except port 26. Since SOC 10(4) has no direct connection to SOC 10(1), there is no issue of looping through the stack, and there is no need for the stack count field to be utilized in the IS tag.

In the reverse situation when station B seeks to send a packet to station A in the configuration of FIG. 30, address learning occurs in a manner similar to that which was discussed previously. Since the address for station B has not yet been learned, an SLF occurs, and station B is learned on SOC 10(3). A destination lookup, however, results in a hit, and the packet is switched to port 26. The packet comes in to port 25 of SOC 10(2), a source lookup failure occurs, the address of station B is learned, and destination lookup occurs. The destination lookup results in a hit, the packet is switched to port 26 of SOC 10(2), and into port 25 of SOC 10(1). A source lookup failure occurs, the address for station B is learned on SOC 10(1), a destination lookup is a hit, and the packet is switched to port 1 of SOC 10(1). Since there was no destination lookup failure when the packet came in to switch SOC 10(3), the packet was never sent to SOC 10(4). In communication between stations A and B, therefore, it is possible that the address for station B would never be learned on switch SOC 10(4). In a situation where station B were to send a packet to a station on SOC 10(4), there would be no source lookup failure (assuming station B had already been learned on SOC 10(3)), but a destination lookup failure would occur. The packet would then be sent to port 26 of SOC 10(4) on port 25 of SOC 10(3), and also to port 25 of SOC 10(2) on port 26 of SOC 10(3). There would be no source lookup failure, but there would be a destination lookup failure in SOC 10(4), resulting in the flooding of the packet to all ports of the VLAN except port 26. Addresses may therefore become learned at modules which are not intended to receive the packet. The address aging process, however, will function to delete addresses which are not being used in particular tables. The table synchronization process will ensure that ARL tables within any SOC 10 are synchronized.

Full Duplex Trunking

Trunking in the full duplex configuration is handled in a manner which is similar to the simplex configuration. T bit, TGID, and RTAG information is learned and stored in the tables in order to control access to the trunk port.

Figure 31:
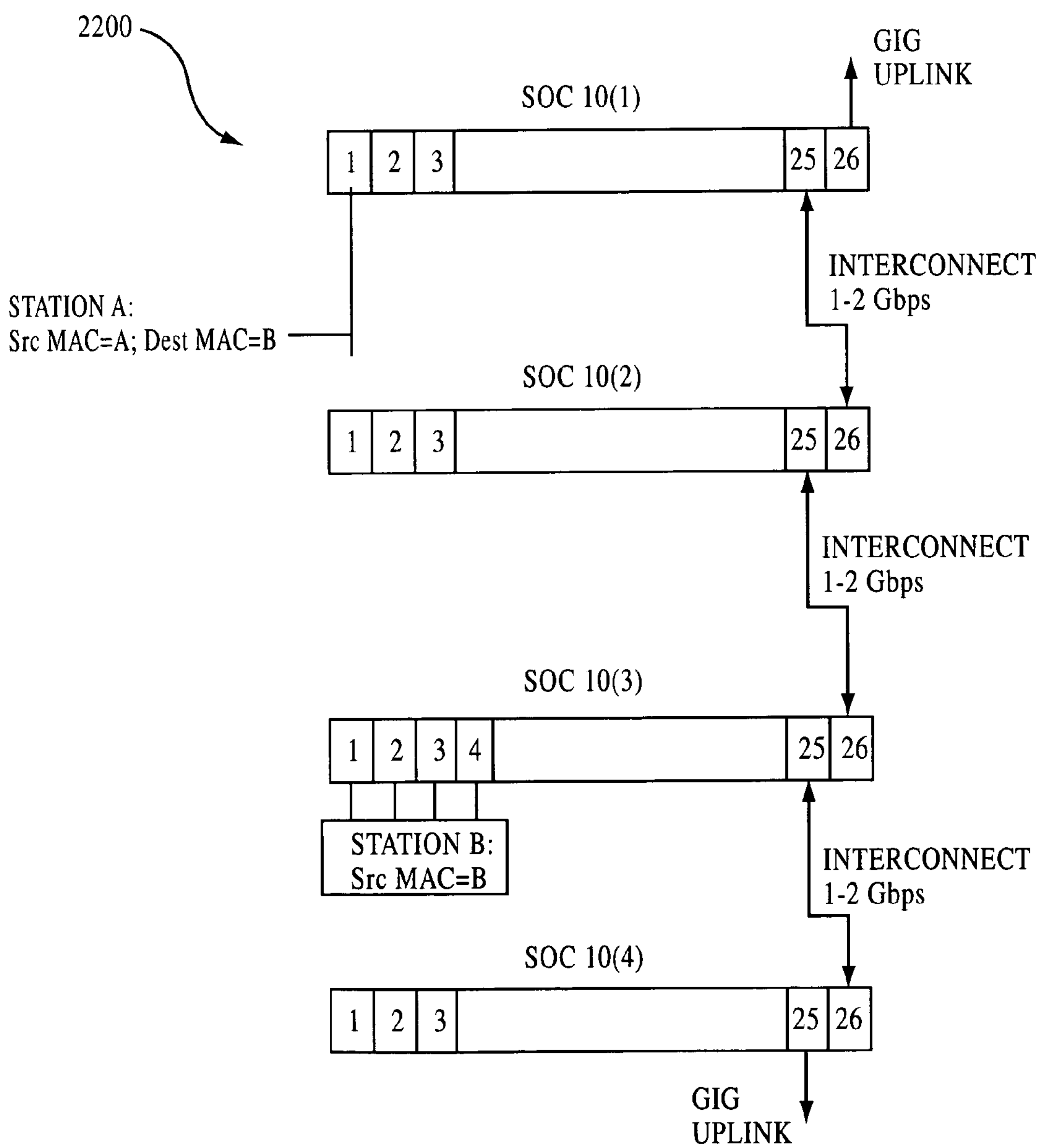
FIG. 31 illustrates address learning in a duplex configuration utilizing trunking.

FIG. 31 illustrates a configuration where station A is disposed on port 1 of SOC 10(1) and station B is disposed on a trunk port of SOC 10(3). In this stacking configuration referred to as stack 2200, all members of the trunk group are disposed on SOC 10(3).

In this example, the TGID for the trunk port connecting station B to SOC 10(3) will be two, and the RTAG will also be two. In an example where station A seeks to send a packet to station B, the packet is received at port 1 of SOC 10(1). A source lookup failure occurs, and the source address of the packet form port 1 is learned in the ARL table for SOC 10(1). The ARL table, therefore, will include the port number, the MAC address, the VLAN ID, T bit information, TGID information, and RTAG information. The port number is 1, the MAC address is A, the VLAN ID is 1, the T bit is not set, and the TGID and RTAG fields are "don't care". A destination lookup results in a destination lookup failure, and the packet is flooded to all ports on the associated VLAN except, of course, port 1 since that is the port on which the packet came in. The packet, therefore, is sent out on at least port 25 of SOC 10(1). The packet is received on port 26 of SOC 10(2). A source lookup failure results in the ARL table learning the address information. As with other lookups, the source address of the packet coming from SOC 10(1) to SOC 10(2) would indicate the source port as being port 26. A DLF occurs, and the packet is sent to all ports on the associated VLAN except port 26 of SOC 10(2). The packet is received on port 26 of SOC 10(3), a source lookup occurs, a source lookup failure occurs, and the source address of the packet coming in on port 26 is learned. A destination lookup results in a destination lookup failure in SOC 10(3). The packet is flooded on all ports of the associated VLAN of SOC 10(3) except port 26. However, a DLF on the trunk port is sent only on a designated port as specified in the 802.1 Q table and the PVLAN table for SOC 10(3). The 802.1 Q table is the tagged VLAN table, and contains the VLAN ID, VLAN port bit map, and untagged bit map fields. Destination B then receives the packet through the trunk port, and SOC 10(4) also receives the packet on port 26. In SOC 10(4), a source lookup failure occurs, and the source address of the packet is learned. On destination lookup, a DLF occurs, and the packet is flooded to all ports of the VLAN on switch SOC 10(4), except of course port 26.

In the reverse situation, however, the T bit, TGID, and RTAG values become critical. When station B seeks to send a packet to station A, a packet comes in on the trunk port on SOC 10(3). A source lookup results in a source lookup failure, since the address for station B has not yet been learned. The T bit is set since the source port is on a trunk group, and the TGID and RTAG information is picked up from the PVLAN table. The ARL table for SOC 10(3), therefore, contains the information for station A, and now also contains the address information for station B. In the station B entry, the port number is indicated as 1, the VLAN ID is 1, the T bit is set, and the TGID and RTAG information are each set to two. SOC 10(3) then performs a destination lookup, resulting in an ARL hit, since station A has already been learned. The packet is switched to port 26 of SOC 10(3). The packet is not sent to the same members of the trunk group from which the packet originated. In the interstack tag, the SRC_T bit is set, the TGID is set to equal 2, and the RTAG is set to equal 2. The packet is received on port 25 of SOC 10(2), where the ingress performs a source lookup. A source lookup failure occurs, and the source address of the packet from port 25 is learned. The SRC_T bit, the TGID information, and the RTAG information in this case is picked up from the interstack tag. On destination lookup, an ARL hit occurs, and the packet is switched to port 26 of SOC 10(2), and it is then received on port 25 of SOC 10(1). A source lookup results in a source lookup failure, and the address of the incoming packet is learned. The destination lookup is a hit, and the packet is switched to port 1 where it is then received by station A.

After this learning and exchange process between station A and station B for the configuration of FIG. 30, the ARL tables for SOC 10(1), 10(2), 10(3), and 10(4) will appear as shown in FIGS. 32A, 32B, 32C, and 32D, respectively. It can be seen that the address for station B is not learned in SOC 10(4), and is therefore not contained in the table of FIG. 32D, since the packet from station B has not been sent to any ports on SOC 10(4).

Figure 33:
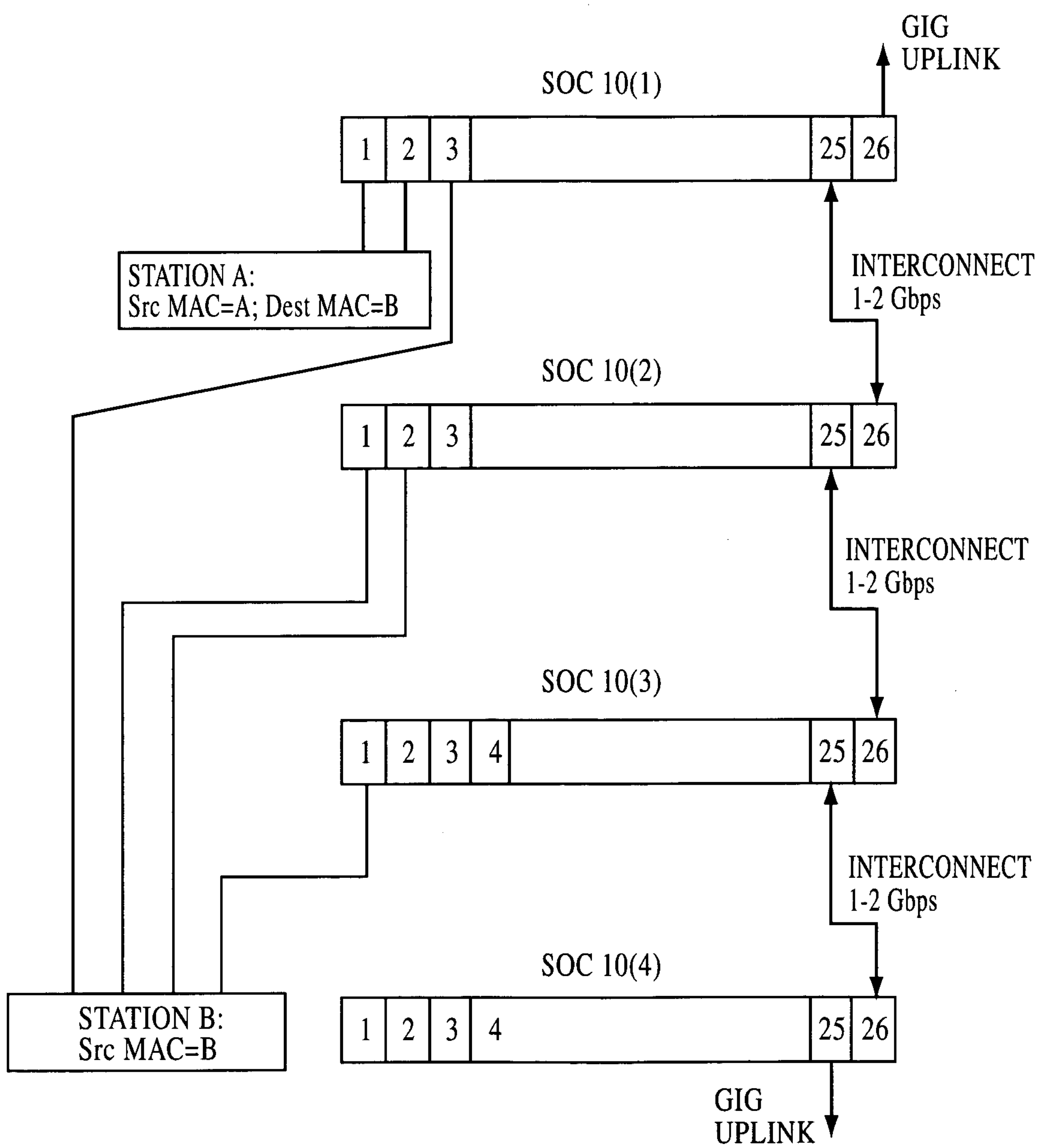
FIG. 33 illustrates a second trunking configuration relating to address learning.

FIG. 33 illustrates a configuration where members of trunk groups are in different modules. In this configuration, address learning and packet flow is similar to that which is discussed with respect to FIG. 31. In this configuration, however, the MAC address for station A must also be learned as a trunk port. In a situation where the TGID equals 1 and the RTAG equals 1 for the trunk group connecting station A in SOC 10(1), and where the TGID and RTAG equals 2 for the trunk group connecting station B in SOC 10(3), address learning for station A sending a packet to station B and station B sending a packet to station A would result in the ARL tables for SOC 10(1), 10(2), 10(3) and 10(4) containing the information set forth in FIGS. 34A, 34B, 34C, and 34D, respectively. For the situation where station A on SOC 10(1) is sending a packet to station B on SOC 10(2), after addresses have been learned as illustrated in FIGS. 34A–34D, the following flow occurs. The incoming packet is received from station A on the trunk port, which we will, in this example, consider to be port number 1. Source lookup indicates a hit, and the T bit is set. In the interstack tag, the SRC_T bit is set, the TGID, and RTAG for the source trunk port from the ARL table is copied to the SRC_TGID and SRC_RTAG fields in the IS tag. Destination lookup indicates a hit, and the T bit is set for the destination address. The DST_T bit is set, and the TGID and RTAG information for the destination trunk port from the ARL table is copied to the DST_TGID and DST_RTAG fields. Port selection is performed, according to the DST_RTAG. In this example, the packet is sent to SOC 10(2). If no port is selected, then the packet is sent to SOC 10(3) on port 25 of SOC 10(2). The packet is then received on port 26 of SOC 10(3). Destination lookup in the ARL table is a hit, and port selection is performed according to the DST_RTAG field. Once again, SOC 10(4) is not involved since no DLF has occurred.

It will be understood that, as discussed above with respect to the stand-alone SOC 10, the trunk group tables must be properly initialized in all modules in order to enable appropriate trunking across the stack. The initialization is performed at the time that the stack is configured such that the packet goes out on the correct trunk port. If a trunk member is not present in a switch module, the packet will go out on the appropriate interstack link.

In order for proper handling of trunk groups to occur, the trunk group table in each SOC 10 must be appropriately initialized in order to enable proper trunking across the stack. FIG. 36 illustrates an example of the trunk group table initializations for the trunk configuration illustrated in FIG. 31, wherein members of the trunk group are in the same module. FIG. 37 illustrates an example of trunk group table initializations for the trunk group configuration of FIG. 33, wherein members of the trunk group are in different switches. FIG. 36 only illustrates initialization for a situation where the TGID equals 2. For situations where the TGID equals 1, the trunk port selection would indicate the stack link port in the correct direction. FIG. 37, however, illustrates the trunk group table initializations for a TGID of 1 and 2. If a trunk member is not present in a particular switch module, the packet will be sent out on the stack link port.

Layer 3 Switching

Figure 35:
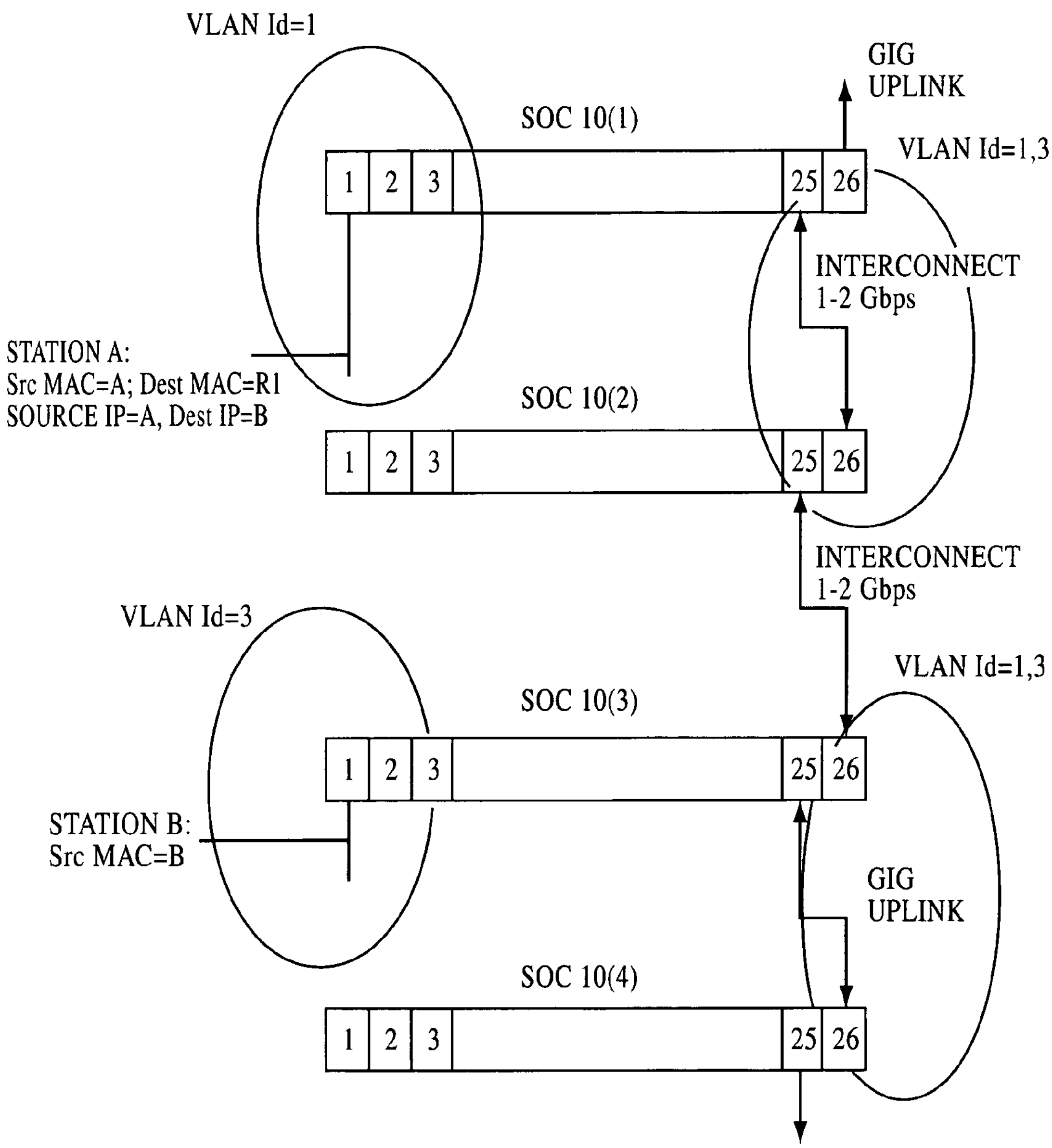
FIG. 35 illustrates multiple VLANs in a stack.

The above discussion regarding packet flow is directed solely to situations where the source and destination are disposed within the same VLAN. For situations where the VLAN boundaries must be crossed, layer 3 switching is implemented. With reference to FIG. 35, layer 3 switching will now be discussed. In this example, suppose that station A, located on port 1 of SOC 10(1) is on a VLAN V1 having a VLAN ID of 1, and station B, located on port 1 of SOC 10(3) is located on another VLAN V3 having a VLAN ID of 3. Since multiple VLANs are involved, the ports connecting the interstack links must be members of both VLANs. Therefore, ports 25 and 26 of SOC 10(1), 10(2), 10(3), and 10(4) have VLAN IDs of 1 and 3, thereby being members of VLAN V1 and VLAN V3. Layer 3 switching involves crossing the VLAN boundaries within the module, followed by bridging across the module. Layer 3 interfaces are not inherently associated with a physical port, as explained previously, but are associated instead with the VLANs. If station A seeks to send a packet to station B in the configuration illustrated in FIG. 35, the packet would be received at port 1 of SOC 10(1), and be addressed to router interface R1, with the IP destination address of B. Router R1 is, in this example, designated as the router interface between VLAN boundaries for VLAN V1 and VLAN V3. Since SOC 10(1) is configured such that VLAN V3 is located on port 25, the packet is routed to VLAN V3 through port 25. The next hop MAC address is inserted in the destination address field of the MAC address. The packet is then switched to port 26 of SOC 10(2), in a layer 2 switching operation. The packet is then switched to port 25 of SOC 10(2), where it is communicated to port 26 of SOC 10(3). SOC 10(3) switches the packet to port 1, which is the port number associated with station B. In more specific detail, the layer 3 switching when a packet from station A is received at ingress submodule 14 of SOC 10(1), the ARL table is searched with the destination MAC address. If the destination MAC address is associated with a layer 3 interface, which in this case would be a VLAN boundary, the ingress will then check to see if the packet is an IP packet. If it is not an IP packet, the packet is sent to the appropriate CPU 52 for routing. Similarly, if the packet has option fields, the packet is also sent to CPU 52 for routing. The ingress also checks to see if the packet is a multicast IP packet, also referred to as a class D packet. If this is the case, then the packet is sent to the CPU for further processing. After the IP checksum is validated, the layer 3 table is searched with the destination IP address as the key. If the entry is found in the ARL table, then the entry will contain the next hop MAC address, and the egress port on which this packet must be forwarded. In the case of FIG. 35, the packet would need to be forwarded to port 25. If the entry is not found in the layer 3 table, then a search of a default router such as a default IP router table is performed. If the entry is not found, then the packet is sent to the CPU. By ANDing the destination IP address with a netmask in the entry, and checking to see if there is a match with the IP address in the entry, the default router table is searched. The packet is then moved through the stack with the IS tag appropriately configured, until it is switched to port 1 of SOC 10(3). It is then checked to determine whether or not the packet should go out as tag or untagged. Depending upon this information, the tagging fields may or may not be removed. The interstack tag, however, is removed by the appropriate egress 16 before the packet leaves the stack.

In the above-described configurations of the invention, the address lookups, trunk group indexing, etc. result in the creation of a port bit map which is associated with the particular packet, therefore indicating which ports of the particular SOC 10 the packet will be sent out on. The generation of the port bitmap, for example, will ensure that DLFs will not result in the packet being sent out on the same port on which it came in which is necessary to prevent looping throughout a network and looping throughout a stack. It should also be noted that, as mentioned previously, each SOC 10 can be configured on a single semiconductor substrate, with all of the various tables being configured as two-dimensional arrays, and the modules and control circuitry being a selected configuration of transistors to implement the necessary logic.

In order for the various parameters of each SOC 10 to be properly configurable, each SOC 10 must be provided with a configuration register in order to enable appropriate port configuration. The configuration register includes a field for various parameters associated with stacking. For example, the configuration register must include a module ID field, so that the module ID for the particular SOC 10 switch can be configured. Additionally, the configuration register must include a field which can programmed to indicate the number of modules in the stack. It is necessary for the number of modules to be known so that the stack count field in the interstack tag can be appropriately set to n-1. The configuration register must also include a field which will indicate whether or not the gigabit port of a particular GPIC 30 is used as a stacking link or an uplink. A simplex/duplex field is necessary, so that it can be indicated whether or not the stacking solution is a simplex configuration according to FIG. 21, or a duplex configuration according to FIGS. 22 and 23. Another field in the configuration register should be a stacking module field, so that it can properly be indicated whether the particular SOC 10 is used in a stack, or in a stand alone configuration. SOC 10 switches which are used in a stand alone configuration, of course, will not insert an IS tag into incoming packets. The configuration register is appropriately disposed to be configured by CPU 52.

Operational statistics for network switches such as SOC 10 can be tracked with statistical counters, also known as STAT counters. A separate set of STAT counters are provided for each port on the switch, and typically count such statistics as numbers of bytes received, numbers of bytes transmitted, packets received, packets dropped, etc. These counters are typically monitored by the CPU, for the purposes of performance measurement, reliability determinations, accounting in "charge-by-the-bit" methods, etc. In typical STAT counter configurations, a remote CPU such as CPU 52 must access a system bus within the switch, arbitrate for the bus, and access STAT counters for each port. Such a configuration requires a significant amount of CPU processing associated with the bus access and arbitration, and STAT counter access. After a request is sent for STAT counter information, the CPU must hold or wait until an answer is received. This access and holding requires a significant amount of CPU time, even if actual data transfer does not occur. In a situation where STAT information were only being accessed for, for example, one or two ports, the overhead would be minimal. It should be noted, however, that there may be as many as 20–60 STAT counters for each port. In a complex switch such as SOC 10, therefore, where there can be 26 ports or more, then the operations associated with gathering the STAT data is extremely CPU intensive. The present invention, therefore, implements a STAT DMA (direct memory access) device to periodically fetch STAT counter information from the individual STAT counters and store the information in system memory. CPU 52, therefore, must initiate the STAT counting operation only once, and with a single command. Once CPU 52 makes a request to the STAT/DMA device, all of the STAT registers are read by STAT gathering logic according to the invention, and stored in high speed system memory. A timer is provided to auto-update the system memory with updated data from the STAT registers based upon a predetermined time period. CPU 52 is therefore configured to access a fixed location in system memory in order to determine the STAT information for all of the ports on the switch. No lookups nor searching is required, and therefore numerous system bus accesses and "holds" by the CPU are unnecessary. Fixed offsets can be used for each STAT counter, so that as an example, STAT information for counter 1 of port 1 can always be found in the same location in system memory. A fixed section of system memory, such as, for example, 6.5 K bytes in a particular location, can be set aside for STAT counter information. Implementing such a system on a network switch such as SOC 10 requires STATs gathering logic which performs a snoop function, DMA circuitry, and a timer. The specific time out period for the timer is programmable, based upon particular applications.

Figure 38:
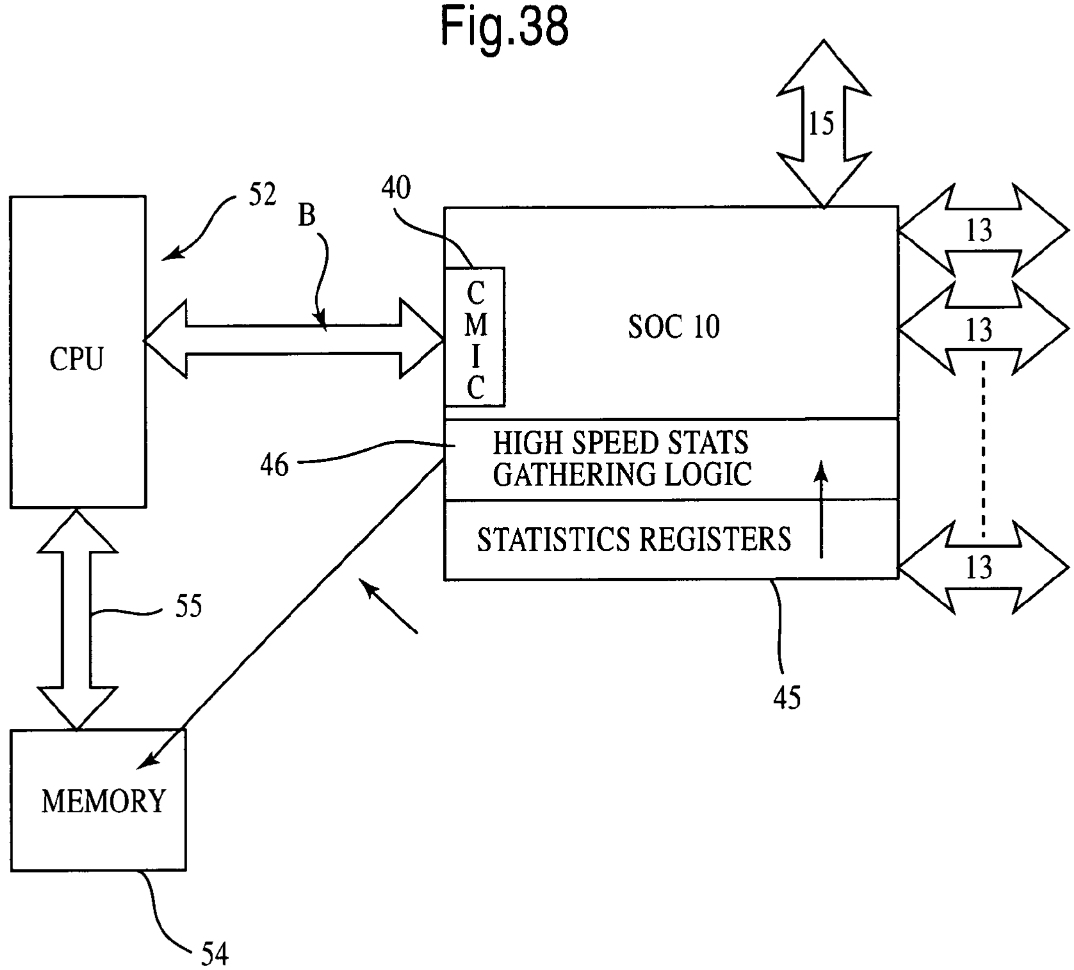
FIG. 38 illustrates an overview of the interrelationship of a network switch, a CPU, and a system memory, regarding statistics gathering.
Figure 39:
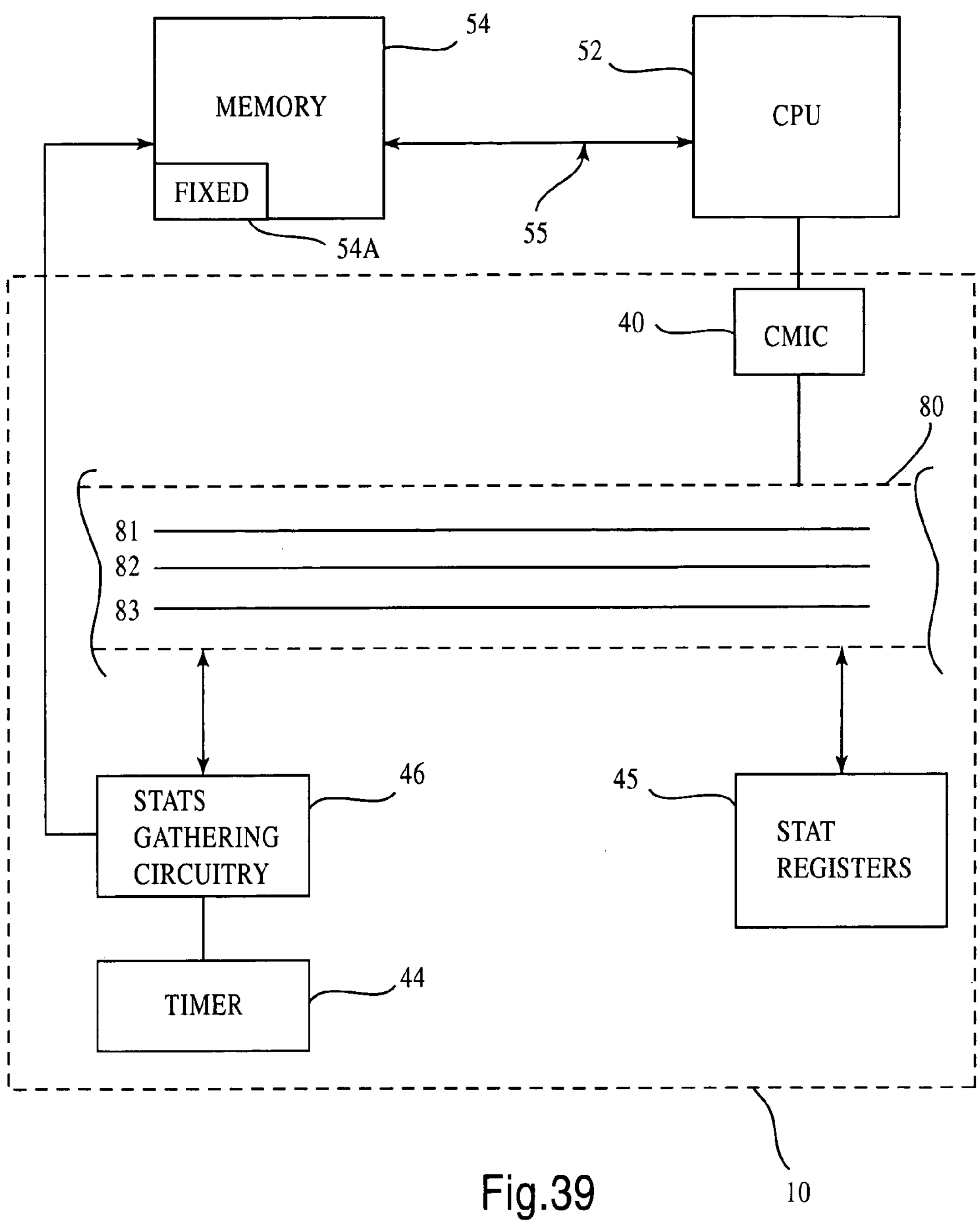
FIG. 39 illustrates a more detailed overview of the elements associated with statistics gathering.

Referring to FIG. 38, a configuration is shown wherein CPU 52 communicates with SOC 10 through an appropriate bus B and CMIC 40. CPU 52 is also in communication with memory 54 via a memory bus 55. CPU 52 is capable of communicating with memory 54 through ordinary communication via memory bus 55, and also via DMA access which provides a high speed low latency read/write access to the memory 54. SOC 10 is provided with high speed STATs gathering logic 43, and a series of STAT or statistics registers 45, which monitor statistics regarding each of ports 13 and 15. Although SOC 10 is disclosed herein as having a plurality of fast ethernet ports 13 and gigabit ethernet ports 15, virtually any combination of network interface ports can be provided. STAT registers 45 are provided to monitor selected types of activity on each of the ports. Referring to FIG. 39, STATs gathering circuitry 43 is connected to a system bus such as CPS channel 80. STAT registers 45 are also connected to the system bus, and monitor appropriate port activity. Memory 54 is provided with a fixed memory area 54*a*, which stores STAT counter information therein, for rapid access by CPU 52. When CPU 52 submits a request to CPS channel 80 to initiate monitoring of the STAT counters, STATs gathering circuitry 43 and timer 44 are activated. STATs gathering circuitry 43 accesses STAT registers 45, and transmits the STAT register information to memory 54. The transmission can be performed by DMA circuitry within STATs gathering circuitry 43, thereby enabling high speed low latency access to memory 54. The STAT register information is reconstructed in section 54*a* of memory 54. Timer 44 is configured to periodically initiate STATs gathering circuitry 43 to update the STAT register information contained in section 54*a* of memory 54. The specific time out period for timer 44 is programmable. As a result of this configuration, therefore, after the process is initiated by a command from CPU 52, the information in STAT registers 45 regarding all of the STATs for all of the ports is essentially reconstructed in section 54*a* of memory 54.

It should be noted that although FIG. 39 illustrates STATs gathering circuitry 43 and timer 44 as being separate modules within SOC 10, one or both of these elements can be implemented as part of CMIC 40, or as an integral part of a switch implementing STATs gathering in this fashion.

CPU 52 can directly access memory 54 to read section 54*a* to obtain specific information from the reconstructed registers 45. In one embodiment of the invention, a 32-bit register is provided, either within CMIC 40 or STATs gathering circuitry 43, which identifies the actual location of section 54*a* within memory 54. CMIC 40 provides CPU 52 with specific information which indicates where individual per port counter information can be found within section 54*a*.

Timer 44 can also be implemented as a specific register within CMIC 40 having a timer value therein. The timer value can indicate a number of clock cycles to wait from the end of one scan of all of STAT registers 45 until the beginning of a next scan. This auto update feature can keep the CPUs memory updated with an appropriately current set of values of all of the STAT registers, with no CPU intervention.

CMIC 40 can also be provided with a register which essentially acts as an active ports register for the STAT registers. Bits in this register can be set to zero if registers of a specific port are intended to be skipped, rather than transmitted to section 54*a*. Bits which are set to one indicate that the registers associated with the port corresponding to that bit are intended to be copies to section 54*a*.

The present invention, therefore, enables the reconstruction of the STAT registers in system memory with virtually no involvement by the CPU. In network switches having a significant number of ports and wherein a significant amount of activity is monitored by STAT counters, significant efficiency improvements can be realized.

It should be noted that the above-discussed implementation of the invention discusses a specific configuration for a network switch being that of SOC 10. It should be noted, however, that the elements of the invention regarding the STAT registers, STATs gathering circuitry, timer, DMA, and system memory, could be implemented in a different type of network switch. Additionally, although a configuration according to the present invention utilizes elements which communicate via a system bus such as CPS channel 80, and more specifically via S-channel messages, other types of communication interfaces between the various elements are still within the spirit and scope of the present invention.

Additionally, although not illustrated with respect to the stacking configurations, each SOC 10 is configured to have on-chip CBP 50, and also off-chip GBP 60, as mentioned previously. Admission to either on-chip memory or off-chip memory is performed in the same manner in each chip, as is communication via the CPS channel 80.

Although the invention has been described based upon these preferred embodiments, it would be apparent to those of skilled in the art that certain modifications, variations, and alternative constructions would be apparent, while remaining within the spirit and scope of the invention. For example, the specific configurations of packet flow are discussed with respect to a switch configuration such as that of SOC 10. It should be noted, however, that other switch configurations could be used to take advantage of the invention. In order to determine the metes and bounds of the invention, therefore, reference should be made to the appended claims.

What is claimed is:

1. A network switch, comprising:

a data port for communicating with a data network;

a statistics counter connected to said data port for monitoring operational parameters associated with the data port, said statistics counter including statistics registers therein;

a statistics gathering circuit connected to said statistics counter for reading the statistics registers, and for directly transmitting data from the statistics registers to a remote system memory;

direct memory access circuitry, wherein the statistics gathering circuit transmits the data from the statistics registers to the remote system memory via a Direct Memory Access (DMA) operation; and a configuration register for appropriate port configuration, the configuration register comprising at least one field associated with stacking.

2. A network switch as recited in claim 1, further comprising a timer unit connected to said statistics gathering circuit for controlling said statistics gathering circuit to repeatedly read the statistics registers and repeatedly transmit the data from the statistics registers to the remote system memory after a predetermined period of time.

3. A network switch as recited in claim 2, wherein said timer unit comprises a register containing a timer value indicating a number of system clock cycles which determines the predetermined period.

4. A network switch as recited in claim 1, further comprising a CPU interface unit for interfacing the network switch to a remote CPU, said CPU interface unit comprising the statistics gathering circuit therein.

5. A network switch as recited in claim 4, wherein said CPU interface unit also comprises the statistics counter therein.

6. A network switch as recited in claim 1, said network switch comprising a communications channel therein, and wherein information is communicated from the data port to the statistics counter via the communication channel.

7. A network switch as recited in claim 6, wherein said statistics gathering circuit is connected to said statistics counter via the communication channel.

8. A network switch as recited in claim 1, said network switch comprising a plurality of data ports and a plurality of statistics counters therein, and wherein each data port of said plurality of data ports has at least one individual statistics counter associated therewith.

9. A network switch as recited in claim 1, wherein said statistics gathering circuit is configured to transmit the data from the statistics registers to a predetermined section of the remote system memory, said network switch further comprising:

a CPU interface unit which directs a remote CPU to identify where the data for the data port is stored in the predetermined section of the remote memory.

10. A network switch, comprising:

a data port for communicating with a data network;

a statistics counter connected to said data port for monitoring operational parameters associated with the data port, said statistics counter including statistics registers therein;

a statistics gathering circuit connected to said statistics counter for reading the statistics registers, and for directly transmitting data from the statistics registers to a remote system memory;

an active counter register which is configured to selectively enable statistics gathering from selected ones of the statistics registers and;

a configuration register for appropriate port configurations the configuration register comprising at least one field associated with stacking.

11. A network switch, comprising:

a data port for communicating with a data network;

a statistics counter connected to said data port for monitoring operational parameters associated with the data port, said statistics counter including statistics registers therein;

a statistics gathering circuit connected to said statistics counter for reading the statistics registers, and for directly transmitting data from the statistics registers to a remote system memory;

a plurality of data ports and a plurality of statistics counters therein, and wherein each data port of said plurality of data ports has at least one individual statistics counter associated therewith;

an active counter register which is configured to selectively enable statistics gathering by said statistics gathering circuit from selected ones of the plurality of statistics counters and a configuration register for appropriate port configuration, the configuration register comprising at least one field associated with stacking.

12. A method of monitoring port activity in a network switch, said method comprising the steps of:

storing port activity data in a statistics register on the network switch;

reading the port activity data with a statistics gathering unit;

transmitting the port activity data directly to a remote system memory, thereby reconstructing the statistics register in the remote system memory;

accessing the remote system memory with a remote CPU to read the reconstructed statistics register; and providing appropriate port configuration based on information in a configuration register comprising at least one field associated with stacking.

13. A method as recited in claim 12, wherein said step of transmitting the port activity data comprises transmitting via a Direct Memory Access (DMA) operation.

14. A method as recited in claim 12, further comprising a step of repeating the reading and transmitting steps at predetermined intervals.

15. A method as recited in claim 14, wherein said predetermined interval is a predetermined number of system clock cycles.

16. A method of monitoring port activity in a network switch, said method comprising the steps of:

storing port activity data in a plurality of statistics registers on the network switch;

reading the port activity data with a statistics gathering unit;

transmitting the port activity data to a remote system memory to thereby reconstruct the plurality of statistics registers in the remote system memory;

accessing the remote system memory with a remote CPU to read the reconstructed statistics registers, wherein the remote CPU accesses the remote system memory to read selected ones of the plurality of statistics registers; and providing appropriate port configuration based on information in a configuration register comprising at least one field associated with stacking.

17. A network switch for processing packets, said network switch comprising:

a data port for transmitting and receiving packets over a data network;

a tag insertion unit for inserting a stack-specific tag into a packet;

a processing unit for processing the packet in a stack of network switches in accordance with tag information in the stack-specific tag;

a removing unit for removing the stack-specific tag from the packet when the packet is being switched to a destination port;

a statistics counter connected to said data port for monitoring operational parameters associated with the data port, said statistics counter including statistics registers therein; and a statistics gathering circuit connected to said statistics counter for reading the statistics registers, and for directly transmitting data from the statistics registers to a remote system memory.

18. A network switch as recited in claim 17, wherein said stack-specific tag inserted by said insertion unit includes information relating to at least one of stack count, trunk group information, and mirroring information.

19. A network switch as recited in claim 17, wherein the processing unit processes the packet by forwarding the packet to a mirroring port in accordance with mirroring information in the stack-specific tag.

20. A network switch as recited in claim 17, further comprising direct memory access circuitry, wherein the statistics gathering circuit transmits the data from the statistics registers to the remote system memory via a Direct Memory Access (DMA) operation.

21. A network switch as recited in claim 17, further comprising a timer unit connected to said statistics gathering circuit for controlling said statistics gathering circuit to repeatedly read the statistics registers and repeatedly transmit the data from the statistics registers to the remote system memory after a predetermined period of time.

22. A network switch as recited in claim 17, further comprising a CPU interface unit for interfacing the network switch to a remote CPU, said CPU interface unit comprising the statistics gathering circuit therein.

23. A network switch as recited in claim 22, wherein said CPU interface unit also comprises the statistics counter therein.

24. A network switch as recited in claim 17, said network switch comprising a plurality of data ports and a plurality of statistics counters therein, wherein each data port of said plurality of data ports has at least one individual statistics counter associated therewith.

25. A method of handling packets in a network switch, said method comprising the steps of:

inserting a stack-specific tag into an incoming packet;

processing the incoming packet in a stack of network switches in accordance with tag information in the stack-specific tag;

storing port activity data relating to a data port receiving the incoming packet, said port activity data being stored in a statistics register on the network switch;

reading the port activity data with a statistics gathering unit;

transmitting the port activity data directly to a remote system memory, thereby reconstructing the statistics register in the remote system memory;

accessing the remote system memory with a remote CPU to read the reconstructed statistics register.

26. A method as recited in claim 25, wherein said step of transmitting the port activity data comprises transmitting via a Direct Memory Access (DMA) operation.

27. A method as recited in claim 25, further comprising a step of repeating the reading and transmitting steps at predetermined intervals.

28. A method as recited in claim 27, wherein said predetermined interval is a predetermined number of system clock cycles.

29. A method as recited in claim 25, wherein the step of storing port activity data comprises storing the port activity data in a plurality of statistics registers on the network switch, wherein the transmitting step comprises transmitting the port activity data to the remote system memory to thereby reconstruct the plurality of statistics registers in the remote system memory, and wherein the remote CPU accesses the remote system memory to read selected ones of the plurality of statistics registers.

30. A method as recited in claim 25, further comprising a step of removing the stack-specific tag.

* * * * *